(12) United States Patent
Casper et al.

(10) Patent No.: US 8,002,249 B2
(45) Date of Patent: Aug. 23, 2011

(54) STRIP DIFFUSER

(75) Inventors: Thomas J. Casper, Waukesha, WI (US); Mark A. Schoenenberger, Cedarburg, WI (US); Brad D. Laubenstein, Port Washington, WI (US); James A. Reilly, Shrewsbury, MA (US); Joseph G. Krall, Grafton, WI (US); Neil S. Tischler, Acton, MA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1107 days.

(21) Appl. No.: 11/808,554

(22) Filed: Jun. 11, 2007

(65) Prior Publication Data
US 2008/0251954 A1 Oct. 16, 2008

Related U.S. Application Data

(63) Continuation-in-part of application No. 11/649,345, filed on Jan. 3, 2007, which is a continuation-in-part of application No. 10/639,774, filed on Aug. 13, 2003, now Pat. No. 7,255,333.

(60) Provisional application No. 60/408,284, filed on Sep. 6, 2002, provisional application No. 60/402,715, filed on Aug. 13, 2002.

(51) Int. Cl.
*B01F 3/04* (2006.01)
(52) U.S. Cl. .............................. 261/122.1; 261/DIG. 70
(58) Field of Classification Search .............. 261/122.1, 261/122.2, DIG. 70
See application file for complete search history.

(56) References Cited

U.S. PATENT DOCUMENTS

| | | | |
|---|---|---|---|
| 2,212,841 | A | 8/1940 | Maxwell |
| 3,063,689 | A | 11/1962 | Coppock |
| 3,083,953 | A | 4/1963 | Langdon et al. |
| 3,432,154 | A | 3/1969 | Danjes |
| 3,768,788 | A | 10/1973 | Candel |
| 3,837,629 | A | 9/1974 | Matras et al. |
| 3,953,553 | A | 4/1976 | Thayer |
| 3,954,922 | A | 5/1976 | Walker et al. |
| 3,992,491 | A | 11/1976 | Ihrig et al. |
| 4,029,581 | A | 6/1977 | Clough, Jr. et al. |
| 4,060,486 | A | 11/1977 | Schreiber |
| 4,606,867 | A | 8/1986 | Eguchi |
| 4,624,781 | A | 11/1986 | Messner |

(Continued)

FOREIGN PATENT DOCUMENTS

AT 391126 2/1990

(Continued)

OTHER PUBLICATIONS

Printout of Pfleiderer brochure, 2008.

(Continued)

*Primary Examiner* — Scott Bushey
(74) *Attorney, Agent, or Firm* — RatnerPrestia

(57) ABSTRACT

Membrane strip diffusers are disclosed, useful for example in aerating wastewater in activated sludge plants. These diffusers have membranes, diffuser bodies comprising gas conduits and, in addition to the conduits, integral membrane supports elongated in the same general direction. Such conduits are for example co-extruded with the diffuser bodies. The supports are apertured to discharge gas into chambers formed beneath the membranes when they inflate, and the membranes have pores to discharge the gas. Ways to edge- and end-seal the membranes to the diffuser bodies and ways to support the diffusers are also disclosed.

50 Claims, 31 Drawing Sheets

U.S. PATENT DOCUMENTS

| | | | |
|---|---|---|---|
| 4,629,126 A | 12/1986 | Goudy, Jr. et al. | |
| 4,631,134 A | 12/1986 | Schussler | |
| 4,734,191 A | 3/1988 | Schussler | |
| 4,960,546 A | 10/1990 | Tharp | |
| 4,961,854 A | 10/1990 | Wittmann et al. | |
| 5,000,884 A | 3/1991 | Bassfeld | |
| 5,013,493 A | 5/1991 | Tharp | |
| 5,015,421 A | 5/1991 | Messner | |
| 5,032,325 A | 7/1991 | Tharp | |
| 5,075,048 A * | 12/1991 | Veeder | 261/122.1 |
| 5,093,047 A | 3/1992 | Zeppenfeld | |
| 5,098,581 A | 3/1992 | Roediger | |
| 5,133,862 A | 7/1992 | Cannan et al. | |
| 5,133,876 A | 7/1992 | Tharp | |
| 5,158,715 A | 10/1992 | Jager | |
| 5,192,467 A | 3/1993 | Strung et al. | |
| 5,330,688 A | 7/1994 | Downs | |
| 5,352,391 A | 10/1994 | Heck | |
| 5,378,355 A | 1/1995 | Winkler | |
| 5,458,771 A | 10/1995 | Todd | |
| 5,672,270 A | 9/1997 | Yoshimura | |
| 5,681,509 A | 10/1997 | Bailey | |
| 5,846,412 A | 12/1998 | Tharp | |
| 5,851,447 A | 12/1998 | Tyer | |
| 5,868,971 A | 2/1999 | Meyer | |
| 5,868,972 A | 2/1999 | Galich et al. | |
| 6,193,220 B1 | 2/2001 | Kelly | |
| 6,244,574 B1 | 6/2001 | Downs | |
| 6,344,138 B1 | 2/2002 | Del Guerra | |
| 6,406,005 B1 | 6/2002 | Lawson et al. | |
| 6,464,211 B1 * | 10/2002 | Downs | 261/122.1 |
| 6,808,165 B1 | 10/2004 | Sperber et al. | |
| 6,811,148 B2 * | 11/2004 | Frankel et al. | 261/122.1 |
| 7,255,333 B2 * | 8/2007 | Casper et al. | 261/122.1 |
| 7,311,299 B2 * | 12/2007 | Sasajima | 261/122.1 |
| 2002/0003314 A1 | 1/2002 | Cantz | |
| 2007/0013089 A1 * | 1/2007 | Sasajima | 261/122.1 |

FOREIGN PATENT DOCUMENTS

| | | |
|---|---|---|
| CA | 2 482 435 | 11/2003 |
| DE | 2 261 994 | 6/1974 |
| DE | 3224177 | 12/1983 |
| DE | 3441731 | 5/1986 |
| DE | 3710739 | 10/1988 |
| DE | G 87 06 219.4 | 10/1988 |
| DE | 3716744 | 12/1988 |
| DE | 41 04 287 | 8/1992 |
| DE | 42 06 136 | 9/1992 |
| DE | 4240300 | 6/1994 |
| DE | 43 14 766 | 9/1994 |
| DE | G 94 12 161.3 | 5/1995 |
| DE | 200 07 347 U1 | 8/2000 |
| DE | 10218073 | 11/2003 |
| EP | 0 625 484 | 11/1994 |
| EP | 0 947 471 | 10/1999 |
| EP | 0 947 473 | 10/1999 |
| GB | 1 304 147 | 1/1973 |
| GB | 2 438 851 | 12/2007 |
| JP | 61-8120 | 1/1986 |
| WO | WO 98/21151 | 5/1998 |
| WO | WO 99/67014 | 12/1999 |
| WO | WO 03/043722 | 5/2003 |
| WO | WO 2005/115929 A1 * | 12/2005 |

OTHER PUBLICATIONS

Printout of Pfleiderer website, printed Apr. 20, 2005.
EPA Design Manual, "Fine Pore Aeration Systems", EPA/625/1-89/023, 2008.
Pfleiderer, "NewAir Diffuser", Spring of 2002, photograph identified herein as Photo A, exhibited at the IFAT Trade Show, Germany.
Pfleiderer, "NewAir Diffuser", Spring of 2002, photograph identified herein as Photo B, exhibited at the IFAT Trade Show, Germany.
Pfleiderer, "NewAir Diffuser", Spring of 2002, photograph identified herein as Photo C, exhibited at the IFAT Trade Show, Germany.
Lakeside Eqpt. Corp., "Lakeside's Newair Fine Bubble Aeration", sales brochure, copyright date 2003, Lakeside Equipment Corporation, Bartlett, IL, USA.
"Strip Aerators", sales literature, Aerostrip Corporation, Mar. 1999.
"Strip Aerators Aerostrip Type T" (in German and English), Aqua Consult, 1996-1997.
Schoenenberger, Mark, "Competition Analysis Aerostrip Fine Bubble Membrane Diffuser", Mar. 20, 2002, pp. 1 to 9, letter, photos, ITT Industries.
"Austria Austrian Trade News Vienna Region", Austrian Trade Organization Bulletin, Summer 2003, p. 8, The Austrian Trade Commission.
Schoeneberger, Mark, "Confidential Feasibility Study-Sanitaire New Generation High Density Air Diffusion System", Aug. 5, 1998.
First Examination Report of Indian Patent Office for counterpart parent Indian application No. 938/DELNP/2005 dated Aug. 10, 2005.
Office Action of European Patent Office for counterpart parent European application No. 03 785 236.5 dated May 18, 2007.
PCT Notification of Transmittal of International Preliminary Examination Report for counterpart parent PCT application PCT/US03/25261 dated May 6, 2004.
International Search Report for counterpart parent PCT application PCT/US03/25261 dated Dec. 1, 2003.
Supplementary European Search Report for counterpart parent European application No. 03 785 236.5 dated Jan. 29, 2007.
Photograph of Aquaconsult "Strip Aerator" strip diffuser.
Photograph of Aquaconsult "Strip Aerator" strip diffuser.
Search report of the European Patent Office, Sep. 2008.
Photograph of Aquaconsult "Strip Aerator" strip diffuser, 2008.
Photograph of Aquaconsult "Strip Aerator" strip diffuser, 2008.

* cited by examiner

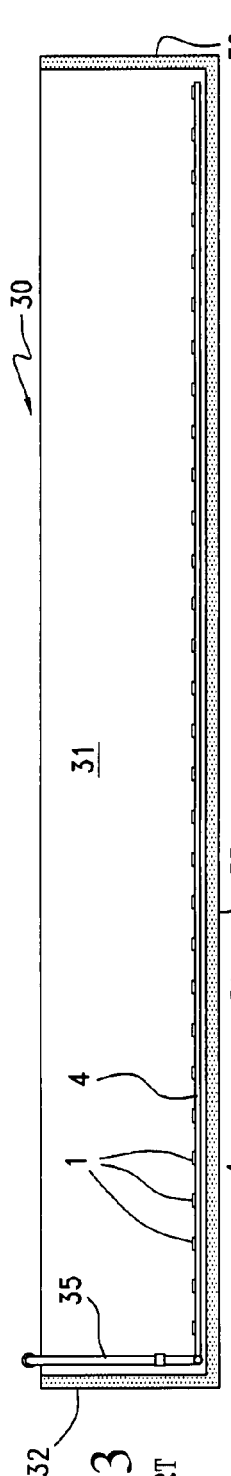
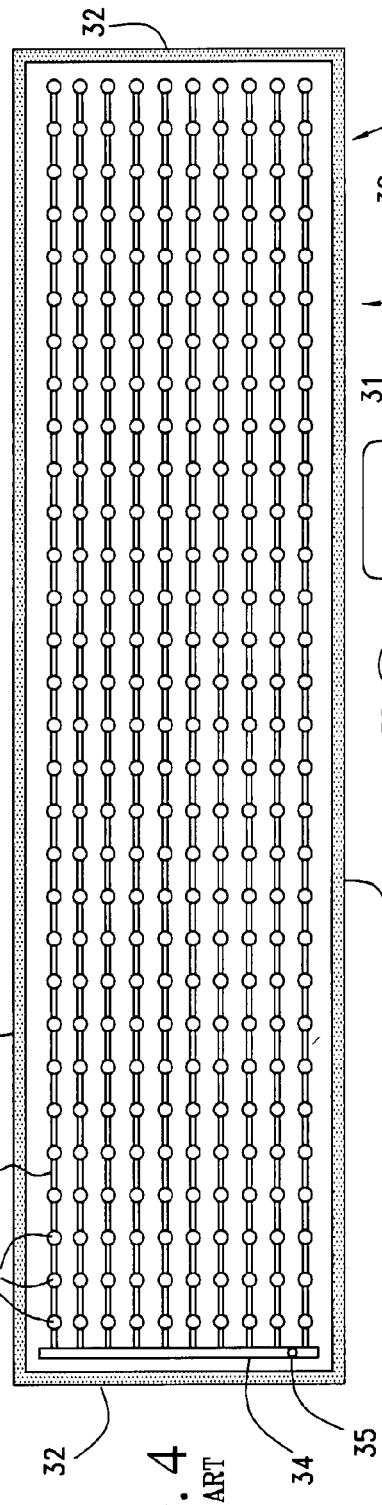
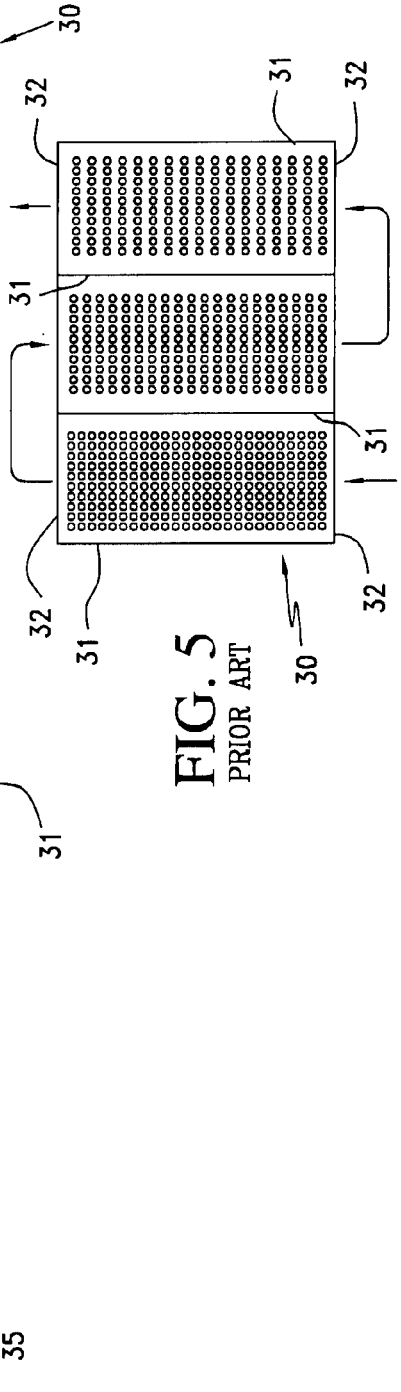
FIG. 3
PRIOR ART
FIG. 4
PRIOR ART
FIG. 5
PRIOR ART

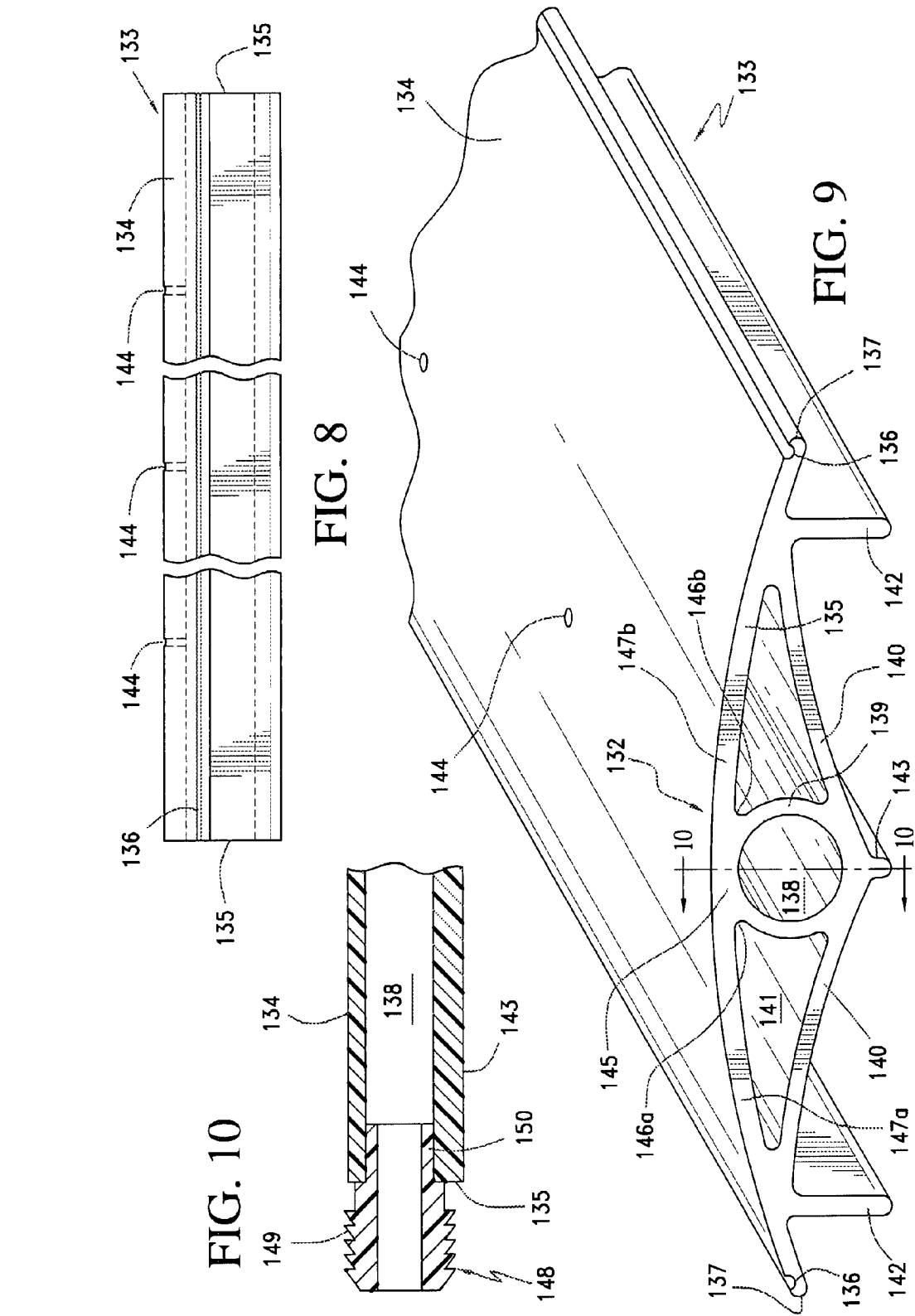

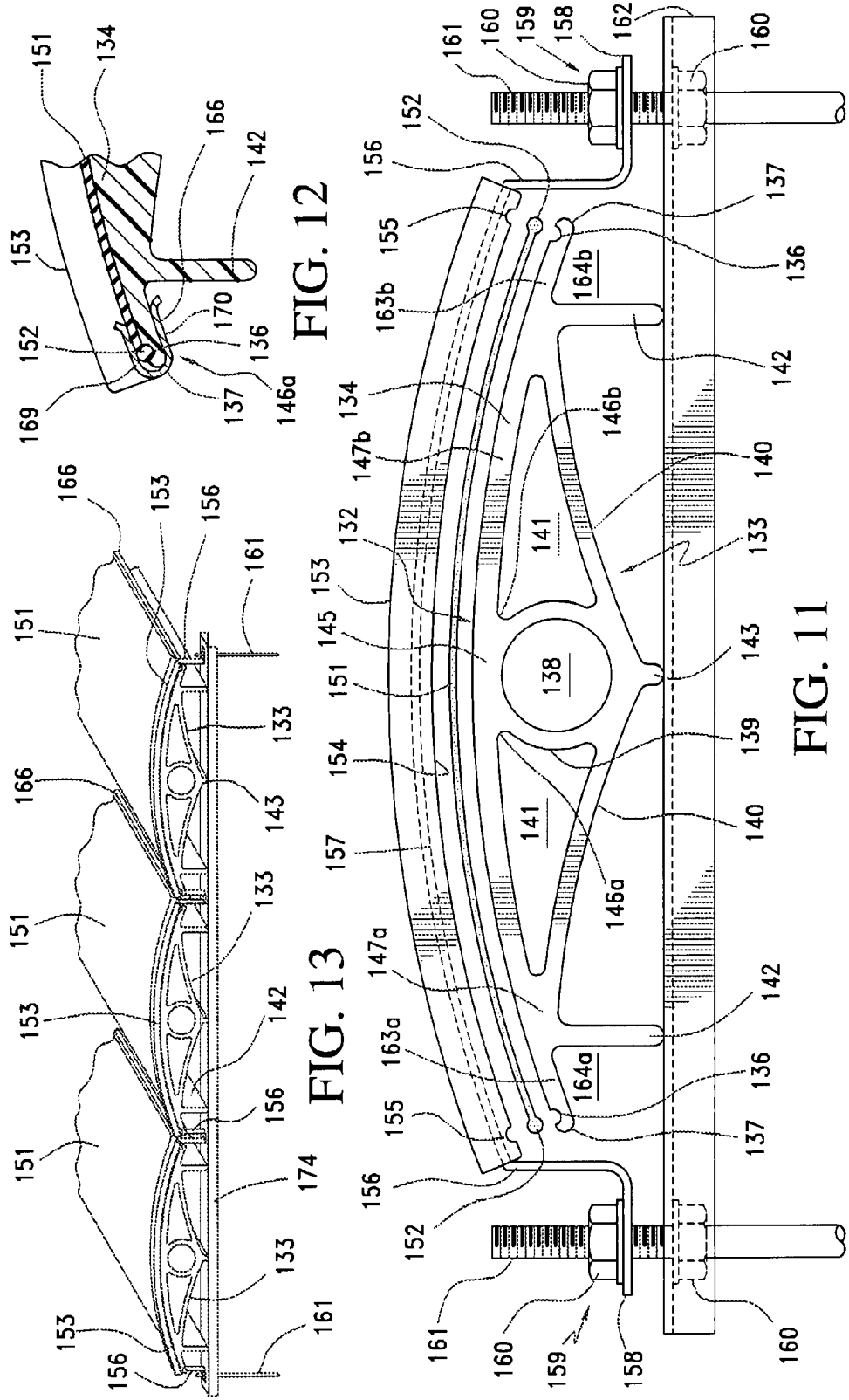

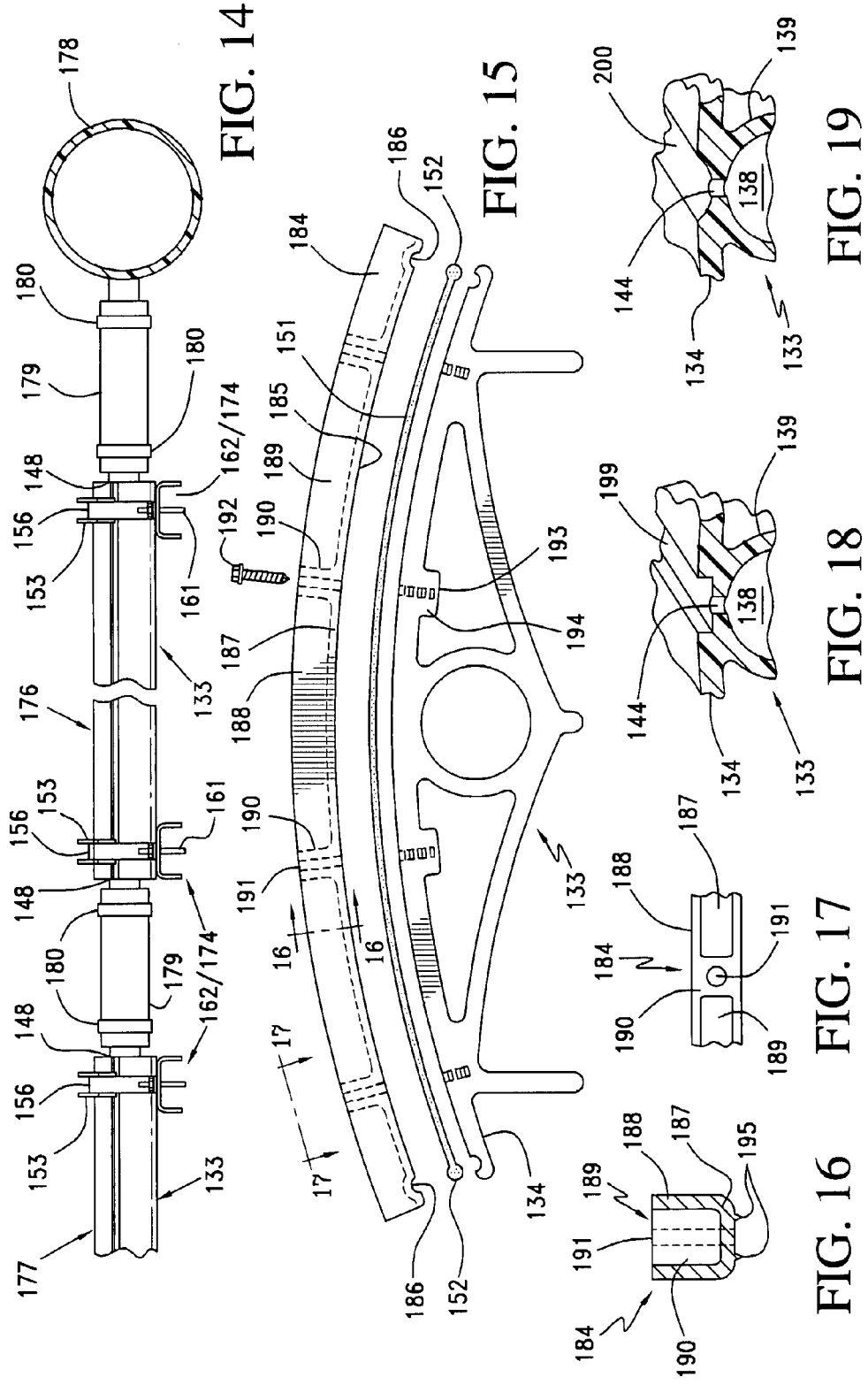

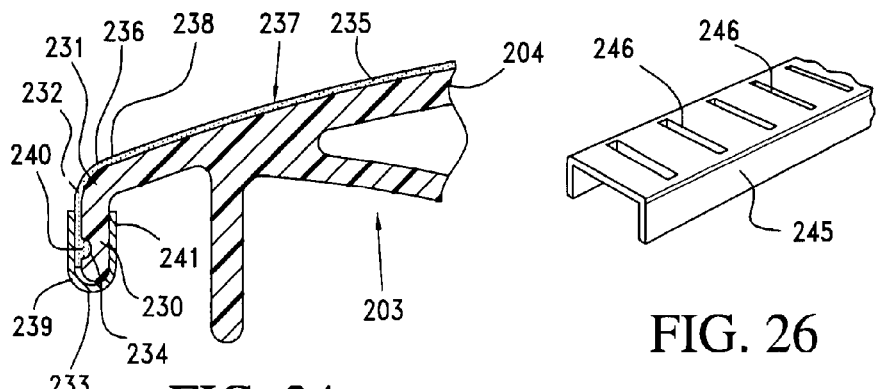
FIG. 24
FIG. 26
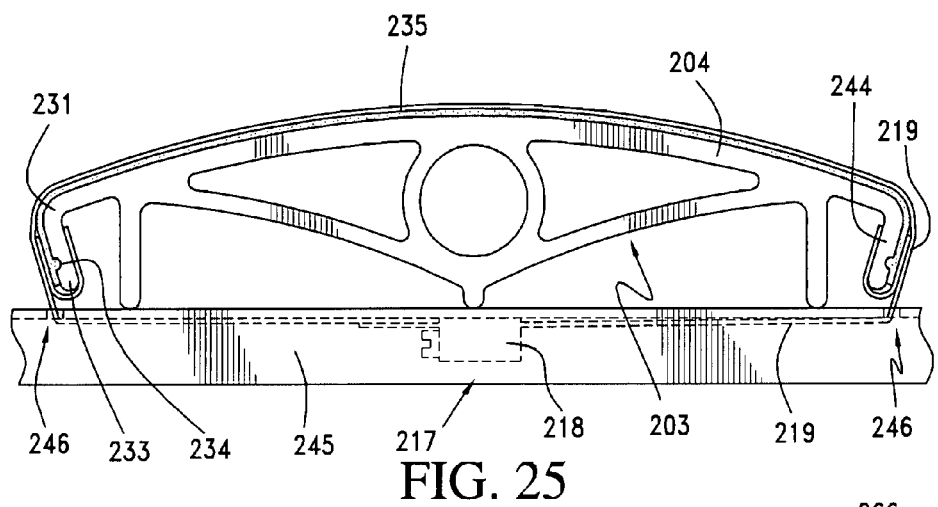
FIG. 25
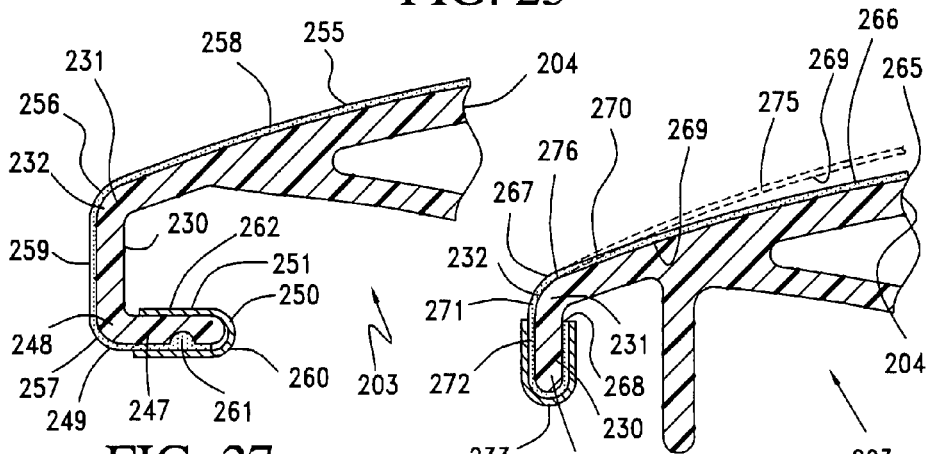
FIG. 27
FIG. 28

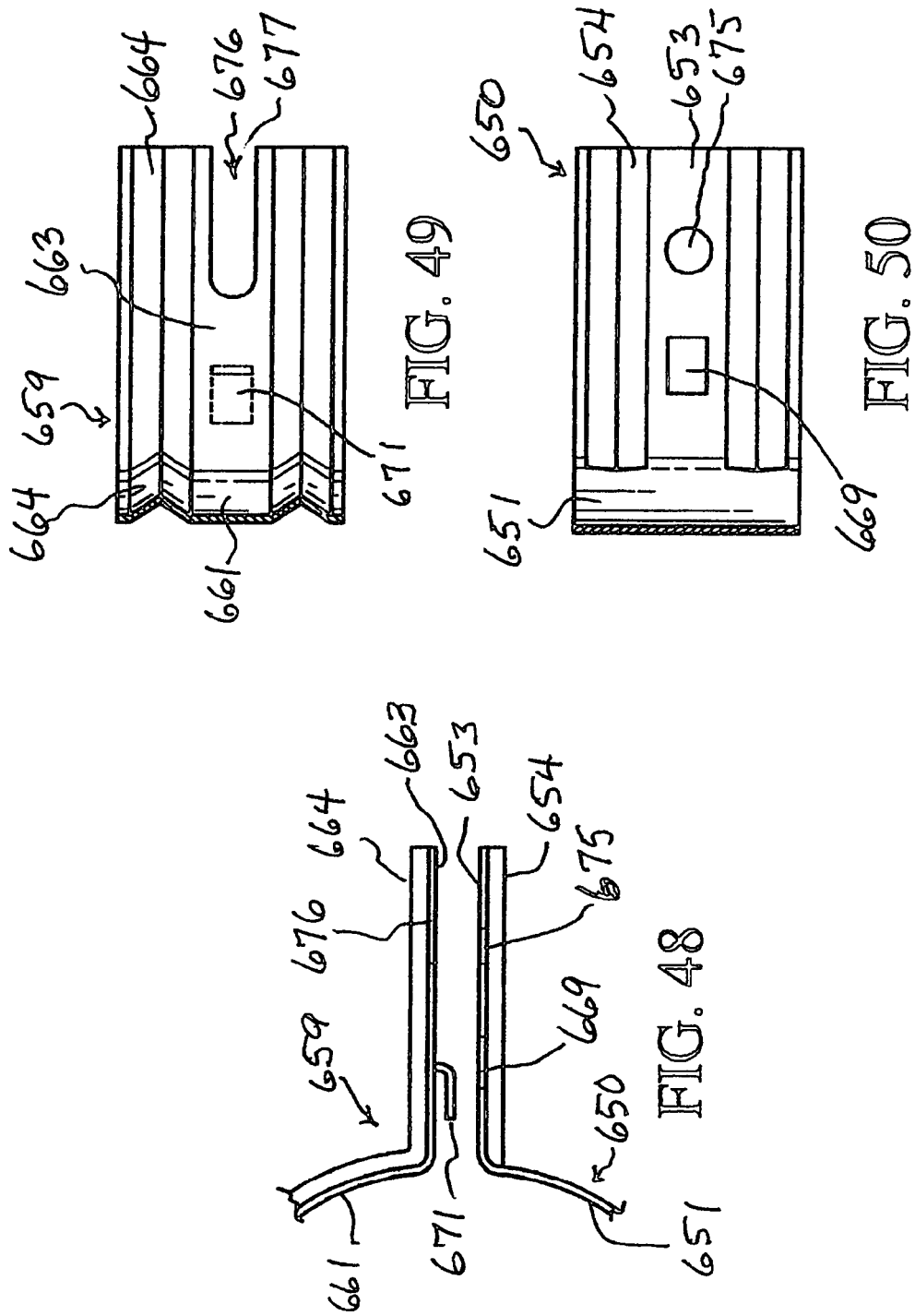

STRIP DIFFUSER

CROSS-REFERENCE TO RELATED APPLICATIONS

This application is a continuation-in-part application of U.S. Non-provisional Patent Application Ser. No. 11/649,345, filed Jan. 3, 2007 (now abandoned) and a continuation-in-part application of U.S. Non-provisional Patent Application Ser. No. 10/639,774, filed Aug. 13, 2003 (Issued as U.S. Pat. No. 7,255,333) which claims the benefit of the filing dates of U.S. Provisional Patent Applications Nos. 60/402,715 and 60/408,284, filed respectively on Aug. 13, 2002 and Sep. 6, 2002. The disclosure of each of said applications is incorporated herein by reference.

TECHNICAL FIELD

The present invention relates to membrane strip diffusers, to the diffusion of gases into liquids through membrane strip diffusers and to plants for such purpose. More particularly, it relates to membrane strip diffusers for wastewater treatment and to wastewater treatment plants including such diffusers.

BACKGROUND OF THE INVENTION

In treatment of domestic and industrial wastewater, aeration is one of the processes commonly used to promote biological consumption and removal of dissolved and suspended waste material. Aeration devices, called diffusers, are mounted at submerged locations in a man-made or natural wastewater impound, such as a tank or lagoon. Air and/or other treatment gas, in most instances composed of or containing some form of oxygen, is supplied to the diffusers in bulk and is discharged from them as multitudes of tiny bubbles. As these bubbles rise buoyantly through the wastewater, oxygen in the bubbles dissolves into the wastewater. Oxygen supports the life processes of bacteria, supplied to the wastewater in the treatment process, and these bacteria consume the waste. Other treatment gases (including vapors), and sometimes liquids, not necessarily containing oxygen, may be passed through the diffusers for a variety of purposes, such as for cleaning them.

Payments for electricity consumed by compressors or blowers that supply air and/or other treatment gas to the diffusers is one of the largest costs, if not the largest cost, of operating a wastewater treatment plant. Accordingly, much effort has been expended, by those working in this art, to enhance the efficiency of diffuser systems, including not only the diffusers themselves but also arrangements of and ways of operating diffusers within the plants. Moreover, efforts have been made to simplify, "ruggedize" and therefore reduce the capital and maintenance costs of diffuser systems. These efforts have led to a stream of improvements in wastewater treatment plant and diffuser design.

One popular type of diffuser that has been the focus of continuing research and development effort is the membrane diffuser. A membrane diffuser generates tiny gas bubbles by passing treatment gas into wastewater under pressure through a myriad of minuscule pores extending through relatively thin but tough rubbery material in the form of, for example, tubes, rectangular sheets, or disks that are of circular outline in plan view. These pored rubbery media, dubbed membranes, are typically secured in gas-tight relationship, e.g. by a clamping arrangement, to a suitable holder, referred to as a diffuser body.

FIGS. 1-5 depict one particularly popular type of membrane diffuser system which is available from ITT Corporation, Advanced Water Treatment (Sanitaire). FIGS. 1-2 show that in such systems there is a diffuser 1 which includes a body 2 having a saddle-shaped lower wall 3 secured to the upper surface of a gas supply conduit 4 of circular cross-section. The body also includes an inclined conical wall 5, the upper, inner edge of which includes a shelf 6, upon which rests support plate 7. Surrounding plate 7 is a vertical sidewall 10 of the body, an upward extension of shelf 6 having threads 11 on its outer surface. A threaded ring 12 having inwardly projecting flange 13 is installed on threads 11. Membrane 14 includes a central portion 15 and, at its periphery, an integral O-ring portion 16 which is held in sealing engagement with the underside of flange 13, the inner surface of sidewall 10 and a step 17 formed in a peripheral upper edge of plate 7.

In the operation of such a diffuser, treating gas flows from the interior 20 of gas supply conduit 4 through an orifice 21 in the crown of the conduit, acting as a flow regulator. The treating gas enters the diffuser through gas inlet port 22 in lower wall 3 of the body and then passes through a plenum 23 within the body, through a gas passage 24 in support plate 7, through a gas chamber 25 formed between the upper surface of support plate 7 and the lower, gas influent surface of membrane 14, which is inflated when gas is flowing through the diffuser, and finally through perforations 26 in the membrane.

FIGS. 3-5 to illustrate the installation of such diffusers in a wastewater treatment plant. These figures portray schematically a wastewater treatment tank 30 having sides 31 (only one of which is shown), ends 32 and bottom 33. With the aid of conventional stands (not shown) secured to tank bottom 33, a number of the previously mentioned gas supply conduits 4 are mounted close to the bottom in a parallel array. Large numbers of diffusers 1 are mounted at spaced intervals along the gas supply conduits 4, and those conduits are connected through manifold 34 and downcomer pipe 35 to a source of treatment gas under pressure, such as one or more blowers or compressors (not shown).

In many wastewater treatment plants, the wastewater passes through a series of tanks, for example as illustrated in FIG. 5. The density of diffusers, that is, the number of diffusers, and thus the amount of diffuser discharge area per unit of tank bottom area, can be varied from tank to tank or within a given tank, depending on the requirements of the wastewater and of the particular type of treatment being performed. In certain instances, portions of the tank may have no diffusers installed, thereby facilitating, for example, in an aeration plant, the creation of anoxic zones. As persons skilled in the art will readily understand, there are many different ways of laying out the diffusers and gas supply conduits in wastewater treatment plants, and the subject matter depicted in these figures represents merely a sample rather than a comprehensive illustration of prior practice.

The diffusers illustrated in FIGS. 1-5, when viewed in plan view, are of circular outline, and are thus referred to as membrane disk diffusers. The particular diffusers illustrated above provides very high performance in terms of system durability and OTE (oxygen transfer efficiency) and, as such, have achieved wide acceptance in many countries throughout the world.

Numerous other membrane diffuser designs have developed, including membrane tube diffusers, based on tubular membranes, and panel diffusers, based for example on rectangular sheets of membrane material. Typically, they permit a modest degree of inflation of portions of the membrane surfaces by the pressurized treatment gas. Because of the clamping of disk and sheet membrane edges, inflation occurs inward of those edges. Membrane disk diffusers may or may not be restrained against inflation at their centers. With the rectangular sheet membranes of panel diffusers, the area of the membrane and the resultant potential for inflation are often considerably larger than in the disks. Thus, some type of overlying grid member with relatively large openings in it is usually included in the diffuser body and held against the upper surface of the membrane to control the extent to which it inflates.

Whether as a result of unexpected power failures or intentional shut-off for process reasons, membrane diffusers can undergo interruption of gas flow, resulting in deflation of the membranes. In view of their submergence and the great weight of the wastewater bearing down on the membranes, membrane diffuser bodies ordinarily include some sort of membrane support beneath the membrane to prevent it from being damaged or displaced under the weight of the wastewater when the membrane is no longer supported by gas pressure. When gas is flowing and the membrane is under pressure and at least partially inflated, a space or gas chamber exists between the upper surface of the support and the lower surface of the membrane.

Another category of membrane diffuser that has evolved is the strip diffuser. For example see U.S. Pat. Nos. 4,029,581 and 5,868,971; U.S. Published Patent Application US2002/0003314 A1; International (PCT) Published Application WO 98/21151; and Offenlegungsschrift (German Published Application) DE 42 40 300 A1. The term strip is appropriate for these diffusers because their membranes and gas discharge surfaces generally have a length to width ratio larger than that found in the typical panel diffuser. For example, length to width ratios of about 4:1 or more, and in some cases considerably larger, can be found in strip diffusers.

Where there is this greater length to width ratio, it is possible to provide the diffuser with considerable aeration area while limiting its width. Diffuser area, utilized properly, can be a factor in attaining desired or increased levels of OTE (oxygen transfer efficiency), with resultant conservation of electricity during processing of a given amount of wastewater.

Manufacturing strip diffusers with extruded bodies is believed to be a promising approach for further reducing the capital costs, including those of installation, and the operating costs, of biological wastewater treatment plants involving aeration. However, attaining consistent body alignment, profiles and dimensions along the length of an elongated extruded strip diffuser body and dependable membrane end and edge sealing to the body have proven challenging. There is also a need for devices to easily, economically and adjustably secure strip diffusers in fixed position in liquid, e.g., wastewater, treatment vessels. It is thus believed that there is room, and a need for, further improvements in strip diffusers, and the subject matter of the present disclosure and claims is aimed at fulfilling these needs.

SUMMARY OF THE INVENTION

It is believed that one or more of the foregoing needs is satisfied in part by the present invention, which includes a number of aspects and embodiments to be described below.

One aspect of the invention is a strip diffuser comprising pipe having a longitudinally extending central axis, a longitudinally extending gas flow enclosing peripheral wall and, included in that wall, at least one elongated, thickened region integral with the pipe and extending in the same direction as the central axis. This aspect further comprises a membrane support member elongated in the direction of the central axis and having a connecting portion that is integral with the pipe and comprises at least one of said thickened regions. This support member also has at least one lateral portion that is integral with the connecting portion and extend laterally from the connecting portion and longitudinally with the connecting portion in the same direction as the pipe axis. A membrane diffusion element is also included. Elongated in the direction of the central axis, it has ends and longitudinally extending marginal portions which are connected in sealing engagement with the support.

The following preferred but optional particularized forms of or additions to the above aspect can be applied in any combination with the above aspect and each other.

In a strip diffuser according to the invention the connecting portion of the membrane support may for example comprise a single elongated, thickened region, or may comprise plural elongated, thickened regions.

Strip diffusers according to the invention may comprise single or plural lateral portions.

The membrane support connecting portion may be positioned at the apex of or elsewhere on the pipe. In a preferred embodiment, the membrane support has plural lateral portions positioned on opposite sides of the pipe apex.

In another preferred embodiment, at least part of at least one lateral portion has beneath it space that is in communication with the environment surrounding the diffuser.

At least part of at least one lateral portion may have beneath it space that is free of bracing connecting that part with the pipe.

In another preferred embodiment, the pipe is integral with the membrane support over approximately the entire length of the support.

The connecting portion of the support can be thicker than portions of the peripheral wall which adjoin it, outside the connecting portion.

In other preferred embodiments, the peripheral wall of the pipe has an inner surface, and the connecting portion is, when viewed in transverse cross-section along a portion of the length of the inner surface which the connecting portion adjoins, thicker than the remainder of the peripheral wall along most of the length, or combined length, as the case may be, of a portion or portions of the length of the inner surface which the remainder adjoins. More preferably, the connecting portion is thicker than the remainder of the peripheral wall along at least about 90% of the length or combined length of a portion or portions of the length of the inner surface which the remainder adjoins.

The pipe may be circular or non-circular in transverse cross-section, the connecting portion may be positioned at an upper portion of the pipe peripheral wall, and the wall may have at least one side portion, or two side portions, which is/are thinner than the upper portion.

The connecting portion can comprise a single thickened region at the pipe upper portion which, substantially throughout the length of the pipe, is thicker than most of the remainder of the peripheral wall along its periphery. Or the connecting portion can comprise two thickened regions spaced apart from one another as viewed in transverse cross section, and those regions, substantially throughout the length of the pipe, can be thicker than most of the remainder of the peripheral wall along its periphery.

In another preferred embodiment, along at least one lateral portion, extending laterally from a nexus at which that lateral portion is joined with said connecting portion to an outer edge of that lateral portion, that lateral portion is free of underlying bracing connecting it with the pipe.

There can be two lateral portions that, respectively, extend to the left and right of the connecting portion as viewed in transverse cross section and are free of underlying pipe-to-lateral portion connecting bracing from the location at which each lateral portion is joined with the connecting portion to an outer edge of that lateral portion.

Where there are two lateral portions that, respectively, extend to the left and right of the connecting portion as viewed in transverse cross section, there may be spaces underlying at least part of both lateral portions that are in open communication with the environment surrounding the diffuser.

The pipe can be of generally circular cross section having an apex, and the upper portion can include the pipe apex.

At least one thickened region and at least one lateral portion can have upper surfaces, and at least one lateral portion upper surfaces can extend generally horizontally from the at least one thickened region upper surface.

The membrane support can have a generally horizontal upper surface with at least one longitudinally extending edge that, as viewed in transverse cross section, comprises a curved edge surface that curves from the upper surface of the support outwardly and downwardly and then downwardly and inwardly to beneath at least one lateral portion, and the membrane diffusion element ends can be connected in sealing engagement with the support across the support upper surface by clamping bars which extend across those ends and about said curved surface by arcuate clamps.

The clamping bars and arcuate clamps can have inter-engaging, adjacent ends. These adjacent ends can have inter-engaging or meshed elements.

The support can have at least one longitudinally extending edge and the at least one lateral portion can comprise a longitudinally extending membrane securing groove.

Where there is a membrane securing groove, the groove can be inward of the edge.

In another optional groove embodiment, the support has an upper surface and the groove has a mouth which is located below that surface.

Where there is a groove, it can have a mouth located in the under-side of the at least one lateral portion.

In a particularly preferred groove embodiment at least one marginal portion of the membrane extends into the groove and is engaged there by a securing member.

When a marginal portion is so engaged, the strip diffuser may include a blocking member, secured to the support in or at the mouth of the groove, that obstructs the mouth of the groove.

In yet another particularly preferred groove embodiment the groove can be formed at least in part by a limb extending integrally from and longitudinally with the at least one lateral portion.

Where there is such a limb, it preferably extends generally downward from the at least one lateral portion.

Optionally, when there is such a limb, and when at least one marginal portion of the membrane extends into the groove and is engaged there by a securing member, a blocking member can be secured to the limb at the mouth of the groove that obstructs escape of the securing member.

In yet another embodiment, a J-shaped member can form at least a portion of the groove.

The diffuser may comprise, on or in a wall of the pipe, angularly spaced along the pipe peripheral wall from at least one membrane support lateral portion, at least one integral or non-integral projection, preferably extending longitudinally with at least a portion of, and more preferably throughout the length of, the pipe wall. Such projections project outwardly from the pipe wall to, for example, assist in supporting and/or securing the diffuser in relation to, e.g., in fixed position relative to, structure in or associated with a liquid impound, such as a wastewater treatment tank. Such a projection may optionally include portions relatively closer and further from the pipe outer wall and at least one further portion is thicker than or disposed at least one angle to a closer portion, e.g., hook-, T- or L-shaped in cross-section, which may for example assist in connection with the projection. The diffuser can be held in vertically and laterally fixed position in the liquid impound by a connection, e.g., a clamping or grasping connection, between the projection and structure in or associated with a wastewater aeration vessel. In a preferred embodiment which does not require such projections and may if desired employ diffusers with pipes free of projections, diffusers are connected with such structure by attaching members that engage the diffuser pipes below the membrane supports and/or engage connectors that connect adjacent series-connected diffusers, e.g., diffusers in strings.

In another aspect, the invention employs strip diffusers, in any combination of the above described forms, in a wastewater treatment plant comprising a water impound having the diffusers positioned and held in place therein. In a particularly preferred embodiment, such a plant utilizes strip diffusers comprising pipe having a longitudinally extending central axis, a longitudinally extending gas flow enclosing peripheral wall and included in that wall, at least one elongated, thickened region integral with the pipe wall and extending in the same direction as the central axis. Also included is a membrane support member elongated in the direction of the central axis and having a connecting portion that is positioned at an upper portion of the pipe, is integral with the pipe, comprises at least one of said thickened regions, and has an upper surface which includes an upper surface of the pipe thickened region. The membrane support member also has a plurality of lateral portions that are integral with the connecting portion and extend laterally from the connecting portion on opposite sides of the pipe apex and longitudinally with the connecting portion in the same direction as the pipe axis. The pipe is integral with the membrane support over approximately the entire length of the support. The peripheral wall of the pipe has an inner surface, and the connecting portion is, when viewed in transverse cross-section along a portion of the length of the inner surface which the connecting portion adjoins, thicker than the remainder of the peripheral wall along most of the length, or combined length, as the case may be, of a portion or portions of the length of the inner surface which the remainder adjoins. At least parts of the lateral portions have beneath them underlying open spaces that are free of braces connecting those parts with the pipe. The support lateral portions each have upper surfaces with longitudinally extending edges and longitudinally extending membrane securing grooves inward of the edges and having mouths located in the under-sides of the lateral portions below their upper surfaces. Also there is a membrane diffusion element elongated in the direction of the central axis, having ends and longitudinally extending marginal portions. The membrane is connected in sealing engagement with the support by the marginal portions of the membrane extending into the grooves and being engaged therein by a securing member. The diffuser also comprises gas injection passageway means extending from the pipe interior through its peripheral wall and through the surface of the membrane support for passage of gas from the interior of the pipe to a gas chamber present between the support upper surface and the gas influent surface of the membrane when the diffuser is in operation.

According to yet another aspect, the invention comprises strip diffuser sub-assemblies and wastewater treatment plants that contain them. These sub-assemblies comprise pipe with a longitudinally extending central axis and a longitudinally extending gas flow enclosing pipe wall having any of various cross-sections, for example circular, oval or square. The diffuser also comprises, in addition to the pipe wall, a membrane support member, integral with the pipe wall, that, as viewed in transverse cross-section, is partially defined, in a central region of the support member, by an upper portion of the pipe wall that extends above and across the pipe axis. The support member also comprises plural lateral portions that are positioned at, and extend laterally from opposite sides of, the upper portion of the pipe wall, and extend longitudinally with the pipe wall. Optionally, the sub-assemblies of this aspect are apertured for passage of gas through the support from within the pipe. Another option is to provide a subassembly comprising a limb member integral with the at least one lateral portion, extending with the lateral portion in the same direction as the pipe axis, dependent from the at least one lateral portion and forming a groove between itself and an adjacent surface of a lateral portion for insertion of a marginal portion of a membrane and of a longitudinally extending securing member. Strip diffusers can be assembled with a subassembly as above described, a support that is apertured for passage of gas through the support from within the pipe, a membrane diffusion element, a groove in the support having a marginal portion of the membrane secured therein by a longitudinally extending securing member and members for sealing the ends of the membrane to the support.

Preferably, the flexible membrane has a length to width ratio of at least about 4, more preferably at least about 6, still more preferably at least about 8, and most preferably at least about 10; gas influent and gas discharge surfaces; and gas discharge pores extending from said gas influent surface through said membrane and through said gas discharge surface across at least a portion of said gas discharge surface. Also, the diffuser preferably has a diffuser body including a longitudinally-extending membrane support member with a length to width ratio of at least about 4, more preferably at least about 6, still more preferably at least about 8, and most preferably at least about 10. Moreover, the pipe is preferably a longitudinally-extending gas supply channel that, when viewed in transverse cross-section, comprises peripherally closed gas flow confining wall means. The respective lengths of the membrane, support member and channel extend in the same general direction, and the support member and the membrane, at least when the diffuser is operating, define a longitudinally-extending gas chamber between them.

A number of other features, when combined with the foregoing, represent additional aspects of the invention. These various combinations, referred to hereinafter as embodiments, represent inventions in their own right.

For example, the above-described diffuser may or may not comprise a plurality of gas-injection passages, spaced longitudinally along the gas supply channel and extending from the interior of the gas supply channel through the membrane support member.

In certain preferred embodiments, these gas-injection passages are of sufficiently small flow cross-section to generate, during operation of said diffuser, sufficient pressure drop across said passages to contribute measurably to enhanced uniformity of distribution of gas flow among the respective passages, thus constituting flow regulating orifices.

In a refinement of any of the foregoing embodiments, the membrane has a gas discharge surface that, when the membrane is operating, is held by the diffuser body substantially within an envelope that, when viewed in a transverse cross-section of the body and membrane, has a base line that connects two points at which the gas chamber is widest horizontally, vertical side lines perpendicular to the base line at each of said points, and a top line, running parallel to, above and at a distance from the base line of about $\frac{1}{4}$, more preferably about $\frac{3}{16}$ and still more preferably about $\frac{1}{8}$, of the distance between the side lines. In a preferred version of this refinement, the base line connects two points at which the support member and a gas influent surface of the membrane contact one another at the edges of the gas chamber.

According to any of the prior embodiments, the diffuser comprises a flexible membrane of sheet material having sides and ends with longitudinal edges along its sides and wherein the gas discharge pores extend from said gas influent surface through said sheet.

In any embodiment, the support member may be substantially wider, at least about 1.5, or at least about 2 or at least about 2.5 times wider, than the gas supply channel, when both are viewed in transverse cross-section. However, in a more preferred embodiment, the support member may be up to about 2.5, more preferably up to about 2 and still more preferably up to about 1.5 times wider, than the gas supply channel, when both are viewed in transverse cross-section.

Preferably, in any of the foregoing embodiments, the diffuser body is of extruded material.

In any preceding embodiment, the gas supply channel may comprise longitudinally extending confining wall means in addition to but integral with the membrane support member.

In another embodiment, the diffuser body can have first and second longitudinal sides, and, at each of its sides, a fixed, first longitudinally-extending concave seal-engaging surface. Within a portion of the body adjacent each of said sides, there is a longitudinally-extending first, female securing member that appears as walls surrounding an open portion in the transverse cross-section of the body. There is also a second, male securing member comprising a second longitudinally-extending concave seal-engaging surface, and said second securing member further includes a portion which is insertable into the first securing member, and has a shape adapted to cooperate with the shape of the first securing member, when inserted therein, to hold the first and second concave surfaces in fixed positions, said first and second longitudinally-extending concave seal-engaging surfaces facing one another when the second securing member is inserted in the first securing member. The membrane of this embodiment includes, along each of its longitudinal edges, a sealing member having a shape and size adapted to sealingly engage with said first and second concave seal-engaging surfaces.

There are a number of optional preferred forms of this sealing embodiment. For example, the first and second longitudinally-extending concave seal-engaging surfaces may respectively face downward and upward.

In another of these optional but preferred sealing embodiments, the support member has an upper surface and the first longitudinally-extending concave seal-engaging surface is in a portion of the body that includes an extension of the support member upper surface and reaches outwardly and downwardly from that upper surface.

In any sealing embodiment, the second securing member, when viewed in transverse cross-section, may resemble, at least in part, the shape of the letter "J".

Moreover, the first securing member may comprise a slot extending longitudinally in the body, and the second securing member includes a portion that is insertable by longitudinal sliding motion into said slot. In a preferred version of the embodiment just described, means are provided to reduce friction during said sliding motion between: (a) any one or more surfaces of the second securing member and (b) any one or more areas of the first securing member and/or of the sealing member. Such means may be one or more layers, for example fluent, semi-solid or solid layers or solid members, of low friction material. Such layers are interposed between adjoining portions of said surfaces and of said areas and may optionally be adherent to portions of said surfaces or areas. Optionally, in any sealing embodiment, the second securing member extends through substantially the entire length of the slot.

In any form of sealing embodiment, the first and second longitudinally-extending concave seal-engaging surfaces may be arcuate surfaces and the sealing members of the membrane may include O-ring seals extending along longitudinal edges of the membrane.

There is a group of so-called "depression embodiments" which may basically include the features of any previously-described aspect or embodiment, preferably the first aspect, and which may include additional features. In the depression embodiments, a plurality of gas-injection passages are spaced longitudinally along the gas supply channel and extend from the interior of the gas supply channel through the membrane support member, the membrane support member has an upper surface for supporting the gas influent surface of the membrane when the diffuser is not in operation, a depression extends longitudinally in said upper surface, and at least a portion of the gas-injection passages have outlets positioned to communicate with the interior of said depression.

In a number of optional depression embodiments, a plurality of said outlets open into said depression.

In any depression embodiment, the depression, as viewed in transverse cross-section, may comprise rectilinear surfaces and/or an arcuate surface and/or surfaces of other shapes.

Moreover, in any depression embodiment, the depression may be sufficiently narrow in the transverse direction and the membrane may be sufficiently resistant to stretching in the transverse direction, so that the membrane does not collapse against such outlets when the gas discharge surface of the installed diffuser is under hydrostatic pressure but the diffuser is not in operation, whereby the gas influent surface of the membrane does not block said outlets during startup of the diffuser.

In any depression embodiment, the depression may extend longitudinally in the upper surface of the support member, membrane end-sealing and securing members may be are positioned at the ends of the membranes, and the membrane end-sealing and securing members may include convex portions which, as viewed in transverse cross-section, are sufficiently compatible in profile to the depression for exerting downward pressure on the membranes within the depression, thereby inducing transverse tension in the membrane at said ends for assisting in sealing the membrane at its ends.

Any of the previously described embodiments may be supplied with or without membrane end-sealing and securing members positioned at the ends of the membranes.

Particularly preferred end sealing arrangements, useful in any embodiment of the invention, employ urging the membrane toward the support with a band of elastomeric material, extending across the membrane at its end. Optionally, the sealing action of this band may be assisted by adhesive bonding of the underside of the membrane to the upper surface of the support and/or by a supplemental band, e.g., of metal, installed across the upper surface of the elastomeric band.

Optionally, any of the foregoing embodiments are supplied with longitudinal membrane edge-sealing and securing members extending lengthwise of said support members and membranes, and membrane end-sealing and securing members positioned at the ends of the membranes.

Particularly preferred optional forms of any foregoing embodiment comprise longitudinal membrane edge-sealing and securing members extending lengthwise of said support members and membranes, and have first surfaces in contact with said membrane and second surfaces not in contact with said membrane, and membrane end-sealing and securing members positioned at the ends of the membranes. At least portions of said end-sealing and securing members bear against the second surfaces of the edge-sealing and securing members. These are referred to below as securing embodiments.

In any securing embodiment, the end-sealing and securing members may optionally bear against the edge-sealing and securing members in a direction toward the membrane support member upper surface.

Another securing embodiment option has the end-sealing and securing members, in the installed diffuser, bearing at least in part downwardly against the edge-sealing and securing members.

There are "protrusion embodiments" which are optional modifications of any of the above embodiments. In one example of these, the diffusers have protrusions from one or more surfaces of the membrane at its longitudinal edges that extend along the length of the membrane and also have grooves having transverse cross-section complementary to the protrusions on a surface or surfaces that is/are part of the support member or extensions thereof. The protrusions and grooves cooperate to at least assist in securing and/or sealing the membrane to said surface of the support member or extension thereof.

In another protrusion embodiment, the membrane support member has longitudinal edges and there are protrusions from a surface of the support member or of extensions thereof, said protrusions extending along the length of said support member or extensions, and the protrusions contact and compress the membrane in the vicinity of such contact to at least assist in securing or sealing the membrane to a surface of the support member or extensions thereof.

According to a number of "skirt embodiments", which may be based on any of the previous embodiments, the membrane support member comprises an upper surface and extensions in the form of longitudinally extending skirts that depend from the sides of said upper surface, these skirts respectively having membrane-contacting surfaces that are inclined downwardly from portions of the upper surface which they adjoin, preferably by at least about 30 degrees, more preferably at least about 45 degrees, and still more preferably at least about 60 degrees. A number of optional and preferred modifications of the skirt embodiments are described below.

The membrane support member may have an upper surface portion adjoining the skirt which, in the installed diffuser, is generally horizontal.

The skirt, in the installed diffuser, may be generally upright.

Optionally, the membrane support member has an upper surface portion adjoining the skirt which, in the installed diffuser, is generally horizontal, and the skirt, in the installed diffuser, is generally upright.

According to a further option, the upper surface and the membrane-contacting surfaces of the skirts are connected with one another through transition surfaces that, as viewed in transverse cross-section, provide gradual change in direction between the connected surfaces. For example, the transition surfaces may be generally curved.

In yet another skirt embodiment, the skirts have outer membrane-contacting surfaces, and the membrane support members comprise further extensions in the form of longitudinally running strips attached to the skirts, which strips, as viewed in transverse cross-section, have undersurfaces that are angled relative to the membrane-contacting surfaces of the skirts, and are positioned below that portion of the membrane support member in which the support member upper surface is located.

Another aspect of the invention includes gas diffusion systems for distributing gas in the form of bubbles into a liquid. These systems may comprise a tank having a bottom and upwardly extending sides for holding the liquid, a pipe grid, located substantially below the intended level of the surface of the liquid in the tank. The grid may include one or more manifolds and one or more branch conduits that are in communication with the manifold(s) to receive flowing gas therefrom and that have peripherally closed wall means to receive, confine and convey said flowing gas. The branch conduits of the system comprise plural pipes, membrane supports and membranes in accordance with the first-described aspect of the invention, having a length to width ratio of at least about 4, more preferably at least about 6, still more preferably at least about 8, and most preferably at least about 10, having the long dimensions of the respective support members oriented in the same general direction as the lengths of the branch conduits, and having longitudinally-extending gas-confining wall means in addition to the membrane support members. The pipes supply flowing gas to the diffusers. The support members and membranes form, at least when the diffusers are in operation, longitudinally-extending gas chambers that represent gas spaces in addition to the spaces in the interiors of the branch conduits and provide gas to the gas discharge pores. Plural gas-injection passages may optionally be present in the diffuser at longitudinally spaced positions along the branch conduits, may extend through the wall means of the conduits, may provide communication between the interiors of the conduits and the gas chambers, and a plurality of gas chambers may each be served by a plurality of said passages spaced along the lengths of those chambers.

In such a system, the liquid may be wastewater, which may contain suspended solids, the gas may be oxygen-containing gas and the tank may be an aeration tank of a wastewater treatment plant.

The system preferably comprises a plurality of branch conduits connected to one or more manifolds, with a plurality of said branch conduits each including a plurality of said diffusers. The longitudinally-extending gas-confining wall means may represent portions of the branch conduits of the pipe grid.

Yet another embodiment of the system may comprise longitudinal membrane edge-sealing and securing members extending lengthwise of said support members and membranes and membrane end-sealing and securing members positioned at the ends of the membranes, at least portions of said end-sealing and securing members bearing against said edge-sealing and securing members.

In another optional but preferred embodiment, the end-sealing and securing members bear inwardly against said edge-sealing and securing members.

In still another optional but preferred embodiment, the end-sealing and securing members bear downwardly against said edge-sealing and securing members.

Other embodiments, described below, are believed to represent additional inventions.

Advantages

It is an advantage of the invention that a gas supply conduit is an integral part of the diffuser. This eliminates a potential source of labor at the diffuser manufacturer's plant or the installation site, in that diffuser bodies need not be secured to the gas supply conduits at either location. Solvent welding, a method favored in practice for securing plastic parts at installation sites, has some disadvantages which are thus avoided. The cost of and need for either solvent-, vibration- or sonic-welding, which are suitable methods for uniting the separately formed pipes and bodies of some embodiments of the invention in manufacturing facilities, are avoided when pipes and bodies are integrally formed.

Unlike certain prior art strip diffusers, the integral-pipe embodiments of the invention respectively provide, as made at the factory, or as installed, a confined gas flow path which is separate from that in the gas chamber immediately beneath the membrane, a path which is divided from the chamber which includes the gas influent surface of the membrane. Where there are plural, e.g., two or more, gas-transmitting connections between the confined flow path and the chamber, it is possible for the chamber and membrane to be fairly long and yet still receive and discharge treatment gas throughout most and preferably all of the length of a relatively low back-pressure membrane. This can potentially reduce manufacturing and installation cost as compared with state-of-the-art membrane strip and membrane disk diffusers.

Let us consider for a moment plant designs involving plural strings of diffusers, which strings are connected to a common manifold and in which at least a portion and preferably a majority of the strings contain plural strip diffusers, such as in designs corresponding in principle to that of FIG. 6. The presence in individual diffusers of plural gas-transmitting connections between their gas chambers and the confined flow paths within their integrally- or separately-formed gas supply conduits can be particularly beneficial in promoting discharge of treatment gas along most or all of the lengths of the membranes in the diffuser strings.

Moreover, in certain particularly preferred embodiments of the invention there are gas-transmitting connections between the confined flow path and the chamber that include orifices of restricted flow cross-section that are arranged at spaced intervals along the diffuser's length. If sufficiently restricted, these orifices can afford an opportunity for enhanced uniformity of distribution of treatment gas along the length of the chamber. This may in turn provide a resulting possibility of enhanced diffuser efficiency over certain prior art disk and/or strip diffusers. This potential benefit may be of particular value in plants having plural strings containing plural diffusers, including plural strings of this type fed from a common manifold, as discussed in the preceding paragraph and illustrated in FIG. 6.

When the conduit is formed integrally with the membrane body, the pipe can contribute considerable mechanical strength and stability to the resultant combination. Some prior art strip diffuser systems include gas supply conduits that run perpendicular to the lengths of the bodies. As compared to these, the preferred embodiments of the present invention have gas supply conduits, whether separately formed or integral conduits, the longest dimensions of which run in the same general direction as the lengths of the bodies and membranes. The extent to which these preferred diffusers of the present invention extend laterally from the locus at which the bodies are connected with the gas supply conduits need not be so great as in the perpendicularly-oriented diffusers. As a consequence, these preferred embodiments, at their extreme lateral portions, do not represent nearly as long lever arms by which destructive forces may be imposed on the connections between conduits and their separately formed or integral bodies, whether imposed, e.g., by currents within an operating wastewater treatment tank or inadvertently by persons working in the tank.

Bodies and membranes of disk diffuser systems are conventionally made by batch-type forming operations, such as die molding. On the other hand, the present invention affords an opportunity for making membranes, supports and integral gas supply pipes by continuous methods, for example any of the various types of extrusion, with attendant production economies.

Diffuser systems constructed according to the invention can, in certain embodiments, be easily assembled in factories for condensed shipment. Systems according to the invention can also offer the advantage of easy and quick installation in wastewater treatment plants and other facilities.

The invention lends itself well to installation of strip diffusers in series comprising two or more diffusers installed in end-to-end relationship and to the creation of modular product lines.

When products according to the invention are formed by extrusion, it then becomes quite convenient to custom-design aeration systems to variable lengths.

Strip diffusers according to the invention, at least in their most preferred embodiments, may offer levels of oxygen transfer efficiency that are high enough, when coupled with their potentially high gas discharge area per unit floor area, to provide a lower, and thus better, cost to benefit ratio than membrane disk diffusers.

All embodiments of the invention will not necessarily have all of the above advantages, nor the same combinations of advantage. Moreover, users, manufacturers and other persons skilled in the art may identify, through the present disclosure and/or through experience with the invention, some embodiments that inherently include advantages not discussed above.

BRIEF DESCRIPTION OF THE DRAWINGS

FIGS. 1-5 disclose prior art.

FIG. 1 is a view, partly in section, of a known disk diffuser.

FIG. 2 is an exploded view, in perspective, of the diffuser of FIG. 1.

FIG. 3 is a schematic, longitudinal cross-section of a wastewater treatment tank containing many diffusers like that of FIGS. 1 and 2.

FIG. 4 is a schematic plan view of the tank of FIG. 3.

FIG. 5 is a schematic plan view of a series of three tanks similar to that of FIGS. 3 and 4, arranged for sequential flow of wastewater and having progressively diminishing diffuser density.

FIG. 8 is a side view, foreshortened, of the body of yet another form of strip diffuser.

FIG. 9 is a perspective view of the strip diffuser body of FIG. 8.

FIG. 10 is a sectional view taken on section line 10-10 of FIG. 9.

FIG. 11 is an exploded transverse cross-section of the diffuser body of FIGS. 8-9, also showing a diffuser supporting rack, a membrane, and an end clamping and sealing arrangement.

FIG. 12 is a transverse cross-section of a portion of the diffuser of FIG. 11 showing an edge securing and sealing arrangement therefor.

FIG. 13 is a perspective view of an array of diffusers of the type illustrated in FIGS. 11-12.

FIG. 14 is a foreshortened side view of a series of diffusers of the kind shown in FIG. 11-12 or 11-13, connected end-to-end in series.

FIG. 15 is an exploded end view of a modification of the diffuser of FIG. 11-12 or 11-13, showing an alternative form of end clamping and sealing arrangement FIG. 16 is a sectional view taken along section line 16-16 of FIG. 15.

FIG. 17 is a partial top view of the clamp of FIG. 15 between reference lines 17-17 of FIG. 15.

FIG. 18 is a perspective view and partial section of a modified form of a diffuser body according to FIG. 11-12 or 11-13 having gas passageways arranged in a channel.

FIG. 19 is a perspective view and partial section of a yet another modified form of a diffuser body similar to that of FIG. 18 but having a channel with a different cross-section.

FIG. 24 is a partial transverse cross-section of a modified version of the diffuser of FIG. 20 having downwardly extending skirts at the sides of its support member.

FIG. 25 is an end view of a diffuser similar to that of FIG. 24 in which the skirts are inclined inwardly, and also shows an end clamping and sealing arrangement and supporting rack.

FIG. 26 is a partial view, in perspective, of the rack of FIG. 25.

FIG. 27 is a further modification to the diffuser of FIG. 24 in which the skirts support inwardly directed flanges.

FIG. 28 is similar to FIG. 24, except that phantom lines show the membrane in inflated condition.

FIG. 48 is an exploded view of portions of the strap and of the hold-down clamp at the right side of FIG. 47, and of their respective lateral projections.

FIG. 49 shows the top of the lateral projection of the hold-down clamp of FIG. 48.

FIG. 50 shows the top of the lateral projection of the strap portion of FIG. 48.

VARIOUS AND PREFERRED EMBODIMENTS

Figures 1, 2:
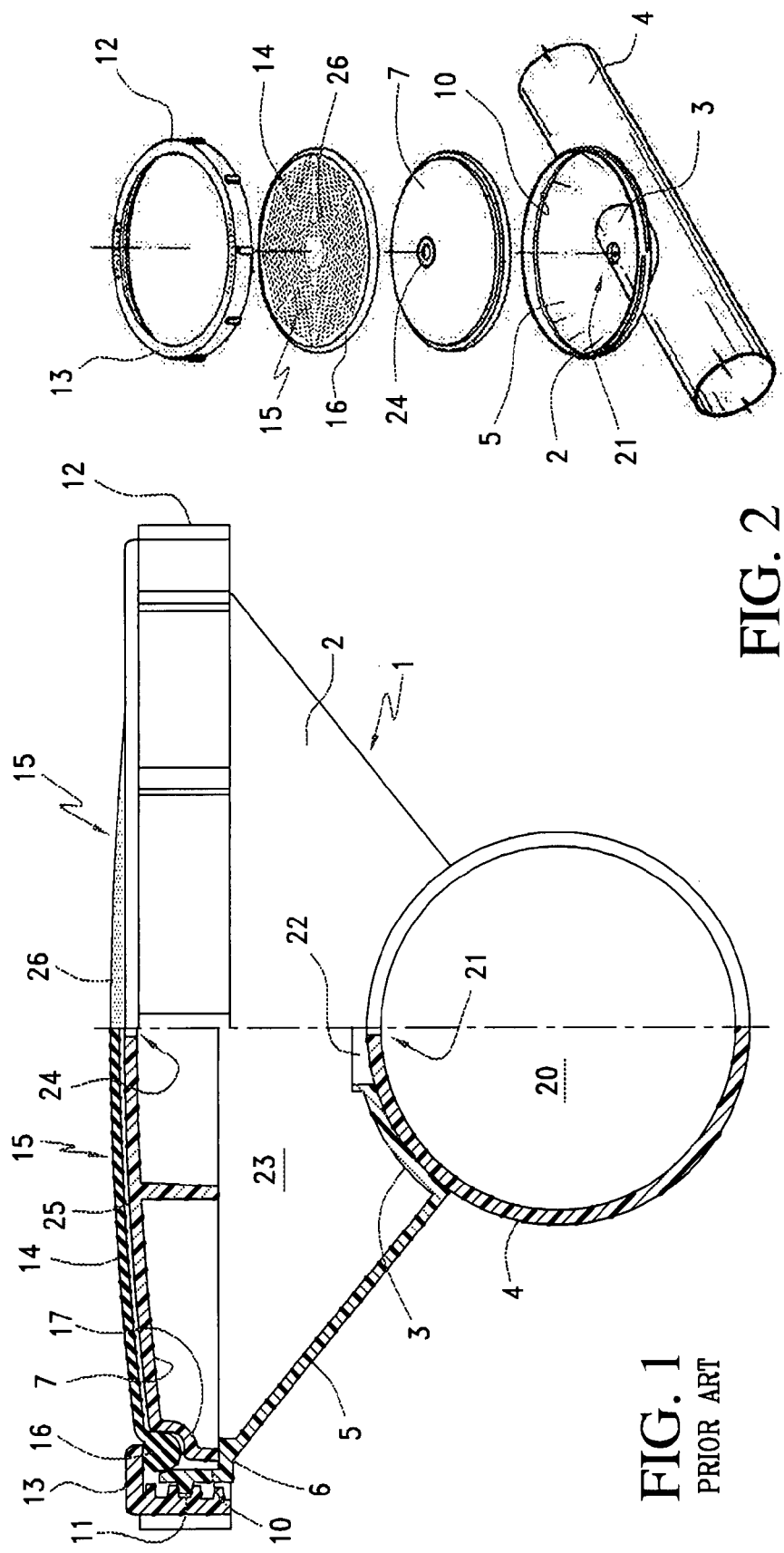

Where the description and claims herein refer to apparatus or process elements in the singular, this is also intended to include the plural, where such is feasible in light of the nature of those elements. Subject to the same condition, mention of such elements in the plural is intended to include the singular.

The invention is useful in diffusion systems, i.e., systems intended to discharge fine bubbles of gas, and possibly some added liquids and/or vapors, into bodies of liquids, which bodies may include solids or other gases, through membrane diffusers.

Thus, the invention is applicable to any process requiring introduction of fine bubbles of gas into liquid, for example, simple discharging of gas into liquid for any purpose which does not necessarily involve chemical reaction between the gas and liquid, for example gas stripping, gas dissolving, floatation processes, prevention of freezing and fish farming.

This invention may also be used in charging gas into liquid in support of any kind of chemical reaction with and/or within the liquid, for example neutralizing, acidifying, basifying, killing bacteria, e.g., in potable water treatment and/or supporting bacterial action, for example, in fermentation (e.g., yeast production) and in biological wastewater treatment of any kind, e.g., BOD (biochemical oxygen demand), phosphorous removal, nitrogen removal, aerobic and/or anaerobic digestion of suspended or dissolved waste, especially by the activated sludge process. A particularly preferred embodiment is wastewater treatment processes involving, at least in part, aeration, in which gas is discharged into wastewater containing suspended and dissolved solids and in which at least a portion of the gas so discharged is oxygen-containing gas such as air.

The liquid under treatment may include any process material that requires such treatment. Among these are aqueous liquids such as for example wastewater, potable water, pickle liquor and other liquids. The solids that may be present in the liquid involved in the gas treatment may include for example ores, silt and other sediments, bacteria and other living creatures. Virtually any gas may be discharged through the diffusers and/or may be present in the liquid receiving gas from the diffusers. These include oxygen-containing/yielding gases such as oxygen, air, oxygen-enriched air and ozone, and other "gases" (including vapors) such as chlorine, nitrogen, steam and other forms of water vapor.

According to one embodiment, the gas discharged from the diffusers may contain a mist of entrained tiny droplets or vapors. Such droplets or vapors may for example be composed of a normally liquid material, such as alcohols, other solvents and/or hydrochloric, acetic or formic acid, and optionally may be present for the purpose of alleviating or preventing clogging of the diffusers.

Diffusion systems include among their basic components any suitable gas source to supply gas to be discharged from the diffusers. This may for example include a tank, a gas generator or the atmosphere.

A gas propulsion system, which may be of any type, and which induces the gas to flow under pressure toward the diffusers from which it is discharged, is in most cases also provided. This may for example include positive displacement compressors or, preferably, centrifugal blowers.

Where needed, there will be gas purification equipment, such as gas supply filters (e.g., inlet gas filters to clean atmospheric air entering blowers) and/or outlet filters (e.g., oil filters at compressor outlets to catch oil thrown off by compressors).

Such systems will ordinarily include a liquid impound of any type, for example, a natural body of water such as a lake or pond. More typically, the water impound will be man-made, such as a lagoon, e.g., with one or more floating grids each comprising multiple diffusers, which grids may be anchored and/or removable. In most instances, and preferably, these impounds will be tanks of metal or, preferably, of concrete.

Gas will be conducted from the gas propulsion system to the liquid impound through delivery piping. Such piping usually includes above- or below-ground yard piping, that conveys gas from the gas propulsion system to a tank. Yard piping may be of synthetic resin but preferably of stainless steel. The delivery piping also ordinarily includes downcomers, which may be of synthetic resin but are preferably of stainless steel, and convey gas from the yard piping down through the liquid surface to a submerged grid system.

Grid systems will ordinarily include manifolds, of synthetic resin or stainless steel, from which emanate diffuser gas supply conduits. While the manifolds and gas supply conduits may be of stainless steel, they are preferably of synthetic resin. A preferred form of gas supply conduit is formed of rigid PVC and complies with the properties of ASTM D3915, cell 124524.

A particularly preferred embodiment is floor-mounted grid diffuser systems, in which stands of metal (such as stainless steel) or other material are attached to the floor of a tank and support synthetic resin manifolds and supply conduits horizontally a short distance above the floor with the gas supply conduits running generally perpendicular to the manifolds and generally parallel to one another and to the liquid surface. However, the invention may be employed in virtually any other kind of arrangement, for example swinging rack-mounted diffuser systems, in which a diffuser-supporting rack may be lifted from the impound, usually a tank, for servicing of the diffusers, or, by way of further illustration, diffuser systems in which at least portions of the gas supply conduit may be fixedly embedded in the floor of a tank.

As is typical in diffuser systems, whether of the floor-mounted type or otherwise, diffusers for discharging gas bubbles into the liquid in the impound are associated with the gas supply conduits and are distributed through at least portions of the impound. In common with known strip diffusers, the diffusers of the present invention comprise structural members, which may be referred to as the body of the diffuser. The bodies typically include elongated membrane support members, and means to receive gas into the diffusers and to deliver the gas to a gas influent surface of the membrane. In the present invention, at least portions of the gas supply conduits and at least portions of the diffuser bodies are associated with one another in one or more novel ways.

One of the novel features of the invention is the directional relation of membrane supports to the supply conduits. Their long dimensions extend in the same general direction. Throughout a substantial portion of their respective lengths, the membrane supports and the supply conduits have a connective relation such that the membrane supports are integral with the supply conduits. The number relation of membrane support members to supply conduits may be, respectively, one to one, plural to single, single to plural and plural to plural. One may provide any desired spatial relation between the membrane supports and the supply conduits. For example, the supports may be mounted above, e.g., on the crown of the conduit, and/or below, e.g., at the base of the conduit, and/or to the side (e.g., extending laterally), e.g., cantilevered from the conduit.

Bodies may be designed with a wide variety of overall shapes, as viewed in transverse cross-section. Extrusion of the body affords considerable freedom in selecting cross-sections. Preferably, a single membrane support member is arranged symmetrically relative to the central axis of, and at an upper portion of, an integral gas supply conduit. In certain embodiments of the above type, the space to either side of the conduit or attachment member is open.

Non-symmetrical designs are possible. For example, the membrane support member, viewed as specified above, is not arranged symmetrically relative to the central axis of the gas supply conduit, e.g., "side-saddle" arrangements in which the support member is partially or fully offset to the side of the conduit. Designs with plural supports and membranes mounted on a single gas supply conduit may be used. Designs with plural conduits and plural sets of supports and membranes are also contemplated.

In any of the embodiments of the invention, the membrane support member may take a wide variety of forms. As viewed in transverse cross-section, it may be "monolithic", signifying that it is formed in a single solid layer. Optionally, it may comprise spaced upper and lower layers with "bracing" between them of truss, honey-comb or other configuration. These layers may vary in thickness and may include reinforcing fill between them to enhance their rigidity.

That portion of the support member surface which actually supports the membrane may have different shapes, as viewed in transverse cross-section. In a given support member, such portion may be substantially planar or substantially arcuate, or may include sections of planar and arcuate character. The surface may be relatively plain or complex. For example, protrusions, grooves, channels or other convex or concave surface features may be present for any useful purpose, e.g., for assisting in sealing, and/or securing, the membrane to the support. For the same or other purpose(s), these surface features may be shaped to engage features of complementary shape on the membrane.

Preferably, the membrane-supporting surface portion of the membrane support member has a substantially arcuate surface with any suitable radius of curvature. This arcuate surface may be of variable or constant radius. Preferably it has one or more long radius or radii throughout at least about 70%, more preferably at least about 80%, still more preferably at least about 90% and most preferably substantially all of the transverse distance interval over which the membrane is supported when not in operation. Within this major part, the radius/radii is/are preferably at least about 8, more preferably at least about 10, still more preferably at least about 12, and, in a particularly preferred embodiment, approximately 18 inches.

At least one and possibly more potential benefits can flow from having an arcuate membrane support. When the support has an arcuate upper surface, it can facilitate better securing/sealing of the membrane. A support member with an arcuate overall shape, increases the dimension of that member along its "y" axis, thus increasing the stiffness or longitudinal axis bending modulus of the part. This in turn improves the longitudinal bending resistance and strength of the diffuser body as a whole.

Other components may be included in or appended to the membrane support members for any suitable purpose. For example, legs or skirts may depend from one or more locations, such as at the longitudinal edges of the support member, to strengthen the body and/or assist in securing or sealing the membrane to the body. Such legs or skirts may be oriented substantially vertically or may be inclined inwardly, i.e., toward a central axis of the body, or outwardly, i.e., away from such axis. Skirts or extensions of them may also be turned inward and substantially horizontal.

The angle between the membrane contacting surfaces of the skirts and the adjoining portions of the membrane support upper surface is preferably a downward angle of at least about 30 degrees, more preferably at least about 45 degrees and still more preferably at least about 60 degrees.

The skirts and/or the extensions thereof may also include surface features for assisting in sealing, and/or securing the membrane to them. For the same or other purpose(s), these surface features may be shaped to engage features of complementary shape on the membrane.

If the membrane will extend in the above-described manner from an upper surface of the support member, which could be substantially horizontal, onto a skirt or other side portion, which could be substantially vertical, it is preferred that there be a transition surface extending from the upper surface to the side surface and extending longitudinally along the sides of the support surface. As viewed in transverse cross-section, this transition surface may be smooth, e.g. arcuate, or stepped, e.g., polygonal, with or without ridges or other surface features such as could be used to assist in sealing. Preferably, both the support surface and transition surfaces are arcuate. Also, the transition surface radius is preferably a fraction of the support surface radius, e.g., about ¼ or less, preferably about ⅐ or less and still more preferably about ⅒ or less of the radius of the adjacent portions of the upper surface of the support member.

Still other body configurations and components, not illustrated or discussed herein, may be employed without departing from the spirit of the invention.

The diffuser body may be made with or without reinforcement, e.g., oriented or unoriented fibers, mesh or cloth embedded in a synthetic resin from which the body is formed. Diffuser bodies useful in the invention may be made by any suitable process, such as lay-up, spray-up, injection molding and extrusion processes. It is an advantage of the invention that the above-described directional relation of the gas supply conduit and the membrane support member renders these bodies amenable to formation by extrusion, for example, conventional extrusion, pultrusion, e.g., in the form of PFG (pultruded "fiberglass") and co-extrusion (e.g., as in extrusion in the same part from plural materials forming an outer high strength layer and a lower strength, less costly core).

Any synthetic resin providing appropriate strength and durability may be used to form the diffuser body, for example PVC (polyvinylchloride, preferred for extrusion), polyester (preferred for pultrusion), ABS (acrylonitrile-butadiene-styrene), ABS with PVC skin and ABS with ABS skin. Some illustrative but not limiting properties for PFG resins include: flexural modulus, $2\text{-}2.8\times10^6$ psi; tensile strength (1,200,000+ psi); and temperature resistance (heat deflection), >350 F. Other resins may be used. The resins may contain a variety of additives, such as fillers (e.g., $TiO_2$), plasticizers, free-radical inhibitors and UV stabilizers.

Extrusion represents a particularly convenient way of forming certain combinations of diffuser body elements useful in virtually any type of strip diffuser arrangement but particularly useful in above-floor devices. More particularly, extrusion facilitates providing in a strip diffuser a longitudinal gas supply conduit that is at least in part and preferably substantially entirely integral with the diffuser body.

Also facilitated is furnishing the combination of an elongated gas supply conduit and an elongated membrane support member, which gas supply conduit is integral with the support member over at least about half, preferably at least about ¾ and more preferably at least approximately the entire length of the support. Each of these ranges includes the possibility that part of the support could be cut away to render the conduit somewhat longer than the support and/or other body components at one or both ends of the body. Most preferably, the conduit and support are the same length.

Extrusion also facilitates furnishing an elongated gas chamber between an elongated diffuser membrane and an elongated support member of a diffuser body, which chamber overlies a diffuser body segment having a gas supply conduit within it that runs at least about half, preferably at least about ¾, more preferably approximately the entire length of the chamber. Thus, it is convenient to form by extrusion the body of a diffuser in which there will be a gas chamber having a length similar to that of a gas conduit, e.g., gas supply conduit, in the diffuser body.

When forming a diffuser by extrusion, it is unnecessary to have a gas supply conduit separate from the diffuser within a distance interval traversed by the body segment, thus reducing or eliminating the need for contractors to acquire pipe in local markets.

With extrusion, the gas chamber and the gas supply conduit may be elongated in generally the same direction.

In a diffuser having an extruded body, the gas chamber may extend in an uninterrupted fashion throughout a distance corresponding to at least a major portion of the length of the gas conduit. However, the length of the chamber may exceed the length of the gas conduit or vice versa, for example when a portion of the length of either is cut away after extrusion.

Extrusion is also a convenient way of forming diffuser bodies which include a plurality of gas supply conduits for each membrane support member. If necessary or desirable, two or more of these conduits may have their own sets of gas injection passages communicating with the gas chamber of a diffuser. Plural gas supply conduits afford opportunities for supplying a membrane with different gases, vapors or liquids, whether simultaneously or at different times, through the several conduits. For example, one such conduit could supply aeration process gas continuously or intermittently to the gas chamber, while another conduit in the same diffuser could supply cleaning fluid to the same chamber, continuously or intermittently, for cleaning the membrane. Or the several conduits may each be used to supply the same gas, or the same mixture of gas or gases with entrained liquid(s) and/or vapor(s), to the same membrane at the same or different times. Moreover, one or more of the plural conduits may be flooded to at least partly counter any buoyancy in the diffuser.

Bodies of diffusers according to the invention also include gas injection passages of any suitable shape or form, extending from the interior of the gas supply conduit through the membrane support member. They may, but need not be, located at longitudinally spaced intervals along the gas supply conduit; for example, they may be located on the horizontal centerline of the support, and/or they may be located along one or more lines other than the centerline, whether extending parallel or at one or more angles to the centerline, or on no line, e.g., they may be randomly distributed.

These passages transmit gas from the interior of the gas supply conduit to the gas chamber. Injection passages may have flow cross-sections that are of any suitable shape, for example, round, oval or rectangular, and may be fixed or variable in shape and/or size. If fixed, these passages will ordinarily be formed by hot or cold punching or drilling after extrusion of the structure of the body. If variable, the passages may be provided with variable-opening valves, such as flappers or elastomeric "duck-bills" at their outlets.

In a particularly preferred embodiment, the gas-injection passages are of sufficiently small flow cross-section to generate, during operation of the diffuser, sufficient pressure drop across the passages between the gas supply conduit and the chamber to contribute measurably to enhanced or substantial uniformity of distribution of gas flow among the respective passages, thus constituting flow regulating orifices. In general, the more uniformly gas flow is distributed among the pores of a membrane strip diffuser by gas injection passages distributed at spaced intervals over at least a major portion of the length of the gas chamber, and preferably by passages of sufficiently small flow cross-section to effect a high degree of uniformity of flow distribution among such passages and among the pores, the more efficient the transfer of gas to the liquid.

Optionally, the body may include one or more channels formed in the membrane-supporting surface of the membrane support member for assisting in startup of the diffuser when the membrane is collapsed against the support under a hydrostatic head. When such a channel is provided, it is positioned so that gas injection passages open into it. The channel may be of any suitable transverse cross-section, such as rectangular or arcuate, and may be formed in any suitable manner, such as by being part of the shape of the upper face of the support when the latter was originally formed, e.g., extruded, or by being milled into that surface after initial formation of the body. It is recommended that the channel be of sufficient width so that gas delivered by the injection passages through the channel to the underside of the membrane will have access to a sufficient amount of membrane area so that pressure exerted on the underside of the membrane will generate enough force on the membrane to lift it free from its non-operating position on the support, against its own elasticity and the hydrostatic head of overlying liquid. Provision of such channels may also facilitate, e.g., provide space within which to install at the outlets of the passages, check valves that, with the membrane in non-operating position, can close in the absence of gas flow and can also open upon commencement or restoration of gas flow.

The bodies may be of any desired width, consistent with having a length to width ratio consistent with strip diffusers. For example, widths of at least about four or at least about six inches are contemplated, as are of up to about ten or about twelve inches or more. Generally, it is good practice to select widths which reduce the potential for breakage of the support at its connection with the pipe and widths at which the membrane has little if any tendency toward "bagging", i.e., failing to elastically retract sufficiently in non-operating condition to lie smoothly, without humps, against the membrane support member upper surface.

One of the major advantages of forming diffuser bodies by extrusion is that they may be easily and economically formed in any desirable length.

Preferably, the bodies are made in lengths of at least about 6 and more preferably lengths of about 7½ feet. But lengths, in feet, up to about 8, up to about 10, and up to about 16, about 20, about 24, or longer, are contemplated.

The elongated membranes are basically composed of rubbery solid polymeric material, although they may also contain organic or inorganic solids, e.g., carbon black, and liquids, e.g., plasticizers. Such polymeric materials may include polymers of natural or synthetic origin and blends thereof. Homo-, co-, block- and graft-polymers having synthetic and/or natural components are contemplated. Among the various types of synthetic polymers, which are preferred, are elastomers selected from among the EPDMs (ethylenepropylene-diene, preferred), silicone rubbers, thermoplastics of the Santoprene™ type and urethanes, Buna-N, neoprene, and nitrites. These materials are described as "rubbery", in that, whether natural and/or synthetic, they have the property of elastic recovery after deformation, e.g., elongation under stress, and the term rubbery is thus intended to include, for example, thermoset and/or thermoplastic elastomers.

Elastomeric membranes for use in the invention may be molded, but are preferably extruded as a single layer which may include but preferably is free of reinforcing fibers. Optionally, membranes may comprise molded or extruded layers of rubbery material with or without fiber reinforcement within or between the layers, for example woven or non-woven material, e.g., cloth or netting, containing natural and/or synthetic fiber, such as cotton, polyester, polypropylene, glass or Kevlar™ fiber.

Surface features may be provided on the membranes to assist in securing and/or sealing them to the diffuser bodies, as will be described in greater detail below. Such features may be applied during initial molding or extrusion, such as by extrusion onto a running length of membrane stock, or may applied after initial molding or extrusion, such as by gluing onto previously molded membrane stock, or may be applied in other ways.

While it is possible for there to be some variation in the shape of the membranes, as viewed in plan view, strip diffuser membranes will usually have straight, parallel sides. The ends of the membranes may have varying shapes, such as semi-circular and squared-off ends.

Preferably, the membranes have a length to width ratio of at least about 4, more preferably at least about 6, still more preferably at least about 8, and most preferably at least about 10. Lengths of the membranes will usually be approximately the same as the lengths of the supports. Some exemplary ranges of length include about 4 to about 40, about 4 to about 20, about 5 to about 15, and about 5 to about 10 feet. Widths may be in the range of about 4 to about 12, more preferably about 6 to about 12, still more preferably up to about 10 and most preferably about 7 inches, from outside edge to outside edge on a 4 inch diameter pipe.

Illustrative membrane thicknesses are, for EPDM, about 0.0625-about 0.125, preferably about 0.07-about 0.11, and more preferably about 0.08-about 0.1 inches, and, for urethane, about 0.015-about 0.030, preferably about 0.018-about 0.027 and more preferably about 0.020-about 0.025, e.g., 0.023 or 0.024, inches.

Also, the thickness of a given membrane may vary from one location to another, for example, to enhance the uniformity with which gas is discharged from its pores, or to strengthen a portion of the membrane. For example, the membrane thickness may smoothly increase from about 0.8 inches at its margins to about 0.1 inches along its centerline.

Through basic polymer design, selection of processing steps and conditions and formulation with selected additives, persons skilled in the art are able to adjust the properties of these polymers with respect to resilience, e.g., tensile modulus, durometer, creep, cut growth, additive retention stability, e.g., resistance to leaching out of plasticizers or other components, chemical resistance to oxygen, ozone or other chemicals as needed and other properties.

One EPDM composition for the membranes of the present invention is an extrusion mix composed, by weight, of about 50% Uniroyal EPSYN 2506 thermosetting EPDM polymer, about 25% of N774 medium particle size carbon black filler, about 15% of SUNPAR 2280 plasticizer oil which is of high molecular weight to resist leaching out, and about 10% A of a conventional curing package, including for example peroxide- or sulfur-based curatives, all of which are mixed together in a screw pump mixer.

After extrusion, the membrane may be cured in any conventional way, such as in an oven at, e.g., about 350° F., in a salt bath at, e.g., about 390° F. or in a microwave oven at an oven temperature of, e.g., 200-250° F.

Illustrative, non-limiting examples of the properties of the cured elastomer include: modulus of elasticity, about 500 psi; tensile modulus, about 1200 psi per ASTM D 412; percent elongation at break, about 350% per ASTM D 412; ozone resistance per Test A of ASTM D 1171; a Durometer of about 58; and a specific gravity of about 1.25 or less.

Another extrudable EPDM rubber, useful in membranes of the present invention, is EPDM Rubber Product No. E70-6615-2B by Elbex Corp. of Kent, Ohio, U.S.A., which is believed to contain, by weight, 45-63% of elastomeric compound EPDM, 30-40% of reinforcing fillers, 5-10% of plasticizers and 2-5% of vulcanizing and miscellaneous other agents. This material is understood to have the following properties:

| COLOR-BLACK | | |
|---|---|---|
| PHYSICAL PROPERTIES | ASTM TEST METHOD | TYPICAL VALUE |
| Durometer, Shore A | D2240 | 58 |
| Tensile, psi | D412 | 1550 psi |
| Elongation, % | D412 | 350% |
| Compression Set, % | D395 (22 Hrs @ 70° C.) | 25% |
| Heat Aging | D573 (70 Hrs @ 70° C.) | |
| Change In Hardness (Dur.) | | 61 (+3 pts) |
| Change in Tensile, % | | 1426 psi (−8%) |
| Change in Elongation, % | | 290% (−20%) |
| Ozone Resistance | D1149 (72 Hrs @ 50 pphm) | No Cracks |
| Water Resistance (Vol.) | D471 (70 Hrs @ 100° C.) | +1% |
| Low Temp. Brittleness | D2137 (−40° C.) | Pass |

SPECIFICATIONS: ASTM D2000 M4BA610, A13, B13, C12, EA14, F17 LOW OIL CONTENT: MAX. 12%

The above values were obtained on standard test slabs and buttons.

The membrane material, in sheet form, is punched to form pores through which the gas is discharged. These pores may be of any suitable shape as viewed in plan view, e.g., round, rectilinear, star- or cross-shaped or other shape. Pores may be distributed over the gas discharge surface of the membrane in any suitable random or ordered pattern, which may include centrally or non-centrally located non-slitted areas, e.g., to perform a valving function to be described further below.

The pores may be formed in any manner, such as by cold-needle or hot-needle punching, the latter believed to be advantageous for use with Santoprene™ elastomers and similar products and with urethane-based elastomers. However, it is believed that the best pore-forming methods for EPDM membranes are the punching of slits, e.g., a multitude of short, straight-line cuts with a steel rule die or, preferably, by shear-punching. As compared to round holes, slits appear to have advantages in respect to degree of clogging resistance, ability to change opening size as gas pressure changes, ability to close at least to some extent when there is no air flow, reproducibility of results in pore formation, ease of adjustment of DWP (dynamic wet pressure), ease of adjusting the punching pattern and economy of the punching operation.

Presently preferred perforation practice includes shear-punching slits that are spaced apart longitudinally from one another, end to end, along rows. These rows are multiple straight lines that are parallel to one another and to the long dimension of the membrane, are laterally spaced from one another and are distributed across the width of the membrane. The slit length and longitudinal end to end spacing are preferably 0.03 inch and 0.05 inch respectively. Lateral spacing between the rows is preferably about 0.15 inch. Slits in adjacent rows may be disposed side-by-side or staggered relative to one another. In a preferred illustrative and non-limiting example, the membrane is about 12" wide, has an un-punched area of uniform width of about one inch centered upon and extending along its centerline to act as a check-valve, and has, along each side of the un-punched area, punched areas with a uniform width of about 3½ inches, having slits therein that are positioned and sized as above described, and un-punched margins along its longitudinal edges that are each about 2 inches in width.

One may provide any suitable mechanical arrangement to secure and seal the membrane to the diffuser body at the ends of the membrane and along its longitudinal edges. Among the many arrangements that may be used in sealing the ends of membranes are various types of clamping devices of metal, rubber and/or plastic, such as clamping bars, clips, band clamps, screw tighteners, U-shaped clips and other types of clamps, which may have surface protrusions to assist in securing and/or maintaining a seal. Metallic clamping bars of U-shaped cross-section, clamped over the ends of the membrane are of particular interest. The ends may also be sealed with tape, adhesively bonded to the membrane and support member, and tape seals may be used in combination with any type of mechanical clamping member.

Many different arrangements may be used in sealing the longitudinal edges of the membranes to the diffuser bodies. These include various types of clamping devices of metal and/or plastic, such as clamping bars or flanges, U-shaped clips and other types of clamps, which may have surface protrusions to assist in securing and/or maintaining them in place. Metallic clips, crimped onto the edges of the membrane and the edge of the membrane support are of particular interest. As with the ends, the edges may also be sealed with tape, adhesively bonded to the membrane and support member, and tape seals may be used in combination with any type of mechanical clamping member.

These and a number of other exemplary embodiments of end and edge securing and sealing arrangements are disclosed in the drawings and in the text below, and many other arrangements may be used without departing from the spirit of the invention.

The membrane and portions of the body which are in contact may have configurations of any suitable type to cooperate effectively with each other in holding and sealing them together. For example, there may be complementary shaped grooves in the body that engage shaped members in the membrane. On the other hand, there may be protrusions on the body, with or without cooperating grooves in the membrane. These types of configurations may in certain circumstances be sufficient, in and of themselves, to secure and seal the membrane in place on the body, or may be utilized in combination with the end and edge securing and sealing arrangements discussed above.

Membranes may be held in grooves in the body with the aid of locking/jamming members integral with or separate from the membranes. Examples of integral locking members include compressible or non-compressible bulb-shaped protrusions, circular edge portions and dove-tail edge portions. Illustrative separate locking/jamming members include members of "T" shaped cross-section and of triangular, box/diamond, rounded or other shape, whether hollow or non-hollow, as well as rod-type inserts, strip-type inserts, e.g., with serrated face(s), and spline cords. Many other configurations may be used. It is preferred and, depending on the mechanical properties of the membrane, it may be essential, that the design of the locking/jamming members be free of sharp edges, corners or other potential stress risers.

Preferably the geometry of the body-membrane connection is such that gas pressure on the gas influent surface of the membrane and the resultant stretching of the membrane will increase the sealing pressure at the interface between the membrane and the body. Embodiments of this type are illustrated in the drawings and discussed below.

With the membrane support extending in the same direction as the gas supply conduit, that support derives strength from the conduit in a way not possible with prior art strip diffusers having membranes and membrane supports extending transversely to the conduit.

Diffusers according to the invention may be connected to gas supply manifolds, and in series with one another, with any suitable form of connection, whether of a flexible or rigid nature. A flexible connection may, for example, be formed by providing a diffuser with an outwardly projecting barb fitting cemented, threaded or otherwise sealed into an end of the diffuser gas supply conduit, and by clamping a hose to the barb fitting. The other end of the hose may be clamped to another barb fitting on a manifold or on another diffuser. A rigid connection does not require a barb fitting. Instead, for example, a rigid nipple may be cemented, threaded or otherwise sealed into an end of a gas supply conduit. A similarly equipped manifold or second diffuser may be connected through any suitable form of coupling with the first-mentioned nipple, for example the type of coupling disclosed in U.S. Pat. No. 5,714,062 to W. Winkler and W. Roche. Where rigid connections are used, stands or other devices to support the diffusers may be secured to these connections.

The invention may be employed in virtually any type of facility in which membrane diffusers are useful, especially in wastewater treatment plants.

Such diffusers are versatile in that they are useful in plants that vary widely in their ratios of aeration area to floor area ("packing factor"), which may, e.g. be >25% or >30% up to about 60%, and which vary widely in plant loading.

Moreover, the invention can be used in hybrid systems with the strip diffusers disclosed herein along with other types of diffusers and/or mixers in the same tank.

The diffusers of the present invention may be used conveniently, as illustrated above, in plants where there are oxygen demand gradients and significant variations in flux rate.

Embodiments can be made with varying flux rates (airflow rate per unit area of membrane gas discharge surface), with good efficiency and with excellent uniformity of distribution of gas over the gas effluent surface of the membrane.

Among the diverse embodiments that are contemplated are those of that have a flux rate of about 0.25 scfm to about 7.5 scfm per square foot of membrane gas discharge surface. More preferably the flux rate contemplated is in the range of about 0.5 scfm to about 3 scfm per square foot of gas discharge surface.

Membrane deflection, change in vertical separation of the membrane from the support between zero and operating gas flow may vary considerably, depending on the particular type of membrane selected. It is contemplated for example that flux rates (gas flows) may be used at which the membrane deflection is in the range of up to about 0.5" or up to about 1" or more.

A number of specific embodiments will now be described with the aid of the accompanying drawings. These are intended to illustrate and not limit the scope of the appended claims.

Description of Preferred Embodiments Illustrated in the Figures

Figure 6:
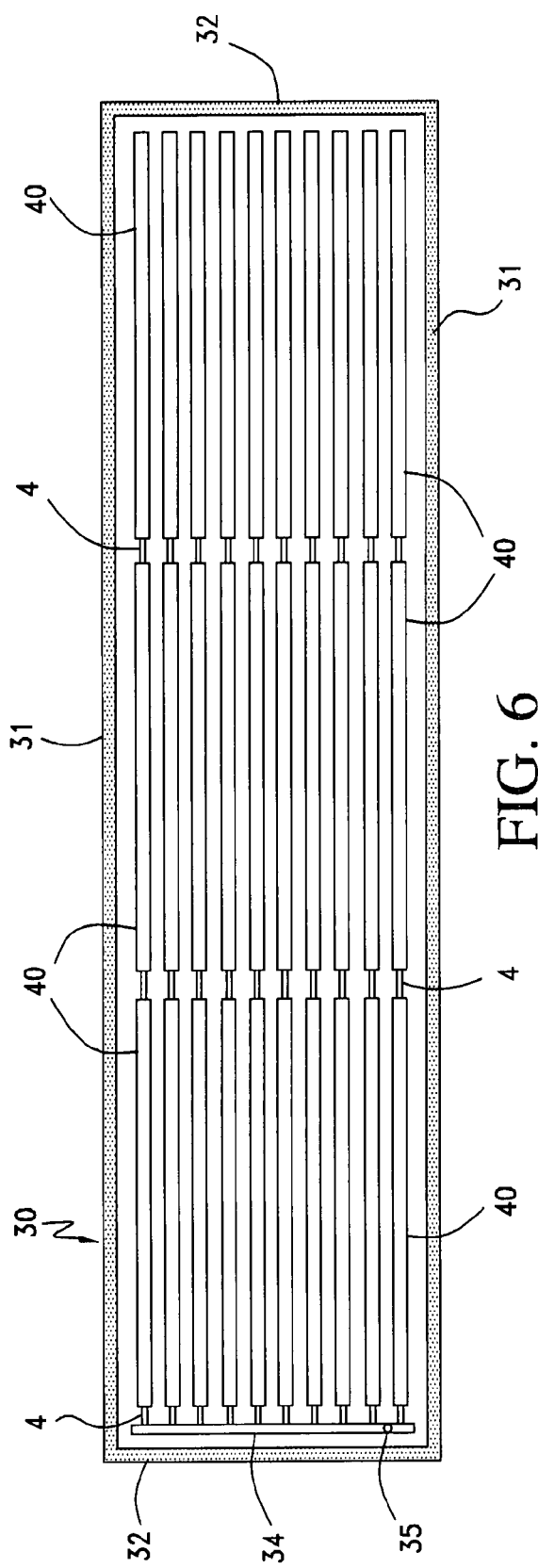
FIG. 6 is a schematic plan view of a wastewater treatment tank containing strip diffusers in accordance with the invention.
Figure 7:
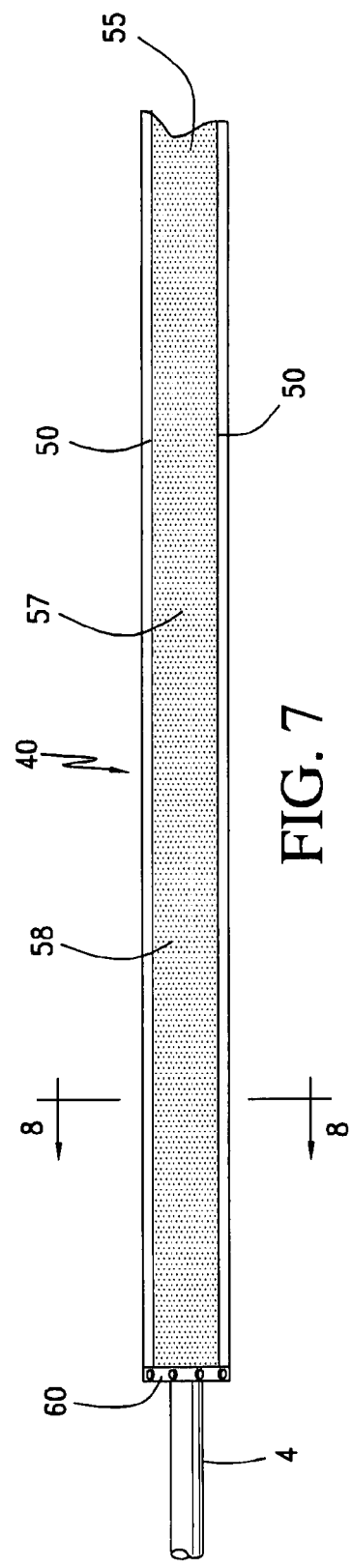
FIG. 7 is an enlarged, partial top view of a portion of one of the strip diffusers of FIG. 6.

FIGS. 6 and 7

As shown by FIG. 6, the strip diffusers contemplated by the present invention may be installed in a tank 30 similar to that illustrated in FIG. 4. Diffusers 40 are mounted atop gas supply conduits 4, and are elongated in the same general direction as those conduits.

FIG. 7 is an elongated portion of one of the diffusers 40 and a portion of an associated gas supply conduit 4. Membrane 55 has gas discharge pores 58 passing through its central portion 57. Beneath the membrane is a diffuser body, including a membrane support. Flanges 50 are part of the support (remainder of support not shown here). These flanges extend along the longitudinal edges of the support and of the membrane. The membrane is secured and sealed to the support by the flanges 50 and end clamps 60. The drawings (figures) described below illustrate some of the different forms in which the membranes, supports, securing and sealing means and other parts of the diffusers of the present invention can be constructed. These different forms are referred to as embodiments of the invention.

FIGS. 8-14

FIGS. 8-14 embody illustrative bodies and complete diffusers in which there are integral bodies and gas supply conduits. FIGS. 8 and 9, respectively, are side and perspective views of a body 133 comprising an arcuate support member 134 with ends 135. The illustration is broken in FIG. 8 to indicate that the body may be much longer than is suggested by the length to height ratio of the part as shown in that figure. Grooves 136 run along each edge 137 of support member 134.

As shown in FIG. 9, the support member is formed integrally with a synthetic resinous pipe, for example the gas supply conduit 138 having a longitudinally extending central axis. The pipe is defined by a longitudinally extending peripheral gas flow confining wall 139 which, in this embodiment, is of rounded cross section. However, a cross-section of any other suitable shape may be employed.

Included in the pipe wall, at (in, or near) an upper portion of the pipe, is at least one elongated, thickened region 145. It is integral with the pipe and extends in the same direction as its central axis.

Support member 134 is elongated in the direction of the pipe central axis. Preferably, the pipe is integral with the membrane support over approximately the entire length of the support.

The support has a connecting portion 132 that is integral with the pipe and comprises thickened region 145. The connecting portion may be positioned at the apex of or elsewhere on the pipe, such as at the bottom or sides. In this embodiment, connecting portion 132 is positioned at the apex of the pipe and is coincident with the thickened region, extending laterally between junctions 146a and 146b and vertically between the pipe inner surface and the upper surface of the support.

In the pipe 138 of the present embodiment, peripheral wall 139 has a single thickened region 145 which varies in thickness between junctions 146a and 146b at the pipe upper portion and constitutes the connecting portion 132 of the membrane support. However, as will be shown in connection with other embodiments discussed below, the membrane support can comprise plural (two or more) thickened regions of the pipe peripheral wall. The one or more thickened regions can represent part of the connecting portion of the membrane support and may extend substantially throughout the length of the pipe.

Pipe wall 139 may have at least one side portion, or two side portions, which is/are thinner than connecting portion 132. Thus, in the present embodiment, region 145 is, substantially throughout its own width and the length of the pipe, thicker than those portions of the pipe peripheral wall which adjoin it and which are outside the connecting portion of the support. More particularly, in the present embodiment, the pipe peripheral wall 139 has an inner surface 131, and the connecting portion 132 is, when viewed in transverse cross-section along a portion of the length of the inner surface which the connecting portion adjoins, thicker than the remainder of the peripheral wall along most of the length, or combined length, as the case may be, of a portion or portions of the length of the inner surface which the remainder adjoins. In this connection compare, in FIG. 9, the thickness of the pipe in the thickened region 145, from junction 146a to junction 146b, with the thickness of the sides of the pipe. In this case, the sides include portions thinner than region 145 that extend from approximately 45 to 120 degrees on both sides of a vertical axis passing through the pipe central axis. Thus, the support connection portion 132 that comprises region 145 is thicker than most (the majority) of the remainder of the peripheral pipe wall 139 (the portions or portion of the pipe wall not within the thickened region or regions) along the periphery of the pipe.

One can readily determine, for other diffusers, the relative amounts of pipe wall comprising the thickened region or regions and the remainder. Using techniques described below, one can ascertain what proportion of the remainder is thinner than such region(s). This can be done whether the cross-section of the pipe is circular, as shown, or is oval, square, rectangular or some other non-circular shape.

On a transverse cross-section of a pipe and support in any of these shapes, one may determine the interval or intervals of length of pipe wall, measured along the interior surface of the pipe, that is/are adjoined by the thickened region or regions of pipe wall included in the connecting portion of the membrane support. One can find where the pipe wall is adjoined by wall structure of a given thickness by measuring in an outward direction. For example, one can in most if not all cases logically measure perpendicularly outward from a straight-line internal pipe surface or from a tangent to an arcuate surface.

After finding the interval or intervals of length of pipe wall for the thickened region or regions included in the connecting portion of the membrane support, one can then find the remainder by deducting such interval or intervals of length from the entire length of the periphery of the pipe internal wall. The length or aggregate length of the interval or intervals in the remainder that are thinner than the thickened region or regions can then be determined. Comparison of the amounts of length of pipe wall in the remainder that are and are not thinner than the thickened region or regions will show which are in the majority.

Referring to the pipe of circular cross-section in FIG. 9, one may readily determine the size of its remainder (R) based on measurement of angular intervals. One may for example begin by taking thickness measurements while advancing along the pipe internal wall at small angular intervals from one end of region 145 to the other. Then, one may subtract from the 360 degree angular interval of pipe peripheral wall surrounding the pipe central axis that number of degrees (T) found in the angular interval subtended by the thickened region 145. Next, one may take measurements of pipe wall thickness in the remainder and determine what angular intervals are subtended by those portions of the remainder that are thinner than region 145. If the total (Y) of the angles subtended by such thinner portions, divided by R exceeds 0.5, the preference for the thickened region being thicker than most of the remainder of the pipe peripheral wall is satisfied.

In the alternative, the preference for the connecting portion to be thicker than most of the remainder of the peripheral pipe wall can be satisfied on the basis of average thicknesses within and without the thickened region or regions. For example, in conformity with the FIG. 9 embodiment, if the average thickness of pipe wall measured along the length of a pipe wall transverse cross-section is greater within the support connecting portion than the average thickness or thicknesses of pipe wall in the remainder, this preference would be satisfied.

The support member also has one or a plurality of lateral portions. These are integral with the connecting portion 132 and extend laterally from the connecting portion and longitudinally with the connecting portion in the same direction as the pipe axis. In the present preferred embodiment, the membrane support has plural lateral portions 147a and 147b, positioned on opposite sides of the pipe apex.

Also included in the body are inclined bracing webs 140; legs 142; and a pipe-supporting projection, e.g., foot 143, formed at the bottom of confining wall 139. Each side of this confining wall, along with the respective webs 140 and portions of the lower surface of support member 134 define chambers 141 which may be sealed but which are preferably left open to admit wastewater in order that they not contribute buoyancy to the diffuser. A series of orifices communicates between the interior of conduit 138 and the upper surface of support 134.

A gas supply connection which may be incorporated in the body at the time of manufacture or installation is shown in FIG. 10. This figure includes a partial section, taken in a vertical plane passing through the central axis of the body, of the support 134, confining wall 139 of gas supply conduit 138 and foot 143. In this embodiment, the gas supply connection includes a close-connection fitting 148 having barbed ridges 149 and a rounded mail connecting and which is insertable, in closely 11 fitting relationship, with the inner surface of gas flow confining wall 139. There is a gas tight connection between fitting 148 and confining wall 139, which may be accomplished, for example, by solvent welding or sonic welding.

For an end view of the body of FIGS. 8 and 9, along with other diffuser parts, see FIG. 11. Among these additional components are an elongated rectangular membrane 151 with integral O-ring seals 152 formed along both of its longitudinal edges.

Any embodiment of the invention may, and preferably does, include the feature that at least part of at least one lateral portion has beneath it, and preferably at least two such lateral portions have beneath them, space that is in communication with the environment surrounding the diffuser. Another feature that may be provided beneath at least part of at least one lateral portion is space that is free of bracing connecting that part with the pipe. These features may be applied individually, but are preferably present in combination.

Use of these features in combination is exemplified, for example, by spaces 164a and 164b under projections 163a and 163b, which are present near the edges of, and form parts of, lateral portions 147a and 147b of support 134. These spaces communicate with the environment surrounding the diffuser and are free of bracing connecting those parts with the pipe. These projecting parts of the lateral portions and the spaces beneath them can be helpful in various ways, for example in attachment of marginal edges of membranes to the diffusers. In this embodiment, grooves 136 in these projections provide a place in which support 134 may receive O-ring seals 152 formed along the longitudinal edges of membrane 151, while the space beneath affords opportunity to receive membrane edge securing means (e.g., the clips of FIG. 12, discussed below).

A membrane end-sealing member 153 is also provided. In this embodiment it is a pressed sheet-metal or plastic clamp of U-shaped cross-section. See FIGS. 16 and 17 for the cross section. Clamp 153 has an arcuate under-surface 154 and grooves 155 that coincide with the membrane's O-rings 152.

To hold clamp 153 in-place, a strap 156 is provided, having a central arcuate portion 157 matching the arcuate profile of the clamp. End tabs on strap 156 and cooperating clamp fastening means 159 are able to force the clamp under-surface against the membrane upper surface at the end of the membrane and to compress the membrane between the clamp and the supporting member, e.g., with the aid of nuts 160 and threaded members 161.

The threaded members may be of any suitable shape and size, and preferably are rods anchored in the floor of a tank in order to support the racks 162 and the diffusers a short distance above the floor. Although only one rack appears in FIG. 11, ordinarily, a rack may be supplied at the end of each diffuser, and, where the diffuser is very long, additional racks may be provided between its ends. The diffusers are supported on the racks by legs 142 and foot 143, which stand on upper surfaces of the racks.

Any suitable type of membrane longitudinal edge sealing member may be employed to provide gas-tight seals between the membrane 151 and support 134 along the longitudinal edges of the membranes. As illustrated by other embodiments of the invention, it is not necessary to employ integral O-rings 152, since the edge sealing arrangements may use formations with different types of cross-sections than those of O-rings, and edge sealing may also be effected with membranes having no edge formations, e.g., using membranes with plain edges.

However, in the present embodiment, as shown by consideration of FIGS. 11 and 12, the membrane edge sealing member is a resilient, corrosion-proof spring metal clip 166, one example of which is shown in FIG. 12, it being understood that such a clip may be provided along each of the two longitudinal edges of the membrane and its body. The sample clip 166 of FIG. 12 has upper portion 169 which overlaps left edge 137 of the support member, its groove 136 and the O-ring 152 that is present in groove 136, extending around and gripping the upper surface of the O-ring. Lower portion 170 of clip 166 utilizes spaces 164a and 164b beneath free-extending parts 163a and 163b of support lateral portions 147a and 147b to gain access to the lower surfaces of these parts, so that it may bear against them in compressing O-ring 152 into groove 136. The end of clip 166 abuts the inner face of clamp 153 at one end of the membrane and abuts the inner face of another, similar clamp (not shown) at the other end of the membrane.

While the rack 162 of FIG. 11 is only wide enough to support a single diffuser, it is possible to provide wider racks capable of supporting plural diffusers in side-by-side arrays, as shown in FIG. 13. That figure shows a triple array of diffusers similar to those illustrated in FIGS. 8-12. Each of the three diffusers shown comprises a body 133 and membrane 151 with edge-sealing clips 166 and end-sealing clamps 153, the latter being held in-place by straps 156 on racks 174.

FIG. 14 shows how diffusers, whether mounted individually on their own supports, as in FIG. 11, or arranged in a side-by-side array on a common support, as in FIG. 13, may be connected in end-to-end series on longitudinally distributed sets of racks 162 or 174. In the figure, first and second diffusers 176 and 177 constitute a longitudinally connected string of plural diffusers which are connected to one another.

Supporting rack 162 or 174 is provided at each end of the respective diffusers. Depending on the lengths of the diffusers, it may be necessary to provide additional racks or other supports intermediate the ends of the diffusers. Diffusers in strings, or not in strings, may be connected to a gas supply manifold 178, and, where applicable, to each other, through hoses 179 with the aid of hose clamps 180. Whether diffusers are not, or are, arranged in strings, the far end of the diffuser or the far end of the last diffuser in line, as the case may be, i.e., the end of the diffuser and its gas supply conduit furthest from the manifold 178, may for example be provided with a gas-tight plug, or with a connection 11 to a liquid purge system or to a second manifold.

FIGS. 15-19

Other forms of end clamping arrangements may be used, as illustrated by FIGS. 15-17. This embodiment has a body 133 with support member 134, a membrane 151 with integral O-rings 152 and longitudinal edge sealing members (not shown), all as described in connection with FIGS. 8-14. The end clamp 184 of this embodiment, which may be of cast metal or molded plastic, is similar to the prior embodiments in having an arcuate under-surface 185 and grooves 186 to accommodate O-rings 152. This clamp has a bottom 187 and spaced-apart sides 188 that extend throughout its length. These sides 188 have between their inner faces a valley 189 interrupted at longitudinally-spaced intervals by a series of cross-members 190 containing bores 191. Threaded screws 192 extend through bores 191 and the membrane and are threaded into holes 193 in support member 134, extending where necessary into bosses 194, to secure the clamp and membrane to the body at each end of the membrane. As shown in FIG. 16, clamp bottoms 187 may be provided with ridges 195 that partially penetrate the upper surface of membrane 151, when the clamp is installed. These ridges are preferably blunt rather than sharp, to minimize their tendency to cut the membrane.

FIGS. 18 and 19 show how one or more depressions may be provided in the membrane support 134 of a diffuser, including without limitation any of the diffuser embodiments herein, to assist in startup of the diffuser. The goal of these embodiments is to assist in lifting a non-operating membrane free from its support as the flow of gas to the membrane begins, when the diffuser is first operated and/or when operation is restored after an outage. For this purpose, gas discharged from an orifice is given access to an amount of membrane gas influent surface area that substantially exceeds the cross-sectional area of the orifice. Preferably, a plurality of orifices are given such access.

To do this, one or more orifices are arranged to discharge gas into one or more depressions in a support. Thus, there may be a single orifice feeding into a single depression, plural orifices feeding into their own individual depressions, plural orifices feeding into common depressions and different combinations of the foregoing. Depressions are provided that are of limited width in at least one direction, so that a non-operating membrane can bridge across the resultant gap. Such bridging exposes to the action of pressure exerted by incoming gas an amount of membrane surface area exceeding the flow cross-section of the orifice or orifices. The diffuser is designed with a ratio of exposed surface area to orifice flow cross-section sufficient to generate enough force on the underside of the membrane to lift it free from its non-operating position on the support, against its own elasticity and the hydrostatic head of overlying liquid.

Strip diffusers, preferably those with extruded bodies having orifices distributed longitudinally in one or more longitudinal rows, whether or not there is a row located centrally between the body longitudinal edges, represent an unusually advantageous environment within which to practice this concept. One or more of these rows may be arranged to feed into a common depression or depressions, as above described. Thus, the depression(s) may be formed by extruding or milling into the membrane support of a diffuser body a longitudinally extending channel that the membrane can bridge across, given the elasticity of the membrane and the amount of force pressing down upon it as a result of the hydrostatic head.

FIGS. 18 and 19 illustrate longitudinally extending channels as described above. In each of these embodiments the body 133 includes a support 134, a gas supply conduit 138 having gas flow confining wall 139 and a longitudinally spaced series of orifices 144 (only one being shown in each figure) that are similar to those provided in the preceding embodiments. In FIG. 18, channel 199 is substantially rectangular in its transverse cross-section. But in FIG. 19, channel 200 has a substantially arcuate transverse cross-section. These figures are merely illustrative, since any cross-section which provides access to sufficient membrane influent surface area may be used.

The integral O-rings 152 of prior embodiments, e.g. as shown in FIGS. 11, 12 and 15, are protrusions from the surfaces of membranes which can be of assistance in securing a membrane to its body and/or in providing a gas-tight seal between portions of the membrane and body. However, such protrusions may take a variety of forms in any of the various embodiments of the invention and may, in appropriate circumstances, be unnecessary. A few examples of different forms of protrusions and of diffusers which do not require such protrusions are provided in embodiments described below.

FIGS. 20-23

Figure 20:
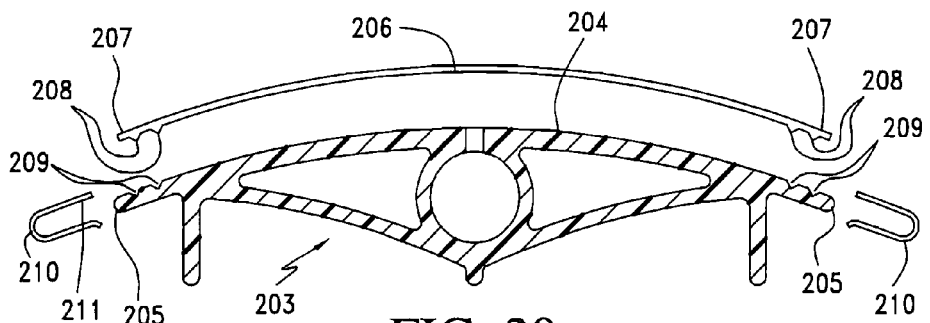
FIG. 20 is an exploded transverse cross-section of a modified form of the diffuser body of FIG. 11-12 or 11-13, with a membrane and an alternative form of edge securing and sealing arrangement.
Figure 21:
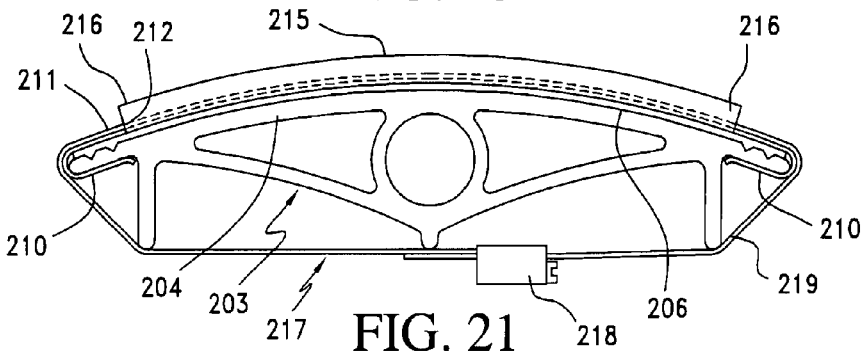
FIG. 21 is an end view of the diffuser of FIG. 20, which also shows 11 an end clamping and sealing arrangement.

FIGS. 20 and 21 disclose an embodiment having a body 203, similar to the body of FIG. 11, having support 204 with longitudinal edges 205. An exploded view provided by FIG. 20 shows longitudinally-running protrusions 208, located a short distance inward from the longitudinal edges 207 of membrane 206. These protrusions are of any suitable number and shape. For example, there may be one or more V-shaped protrusions near each membrane edge 207. Preferably, there are two or more of such protrusions near each edge. Still more preferably there is a pair of protrusions along each longitudinal edge 207 of the membrane, and there is lateral spacing, from one another, of the protrusions within each pair.

Longitudinally-running grooves 209 are provided in the upper surface of the membrane support 204. These may be present in any suitable number and shape whereby they are compatible in number and shape, and are sealingly engagable with, whatever protrusions may be provided in the membrane. For example, e.g., one or more V-shaped grooves may be provided in support 204. The groove(s) is/are near a support edge 204 and/or near a membrane edge 207. Preferably, there are two or more grooves that are near both edges 204 and edges 207. Still more preferably there is a pair of grooves, laterally-spaced from one another, near these edges.

This embodiment includes a membrane edge-securing member, e.g., U-shaped clip 210 and membrane end-securing member 215. As shown in FIG. 21, when the exploded parts are assembled, the membrane is secured and sealingly engaged to the support 204 with the aid of these members. Member 215 may for example be a clamping member with an undersurface conforming to the shape of upper surface of the membrane when the membrane is fitted to the support. Preferably member 215 is a clamp of U-shaped cross-section having clamp ends 216.

At one end 216 of end-securing member 215, its bottom wall 212 abuts inner edge 211 of one membrane edge-securing member 210. Bottom wall 212 extends across and in compressive relationship with the upper surface of membrane 206 to a position where the other end 216 abuts the inner edge 211 of the other edge-securing member. The abutment of these parts is for the purpose of minimizing any tendency for gas to leak at the membrane ends where securing member ends 216 and inner edges 211 adjoin one another. For this same purpose, it is preferred that the material of which clips 210 are formed be of the same thickness as the bottom wall 212 of end-securing member 215.

Such abutment and the compression of the bottom wall against the upper surface of the membrane may be provided in any suitable manner. However, this is preferably accomplished with a worm-gear fastener 217 having a gear-body 218 containing the usual worm gear (not shown) and a drawband 219 including the usual female thread pattern (not shown). Fastener 217 extends around the entire diffuser, including through the valley of the U-shaped membrane end-securing member 215 and around the outside surfaces of both the membrane edge-securing members 210. This assists in holding the edge-securing members 210 in place. While fasteners 217 are preferably provided at each end of a diffuser, they may also be provided at positions intermediate those ends, for example if there is need for additional help in keeping the securing members 210 in place.

Figure 22:
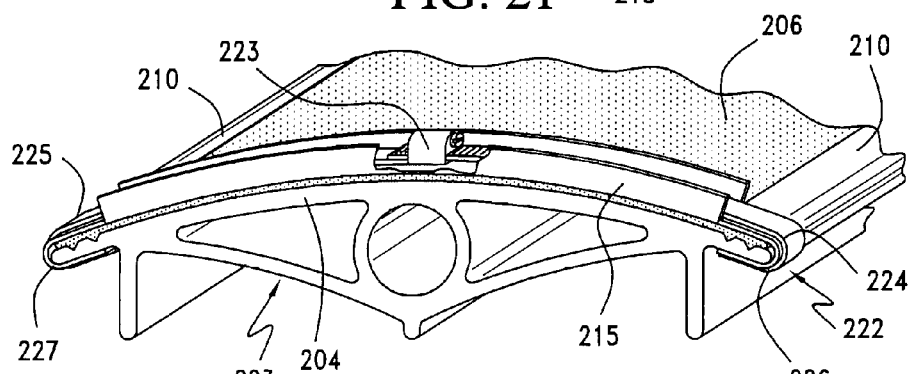
FIG. 22 is a partial perspective view of a diffuser similar to that of FIG. 21 with a modified clamping arrangement.
Figure 23:
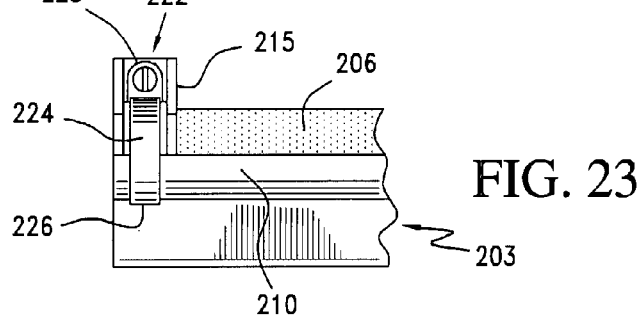
FIG. 23 is a partial side view of the diffuser of FIG. 22.

FIGS. 22 and 23 disclose a modification of the FIG. 20-21 embodiment having an alternative form of fastener. This embodiment mirrors the previous one in having a body 203, support 204, support longitudinal edges 205, membrane 206, membrane longitudinal edges 207, protrusions 208, grooves 209, edge-securing member 210, clip 211, and end-securing member 215 with bottom wall 212 and clamp ends 216. The alternative worm-gear fastener 222 of FIGS. 22 and 23 has the usual gear body 223 and internal gear (not shown), but instead of a single draw band, has first and second band segments 224 and 225, one fixed to the gear body and the other threadedly engaged with the worm gear. These band segments have, respectively, free ends having hook members formed thereon 226 and 227. Here, instead of extending around the entire diffuser, the fastener 222 extends through the valley of the U-shaped membrane end-securing member 215 and terminates with the hook members 226 and 227. Since these hooks embrace the outside surfaces of both the membrane edge-securing members 210, this fastener also assists in keeping them in place. As in the previous embodiment, fasteners 222 can be provided at the ends of, and, if desired, at intermediate positions along, the diffusers.

FIG. 24

Another modification of the embodiment of FIG. 20 appears in FIG. 24, illustrating a body 203 and support 204. Here, the body longitudinal edge 205 of FIG. 20 is replaced with a skirt 230. This skirt is inclined downwardly, preferably by an angle of at least about 30 degrees, or more preferably at least about 45 degrees, and still more preferably at least about 60 degrees, from the upper surface of the adjoining portion of the membrane support member. This adjoining portion, in the installed diffuser, may be, and usually is, generally horizontal, meaning more nearly horizontal than vertical. The skirt may for example be generally upright, which means more nearly vertical than horizontal, and thus may be somewhat inclined or exactly vertical, as shown.

Skirt 230 is connected to the membrane support through a curved section 231, terminates in a tip 233 and has a curved transition surface 232. Surface 232 provides a smooth transition from the generally horizontal upper surface of the membrane support to the generally upright outer surface of the skirt. Longitudinally extending groove 234 is present in the outer surface of skirt 230. Membrane 235 has a curved transition section 236 overlying curved transition surface 232 of the support. A porous central section 237 of the membrane begins a short distance uphill on the support from surface 232. The remainder of the membrane, a non-porous marginal portion 238, overlies transition surface 232 and the vertical outer surface of the skirt. Between longitudinal edge 239 and membrane transition section 236 is a longitudinal protrusion 240 that is sealingly compatible with longitudinal groove 234. Longitudinally-extending clip 241 is present to assist in binding marginal portion 238 and protrusion 240 of the membrane in gas tight relationship to skirt 230. Any suitable membrane end-securing arrangement (not shown) may be utilized here.

FIGS. 25-26

An example of an inclined skirt is provided in the FIG. 25-26 embodiment. Here, there is a body 203, support 204, curved section 231, tip 233, longitudinal groove 234, membrane 235, longitudinal edge 239, longitudinal protrusion 240 and longitudinally-extending clip 241. However, the skirt 244 of this embodiment is inclined inwardly at a relatively small angle from the vertical, for example up to about 40 degrees, preferably up to about 30 degrees and still more preferably up to about 20 degrees. The diffuser may be provided at each end, and at intermediate points if desired, with any suitable type of support, such as a stand including an elongated rack 245 similar to that shown in FIG. 26, having transverse spaced slots 246. Conventional worm gear fasteners 217 with gear bodies 218 and draw-bands 219 may be present at each end of the diffuser and, optionally, at intermediate locations. Such fasteners may act, at least in part, as end-securing means for the membrane and, whether present at the diffuser ends or elsewhere, may assist in holding clips 241 and protrusions 240 in place. In this connection, band 219 may be threaded through selected slots 246, extend beneath rack 245 and encircle the entire diffuser in such a way as to compress the exposed surface of the membrane against the support and exert laterally inward force on the membrane, through the clips, at the skirt.

FIG. 27

In this embodiment, a marginal portion of a membrane extends from a generally upward facing, generally horizontal surface of a membrane support member, around the side of the body, to a generally downwardly facing, generally horizontal surface of the body at a level below that of the support member upper surface. The membrane is pressed against this downwardly facing surface. A skirt is not necessary but, where provided, may support an additional member, e.g., a generally inwardly directed flange, which includes the downwardly facing surface.

By way of illustration and not limitation, this embodiment is similar to that of FIG. 24 in having a body 203, support 204, skirt 230, curved section 231, and smoothly curved transition surface 232. However, where the FIG. 24 embodiment had a tip 233, this embodiment has, at the lower end of its skirt, a flange 247. It is generally horizontal. Preferably, it is inclined inwardly by an angle of at least about 45 and more preferably at least about 60 degrees from the adjoining portion of the skirt, that adjoining portion, in the installed diffuser, being generally upright. Preferably the skirt is horizontal as shown.

A curved section 248 connects skirt 230 with flange 247 and has a curved transition surface 249, providing a smooth transition from the generally upright outer surface of the skirt to the generally horizontal surface of the flange. Between flange tip 250 and curved section 248 is a longitudinal groove 251 for receiving a sealingly compatible longitudinal protrusion 261 of membrane 255.

In this embodiment, the membrane has a first curved transition section 256, a second curved transition section 257, a porous central section 258 and a non-porous marginal portion 259 the latter extends from above first curved transition section 256 to the membrane longitudinal edge 260.

As in previous embodiments, any means may be employed to secure the membrane edges to flange 247, and a longitudinally-extending clip 262 may be used for this purpose. Any suitable end-securing means may also be used.

FIG. 28

In a number of prior embodiments, for example those of FIGS. 24-27, a membrane at rest extends, in at least outward and downward directions, from a generally horizontal surface of a membrane support over a curved transition surface until the angle at which the membrane lower surface extends has changed substantially downward. For example the angle may change by about at least 30 degrees, more preferably at least about 45 degrees and more preferably at least about 60 degrees. The membrane may preferably extend to, or even past, a generally upright side portion of the body. This side portion may be a member whose entire surface is generally upright, or merely a generally upright portion of a member having surface portions that are and are not generally upright. The side portion may for example be a rounded edge of the membrane support itself, or of various appendages to the body, for example skirts, with or without flanges, as in FIGS. 24-27.

Consider the situation in which the membrane extends laterally across a curved transition surface, extends at least to a position at which the above-described angle change has occurred, is not secured to the body above that position, and is secured to the body at or beyond that position. In these circumstances, inflation and resultant stretching of the membrane in operation can cause the undersurface of the membrane to press against the curved transition surface. Bodies can be configured to provide the benefit of utilizing such pressing to form, or at least assist in forming, a longitudinally-extending gas-tight seal between the membrane undersurface and the transition surface. Bodies can be configured to provide the benefit of utilizing frictional engagement between these surfaces to assist in countering to some extent the tendency, if any, for the inflated membrane to pull inwardly on and try to separate itself from its longitudinal securing members. While practice of the invention does not require utilization of either of these benefits, embodiments that afford one or both of them are preferred.

Diffuser design and operating conditions can be manipulated in a variety of ways to realize these benefits. In general, respectively increasing or decreasing the radius of the curved transition surface tends to decrease or increase the sealing pressure between that surface and the undersurface of the membrane. Sealing pressure can also be increased by increasing the gas pressure beneath the membrane, and vice versa. It is of interest that although, generally speaking, increasing pressure drop across a membrane tends to intensify any tendency there might be for leaks to occur, in the embodiments under discussion, especially where the membrane has high resistance to stretch, increased pressure beneath the membrane can assist with sealing.

In general, an increase or decrease in the angular change of membrane direction along the transition surface will tend to increase or decrease the contact distance, that is, the distance in the lateral direction over which the membrane undersurface and curved transition surface are in contact. Increased contact distance tends to increase the integrity of the seal between those surfaces. It also can enhance frictional engagement between those surfaces. Moreover, interfacial contact pressure between the transition surface and the membrane undersurface can be increased or reduced by altering the membrane thickness and/or tensile modulus, thus enhancing or diminishing frictional engagement. Increased frictional engagement tends to reduce any tendency for separation of the membrane from its longitudinal edge securing means.

By incorporating either or both of the foregoing benefits into a diffuser design that includes a given type of sealing arrangement and/or a given type of membrane longitudinal edge-securing arrangement, more sealing and securing integrity may be provided where desired or needed. On the other hand, utilization of these techniques may in certain circumstances make it possible to realize adequate sealing integrity without the use of membrane protrusions and support grooves. This is illustrated in FIG. 28.

The diffuser of this illustrative embodiment may include, as in the embodiment of FIG. 24, body 203, support 204, curved section 231, curved transition surface 232 and skirt 230, having a tip 233. However this embodiment differs from that of FIG. 24 in that there is no longitudinal groove in skirt 230 and no longitudinal protrusion in its membrane 265. Membrane 265 includes central perforated portion 266, non-porous marginal edge portion 267, longitudinal edge 268 and undersurface 269.

This membrane, when not inflated, extends, in at least outward and downward directions, from the generally horizontal support surface 270 over curved transition surface 232 until the angle at which the membrane lower surface extends has changed substantially. In this embodiment, when the membrane has reached a position 271 on side portion 272, which in this case is vertical, the angle change is about 70 degrees. This change is the difference between the membrane undersurface angular orientation at its starting inclination 276 at the upper edge of transition surface 232, which is about 20 degrees down from the horizontal, and its orientation at position 271, where it is vertical. Curving of the membrane outwardly and downwardly as it travels along transition surface 232 to position 271 produces this change. Marginal edge portion 267 of membrane 265 is not secured to the body above position 271.

The membrane can be secured to the body wherever the desired angle change has occurred, e.g., at position 271. In this embodiment, the membrane extends beyond position 271 down along the generally upright side portion 272 of the body and around its tip 233. The membrane is held in place with the aid of a longitudinal securing means, in this case by resilient clamping clip 274.

Inflation of the membrane in operation, as indicated at 275, causes the undersurface 269 of membrane 265 to press against curved transition surface 232. This at least assists in forming a longitudinally-extending gas-tight seal between the membrane undersurface and the transition surface. Frictional engagement between these surfaces assists in countering to some extent the tendency, if any, for the inflated membrane to try to pull free from clip 274.

Grooves with inserts can be used to advantage to assist in securing to bodies membrane edges having no protrusions. Also, grooves of widely varying shape can be employed, with or without inserts separate from the membranes. A variety of groove shapes can be used with membranes which do and do not have protrusions.

Where inserts separate from the membranes are used with membranes which do not have protrusions, there may for example be longitudinally-extending grooves at each edge of the support surface with mouths and generally parallel, planar side walls which are spaced apart by about the same distance as the width of the mouth. The membranes can have perforations in their central portions. Unperforated marginal portions are bent into a U-shape and held in place by an insert, for example a wedge wide enough to tightly compress the membrane against the groove side walls.

It is also possible to use longitudinally-extending grooves, located at the edges of the membrane support surface, having undercut walls. Thus, the inner portions of these grooves are wider than their mouths and may for example be of rounded cross section. Membranes with unperforated marginal portions can be bent into a generally O-shaped configuration. Here, inserts can be provided that are wider than the difference between the groove mouth width and twice the thickness of the membrane. For example, these inserts may be rounded and preferably are of circular cross-section. Preferably, the inserts are of sufficiently large cross section as to be able to cause contact between the bent marginal portion of the membrane and at least the majority of the surface of the inner portion of the groove.

Yet another configuration includes a groove having mouths and inner portions of trapezoidal shape which are wider than the mouths. These may be used with membranes having a perforated central portion and unperforated marginal portions which are bent to fit the trapezoidal shapes of the grooves. Inserts, for example T-shaped members, are provided with heads wider than the difference obtained by subtracting from the groove mouth width twice the thickness of the membrane. Preferably, the heads of the Ts are of sufficient width to be able to cause contact between the bent marginal portions of the membranes and at least the majority of the surfaces of the inner portions of the grooves. Instead of using a T-shaped insert, an insert of triangular cross-section, solid or hollow, can be used with the trapezoidal groove.

FIG. 29

Figure 29:
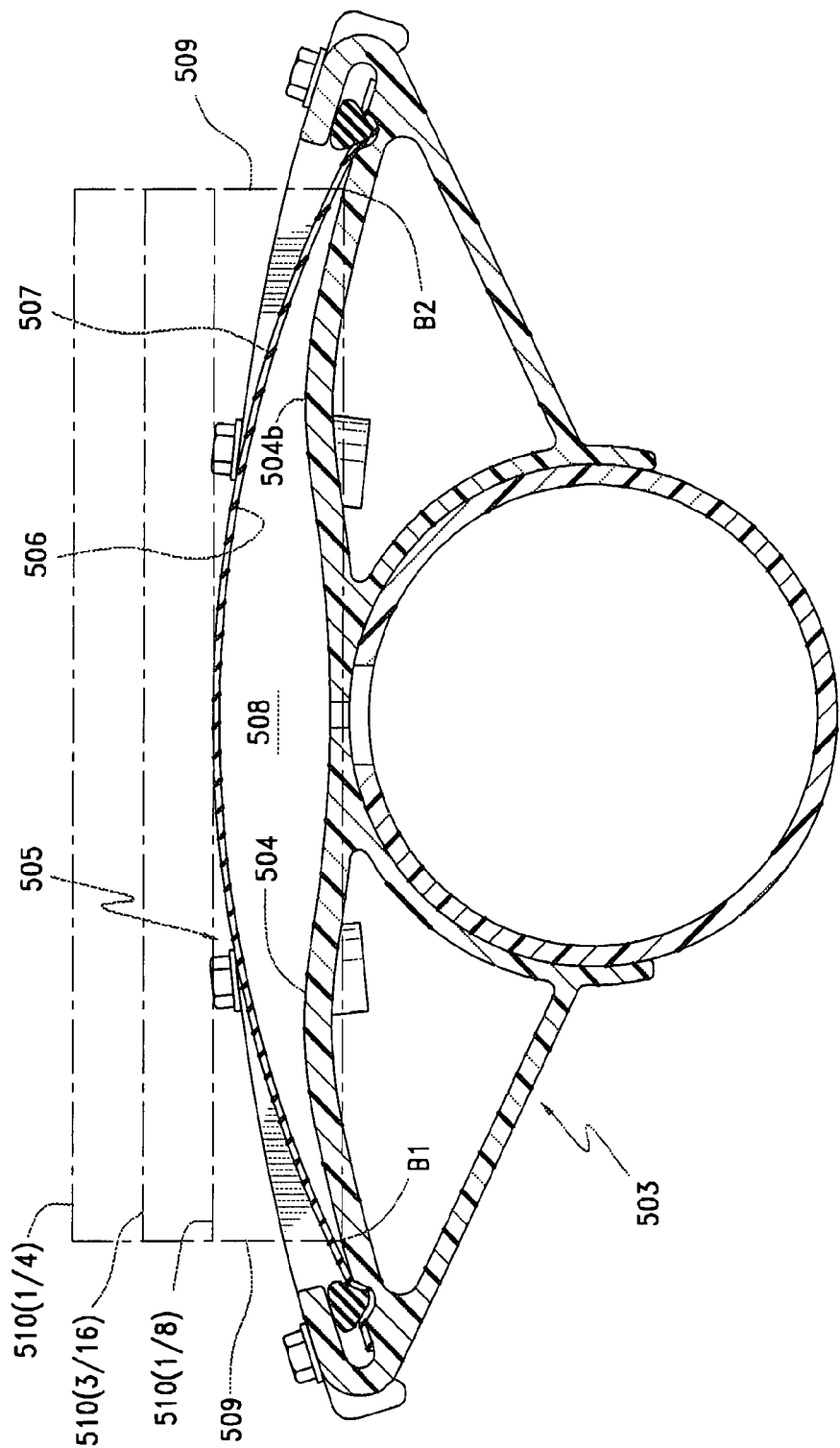
FIG. 29 is a transverse cross-section of still another diffuser embodiment with a pipe, membrane support and inflated membrane, the lateral portions of the membrane support being free of integral underlying bracing, and having edge securing grooves formed on the brace-free support portions, groove inserts, end clamps and arcuate clamps.

FIG. 29 shows a diffuser body comprising pipe 500, one of a series of flow regulating orifices 501. The apex of the pipe coincides, in this embodiment, with the vertical central axis (not shown) of orifice. Here, connecting portion 503 of the membrane support comprises the pipe apex, located between two thickened regions 502a and 502b.

In this embodiment, as in that of FIG. 30, discussed below, where there is more than one thickened region, they may be spaced apart or separated from one another, in transverse cross section, by a portion of the pipe wall which is not substantially thicker than most or all of the remainder of the peripheral wall outside of connecting portion 503. Thus, in this embodiment the pipe 500 wall thickness at orifice 501 is no thicker than all of the remainder of the peripheral wall outside the connecting portion.

Figure 30:
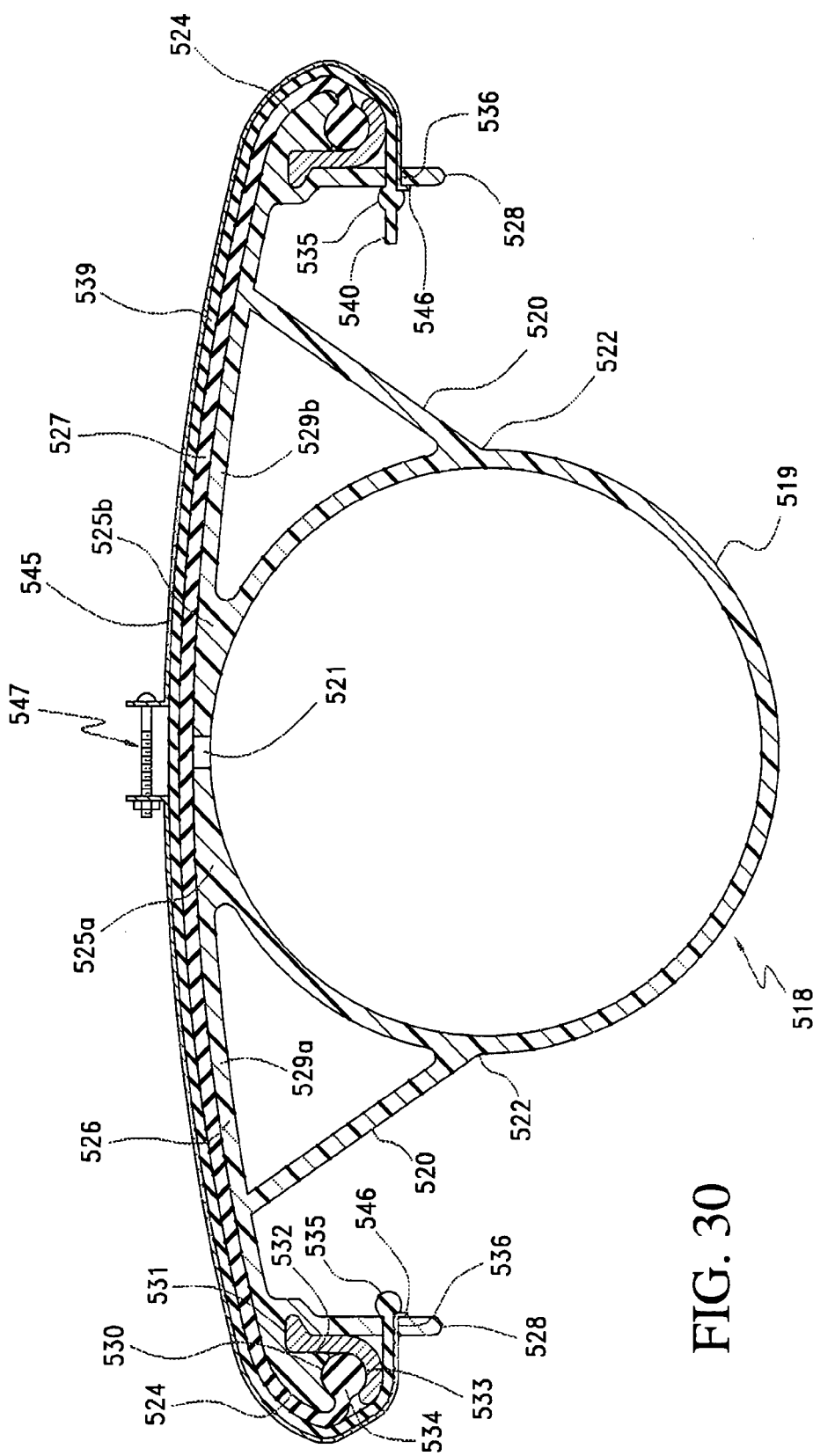
FIG. 30 is a transverse cross-section of another embodiment of a diffuser in which part of each lateral portion of the membrane support is free of underlying bracing, edge securing grooves are formed in part by J members and end securing and sealing means are provided that include a strap and an auxiliary clamping means.

FIGS. 29 and 30 exemplify embodiments in which the connecting portion is thicker than the remainder of the pipe wall along at least about 90% of the length or combined length of a portion or portions of the length of the inner surface which the remainder adjoins. In these two cases, the connecting portions (e.g., 503) are thicker than the remainder of the pipe wall along substantially the entire length or combined length of the portion or portions of the length of the inner surface of the pipe (e.g., pipe 500) which the remainder adjoins.

In preferred embodiments of the invention, along at least one lateral portion, that lateral portion extends laterally from a nexus at which the lateral portion is joined with the connecting portion of the support to an outer edge of that lateral portion, and the lateral portion or portions is/are free of underlying bracing connecting it/them with the pipe. These characteristics are present in support 503 of FIG. 29, which has lateral portions 504a and 504b, integral with the connecting portion.

Here, lateral portions 504a and 504b respectively extend to the left and right of connecting portion 503 as viewed in transverse cross section and, unlike the embodiments of FIGS. 11 and 30, are free of underlying pipe-to-lateral portion connecting bracing from the location at which each lateral portion is joined with the connecting portion to an outer edge of that lateral portion.

In any of the embodiments of the invention, at least one thickened region or connecting portion and at least one lateral portion can have upper surfaces, and at least one lateral portion upper surface can extend generally horizontally from the at least one thickened region upper surface. In the present embodiment, connecting portion 503 and lateral portions 504a and 504b have upper surfaces which, although including gentle arcs, comprise, in combination, a support upper surface that extends generally horizontally over a sufficient interval of width to properly support a membrane diffusion element 506.

Elongated in the direction of the central axis of pipe 500, membrane 506 has gas influent surface 506 and gas discharge surface 507. They are connected by gas discharge pores (not shown). The membrane ends and longitudinally extending marginal portions are connected in sealing engagement with the support.

Two clamping bars 511 (only one shown), held in place by machine screws 512 at the ends of the support, secure and seal both ends of the membrane. U-shaped structures that include flanges 513, extending along the longitudinal edges of the support, form longitudinal slots 514, lying generally parallel to the support surface and opening towards its center.

In these slots, throughout the distance between the membrane ends and clamping bars 511, the membrane marginal edges 515, which are free of pores, are secured and sealed in grooves 516 by generally triangular or other suitably shaped resilient securing members 517. These are sufficiently tall so that they are compressed between the under-sides of flanges 513 and the upper surfaces of the membrane marginal edges 515, pressing the latter firmly into the grooves 516.

In any embodiment of the invention, including this one, a diffuser body and membrane are designed, configured and dimensioned to restrain the membrane, whatever its properties may be, within a specified operating envelope, under normal conditions of operating temperature and pressure for the membrane. FIG. 29 illustrates this principle using the particular support, end seal and edge seal design described above, but the principle may be readily applied to other embodiments of the invention.

According to this embodiment, when the membrane 505 is inflated, its gas discharge surface 507 is held by the diffuser body substantially within an envelope that, when viewed in a transverse cross-section of the body and membrane, has a base line that connects two points B1-B2. These are points at which the body and the gas influent surface of the membrane enter into contact with one another at the edges of a gas chamber 508 formed under the membrane when it is in operation. The vertical side lines 509 of the envelope are perpendicular to the base line at each of said points B1-B2. Top lines 510 (⅛), 510 (³⁄₁₆) and 510 (¼) of three envelopes having a common base line B1-B2 respectively run parallel to, above and at a distance from the base line of about ¼ the distance, preferably about ³⁄₁₆ the distance and most preferably about ⅛ the distance, between the side lines.

Whether a given body complies with the preferred condition of being configured and dimensioned to restrain a given membrane, under normal conditions of operating temperature and pressure for the membrane, within any of the operating envelopes described above, may be determined in laboratory tests. For example, a complete diffuser, connected to a controllable air supply, may be submerged in a shallow tank with a transparent side through which the membrane may be observed. The tank may be as shallow as desired, provided there is sufficient depth to cover the apex of the membrane, when inflated, to a depth of at least about 12 inches. The elevation of the apex is measured with the membrane inflated and not inflated. The elevation of the inflated membrane apex is measured while air is supplied to the membrane at a rate, temperature and pressure drop across the membrane typical of or equivalent to ordinary operating conditions for the membrane. If the fraction resulting from dividing the difference in elevation of the apex in the inflated and uninflated states by the width of the diffuser gas chamber is within the range of up to about ¼, the diffuser body is in compliance.

A non-compliant diffuser, one for which the above-described fraction substantially exceeds ¼, may be brought into compliance by a number of measures and simple experiments which are well within the ability of one of ordinary skill in the art. For example, one may make one or more of the following adjustments and test the adjusted parts to determine whether the amount of adjustment has been sufficient or should be increased. One may increase the membrane thickness and/or modulus, increase the quantity of perforations, choose a style of perforation that discharges gas more readily, provide an inflation-limiting device or clamp the membrane into the diffuser in a pre-stretched condition.

FIG. 30

The FIG. 30 embodiment has an extruded body 518 with integrally formed plastic pipe 519 of nominal 4 inch diameter, an overlying arcuate membrane support member 526, longitudinally spaced orifices 521 passing through common portions of the support and the pipe apex, bracing webs 520 extending from the pipe to the underside of the support member and curved transition surfaces 524 along each longitudinal edge of the support member.

Support member 526 has a connecting portion comprising the pipe wall apex in which orifices 521 are formed and two elongated, thickened regions 525a and 525b, also formed in the wall of pipe 519. These regions are separated by, and extend along either side of the apex and extend in the same direction as the pipe central axis.

Two lateral portions of the support, 529a and 529b, are integral with the pipe and connecting portion and extend laterally from the connecting portion and longitudinally with it and the pipe in the same direction as the pipe axis. These lateral portions extend out to the longitudinal edges of the support member and thus comprise the curved transition surfaces 524.

Transition surfaces 524 may be smooth throughout, as shown, but, in order to enhance securing and/or sealing of the membrane to the body, ridges may be formed in portions of these curved transition surfaces that are in contact with the membrane when it is inflated. Generally, it is preferred that these ridges have blunt rather than sharp edges and that they extend the entire length of the body. It is convenient to form them as integral parts when extruding the body.

Together, the connecting and lateral portions and transition surfaces provide a generally horizontal support member that, for example, may have a radius of approximately 18 inches and a width of approximately 10 inches overall, including transition surfaces. The transition surfaces may for example have radii of about ¾ of an inch.

Bracing, for example webs 520, extends upwardly and outwardly from the sides of pipe 519, from its equator 522, to the undersides of lateral portions 529a and 529b. Webs 520 join the lateral portions at locations intermediate, or spaced apart from, the respective thickened portions of the connecting portion and the lateral portion outer edges Joining webs 520 to the respective lateral portions at the locations described affords an opportunity, as illustrated in FIG. 30 and other embodiments, to provide space or spaces underlying at least part of one or both lateral portions. The spaces preferably communicate with the environment surrounding the diffuser and/or may be free of bracing connecting such part or parts with the pipe, and are thus available, for example, for situating and accessing means for securing and sealing the longitudinal edges of a membrane diffusion element to the support 526.

Any suitable edge-securing arrangement may be employed. However, in this embodiment, edge sealing and securing means are provided in segments of lateral portions 529a and 529b that extend outwardly from their junctions with braces 520. These segments, having enlarged bulk as compared to adjoining portions of support 526, reach outwardly and downwardly near the outer edges of the support. Using the left lateral portion 529a and its segment as an example, each segment includes a dependent leg 528, a downwardly facing first concave arcuate seal-engaging surface 530 and a keyway 531. The keyway is shaped and sized to receive the head and upper portion of the shank of a J-shaped key 532 comprising an upwardly facing second concave arcuate seal-engaging surface 533. The key-way and key are lockingly matable by length-wise insertion of the key into the key-way. To assist in insertion of the key into the keyway, low friction layers may be present in contact with or applied to those faces of these parts that contact one another during the sliding motion of inserting the former into the latter. Together, the keyway and inserted key can maintain the first and second concave surfaces in opposed relationship for securely and sealingly grasping between them a membrane edge seal of complementary shape, preferably an O-ring seal 534 on membrane 527. Corresponding parts may be provided on the right side of the device, as illustrated in un-numbered form in FIG. 30, or an entirely different form of securing and sealing arrangement may be used there.

As may be seen from the foregoing, the present embodiment is an example of a support having at least one longitudinally extending edge, wherein at least one lateral portion comprises a longitudinally extending membrane securing groove. In this case, grooves are formed at least in part by first and second concave arcuate seal-engaging surfaces 530 and 533 in each of two lateral portions.

FIG. 30 also exemplifies a support having an upper surface and a membrane edge-securing groove with a mouth located below that surface. The figure also illustrates a marginal portion of a membrane extending into a groove and being engaged there by a securing member, e.g., J-shaped member 532, which in this case forms part of the groove.

Any suitable membrane end securing and sealing means may be used. For example one may use metallic, rubbery or rigid resinous clamps, straps or bands, or adhesive tapes or layers that are reasonably stable in contact with the materials and other environmental factors present during operation of the diffusers. These means may be used singly or in combination. For example, where clamps, straps, bands or the like are used, adhesive bonding may be used to assist them in holding the membrane end in place.

Bonding (not illustrated in FIG. 30) may be provided by one or more layers of adhesive applied to an end portion or portions of the support upper surface and/or to the membrane underside, or by an elongated member, for example of flexible cellular or non-cellular polymeric tape having very high strength adhesive present on each of its major surfaces, preferably throughout said surfaces. Such member can for example extend transversely of the membrane 527 across the entire end thereof, passing in part between the upper surface of support 526 and the underside of the membrane, to adhesively bond the membrane to the support.

In FIG. 30, the end securing and sealing arrangement comprises elastomeric strap 539. It may be formed of any suitable elastomer, preferably EPDM rubber having a Shore hardness of about 60-70, and in any suitable shape, e.g., rectangular in plan view (not shown) and about one inch wide and about 12 inches long. It includes fastening means 535, portions of the strap that are of enlarged but compressible cross section, e.g., elements of cylindrical cross-section, at each end of the strap. These elements may have a radius of for example about ¼ inch and one of them may be spaced inwardly from one end of the strap to provide a lead-in tab 540 of about 1 inch in length.

Strap 539 is stretched in longitudinal tension across the upper surface of the ends of membrane 527, the strap fastening means 535 being secured to the body 518, e.g., in apertures, such as slots 536, located for example in the ribs 528. The widths of slots 536, for example about 3/16 inches in this embodiment, are established to permit fastening means 535, when compressed, to enter the slots and to hold the re-expanded securing means in place once inserted. Lead-in tab 540 can assist in effecting insertion of its adjacent securing means after the other securing means is inserted and while the strap is under tension.

The ends of the membrane 527 and/or of the support 526 may if desired have complementary protrusions (not shown) formed in their respective lower and/or upper surfaces, e.g., protrusions in saw-tooth patterns that have the tooth ridges set transverse to the length of the membrane and/or the support. The strap 539, or both the strap and the membrane, may optionally have protrusions, or complementary mutually engaging protrusions (not shown). If properly positioned, such protrusions can help maintain the position and sealing of the membrane relative to the support.

The end securing and sealing means can also include metal bands 545 at each end of the diffuser (only one being shown). These extend across the entire top surface of the elastomeric strap 534. The metal bands may extend around the entire diffuser (not shown). However, the metal bands preferably terminate in ends 546 fixed in the same slots 536 which are used to confine the ends of the polymeric strap 534. The metal band ends may be of any appropriate shape, e.g., bent, to confine them within the slots. To accommodate the metal band ends, slots 536 may need to be slightly wider than indicated above. Tensioning means, such as a bolt and nut 547 or a worm gear (not shown), may be included in the metal band to tighten it against the upper surface of the strap.

FIGS. 31-43

These figures disclose several embodiments involving a number of optional modifications of the invention. However, these embodiments preferably include a number of common features, which are identified by the same reference numerals throughout these figures.

Figure 31:
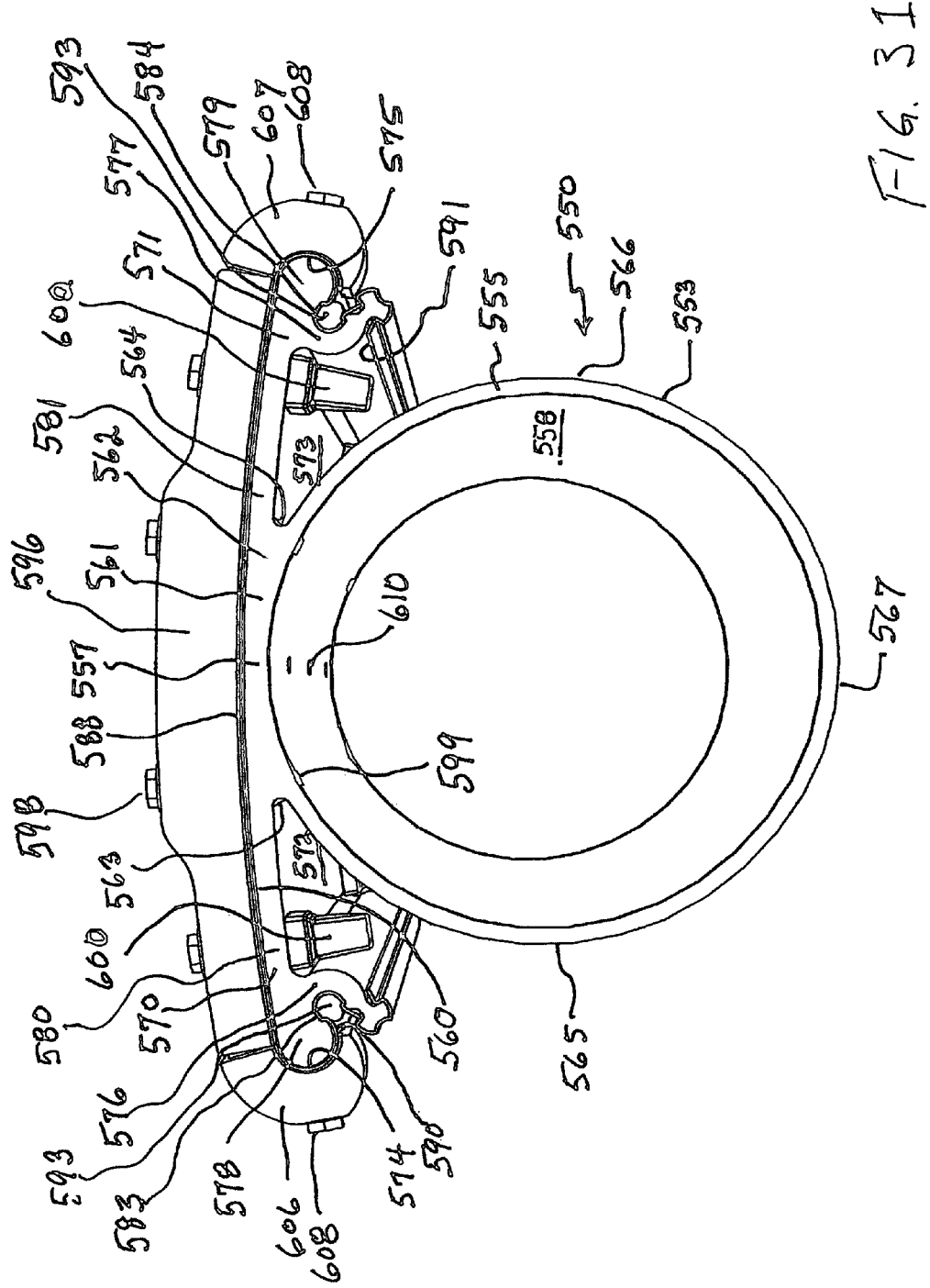
FIG. 31 is a perspective view of yet another diffuser embodiment with a pipe, membrane support and membrane, portions of the membrane support being free of bracing, edge securing grooves formed in part by limbs depending from the brace-free support portions, groove inserts, end clamps and arcuate clamps.

As illustrated by FIG. 31 and others, strip diffuser 550 comprises pipe 553, circular or non-circular in transverse cross-section, having a longitudinally extending central axis 554 (see, e.g., FIGS. 33 and 35), and a longitudinally extending gas flow enclosing peripheral wall 555 with apex 557 and inner surface 558. While the pipe and its integrally formed (e.g., co-extruded) support 560 may be of metal or polymeric material, they are both preferably of synthetic resin. A preferred resin is rigid PVC conforming to the properties set forth in ASTM D3915, cell 124524.

Membrane support member 560 is elongated in the direction of the pipe central axis, and the pipe is integral with the membrane support over approximately the entire length of the support. This embodiment of the support has a single connecting portion 561 that is integral with the pipe wall and comprises a single thickened region 562 of varying thickness. This region and the connecting portion comprising it extend angularly across pipe wall apex 557 between boundaries 563 and 564. This thickened region of pipe wall 555 is thicker adjacent these boundaries than it is at pipe apex 557

Connecting portion 561, when viewed in transverse cross-section along a portion of the length of pipe inner wall surface 558 which the connecting portion adjoins, is typically thicker than the remainder of the peripheral wall. "Remainder" refers to that portion of the pipe peripheral wall which is outside the connecting portion. The connecting portion is thicker than the remainder of the pipe wall along most of the length, or combined length, as the case may be, of a portion or portions of the length of the pipe inner surface 558 which the remainder adjoins. Preferably, the connecting portion is thicker than the remainder of the peripheral wall along at least about 90% of the length or combined length of a portion or portions of the length of the inner surface which the remainder adjoins. In the variants shown in FIGS. 31-42, the connecting portion is thicker than substantially all of the remainder, including the pipe side 565, 566 and bottom 567 wall portions.

According to the invention, a connecting portion can comprise at least one thickened region and at least one lateral portion that extends generally horizontally from the at least one thickened region. For example, a single lateral portion could extend laterally from the top, bottom or side of the pipe. However, in the embodiments of FIGS. 31-44, support member 560 includes two lateral portions 570 and 571 that are integral with the connecting portion 561 and upper portion of pipe 553, are positioned symmetrically on opposite sides of the pipe apex, and extend laterally from the connecting portion and longitudinally with the connecting portion in the same direction as the pipe axis.

In any embodiment of the invention, the support can have a generally horizontal upper membrane supporting surface. It comprises the upper surfaces of the connecting portion, including the thickened region or regions present in that portion, as well as the lateral portion or portions of the support. In these figures, support 560 comprises the upper surfaces of the single thickened region 562 included in connecting portion 561 and of lateral portions 570 and 571.

In these embodiments, this upper surface, viewed in a transverse diffuser cross-section, is substantially smooth, generally horizontal and gently arcuate and extends across the interval between two edges 574 and 575 on the lateral portions. These edges, in this case, are the edges of the support 560, and extend longitudinally along each side of the support. Edges 574 and 575 each comprise a curved edge surface that curves from the upper surface of the support outwardly and downwardly and then downwardly and inwardly to beneath lateral portions 570 and 571. This curved surface may encompass enlarged outer portions 578 and 579 of the respective lateral portions. These outer portions are of enlarged bulk or cross-section as compared to narrower segments 580 and 581 of the lateral portions. The narrower segments are less in vertical height than the outer portions and are disposed in a connective relationship between the outer portions and the connecting portion.

Lateral portions 570 and 571 have beneath them spaces 572 and 573 in open communication with the environment surrounding the diffuser. It is particularly preferred that at least one and preferably both of the lateral portions be free of integrally extruded underlying pipe-to-lateral portion connecting bracing across the transverse interval from the location at which the lateral portion or portions is/are joined with the connecting portion to the outer edges 574 and 575 of the lateral portion(s).

It appears advantageous that the space underlying the lateral portion(s) be free of bracing which is co-extruded with the pipe and support and which connects the pipe to the lateral portion(s) as integrally joined parts within that portion of the diffuser transverse cross-section extending from the location where the lateral portion or portions is/are joined with the connecting portion(s) to the outer edges 574 and 575 of the lateral portion(s). Doing so has assisted in maintaining consistent body alignment, profiles and dimensions in extruded pipe and support combinations. Although such bracing may be provided if desired, for example as illustrated by FIGS. 9 and 30, it is preferred when such bracing is provided, that it be a series of discrete braces spaced along the length of the combination at such intervals of distance as will provide the desired degree of strengthening of the diffuser body. For example, upright gussets that are positioned perpendicular to the pipe axis may be solvent-welded between the underside(s) of the lateral portion(s) and facing portions of the pipe outer surface. Or spaced, discrete inclined braces parallel to such axis and connecting the lateral portion undersides to facing portions of the pipe may be provided. More preferably however, along at least one lateral portion, extending laterally from a nexus at which that lateral portion is joined with said connecting portion to an outer edge of that lateral portion, that lateral portion is free of underlying bracing connecting it with the pipe.

Also included in this embodiment of the diffuser is a membrane diffusion element 587 with pores (not shown) in its central portion, representing most of its width. Elongated in the direction of the central axis of the pipe, the membrane has ends 588 and 589 (see FIGS. 31 and 35). The membrane also has, along its edges, longitudinally extending marginal portions 590 and 591 which are preferably free of pores. Preferably, the membrane surface is "plain", that is free of substantial protrusions, although it may for example vary in thickness and/or porosity across its width, such as to form a check valve or equalize flow between its central and outer portions.

The membrane is secured, along the membrane marginal portions and at its ends, with the aid of any suitable securing arrangements, in sealing engagement with the support. When supplied from beneath with one or more gases such as air, membranes have a tendency to develop internal tension and/or to lift free to some extent from the support. Tension results from stretching forces imposed on the membrane by back pressure experienced as a result of discharging gas through the pores. Lifting free can result from inflation of the membranes in response to such back pressure. Tension causes the central portions of the membranes to tug inwardly on their marginal portions. Lifting free can to some extent, in some diffuser configurations, reduce the extent to which frictional engagement between the marginal portions and the membrane support is available to help reduce membrane pull-out forces on the securing arrangement, particularly along the longitudinal edges of the membranes. Thus, tugging and/or lifting free can create a potential, in extended periods of operation and/or at high back-pressures, for the membrane marginal portions to migrate to some extent through the grips of the securing arrangements and/or to break free from them, leading to local distortion of the membranes or their pulling free entirely, leading to failure of their seal with the support and poor diffuser performance.

One or a combination of membrane marginal portion and end securing arrangements able to provide satisfactory securing and sealing may be employed. For example, one may use any one or a combination of securing members, such as: an adhesive layer in the form of either strips of adhesive compound and/or two-sided adhesive tape applied at the marginal portion-support interface; rigid hold-down strips clamped against membrane outer surfaces along the marginal portions by screws or other fasteners that pass through these strips and the marginal portions and into or through the support; and/or grooves, into which the marginal portions extend, and cooperating securing members, such as strips jammed into the grooves with the marginal portions, which fixedly secure them in the grooves.

Adhesive compound, when used, may be present at the interface(s) between the membrane and support as a securing member or auxiliary to another form of securing member. It may be applied as setable liquid or paste, or may be present in the form of tacky solid adhesive during installation of the membrane on the support. Use of adhesive may require removal, e.g., by cutting or routing out, of the adhesive, other securing member and/or membrane when replacing old membranes with new.

Where marginal portions are secured in grooves with cooperating securing members, these members and grooves may be of any shape and size sufficient to cause firm frictional engagement of the marginal portion within the grooves, such as by pressing the marginal portions firmly against an inner wall or walls of the respective grooves. Such securing members may be circular or non-circular in cross-section and range in physical properties between substantially rigid down to compressible but sufficiently stiff in transverse compression for firmly gripping the respective membrane marginal portions. For example, one may use securing members of silicone polymer having circular cross-section and a durometer (Shore A) rating in the range of 60-75.

The cross-sections of the securing member and/or groove shapes may include blunt or pointed corners, projections and depressions, preferably corners, projections and depressions in and/or on the securing member and groove that are interlocking or otherwise complementary, to resist migration of the margins past or through them. As will be discussed below, securing members in the form of elongated strips may be used to cause tight clamping or locking of membrane margins directly against groove walls.

When using stiff, moderately compressible securing members and grooves having sealing projections on their walls, it has been found possible to use securing members with circular cross-sections that are tightly engaged with the membrane marginal portions. In other situations, non-circular securing member cross-sections may inhibit securing member rotation and possible marginal portion migration in response to tugging of the membranes. On the other hand, it may be possible to select cooperative securing member-groove configurations that permit limited rotation that causes an increase in the pinching of the marginal portions between these parts.

Another measure for combating migration is to form a hem in the membrane margin that, when the membrane and securing member are installed in a groove, resides at the mouth of the groove. When properly positioned, membrane migration will draw the hem toward and into contact with the securing member, thus blocking further migration.

While the securing members, whatever kind one may use, can be located in upper or side surfaces of or beneath the support 560, it is preferred, as will be described below, to secure the marginal portions with elongated grooves and cooperating inserts beneath the upper surface of the support and to secure the membrane ends with clamping members situated, at least for the most part, above the upper surface of the support.

In some preferred embodiments, limbs are formed at or beneath the undersurface of the support. It is particularly preferred that grooves be formed with the aid of limbs formed integrally, e.g., by co-extrusion, with the pipe and support.

Figure 38:
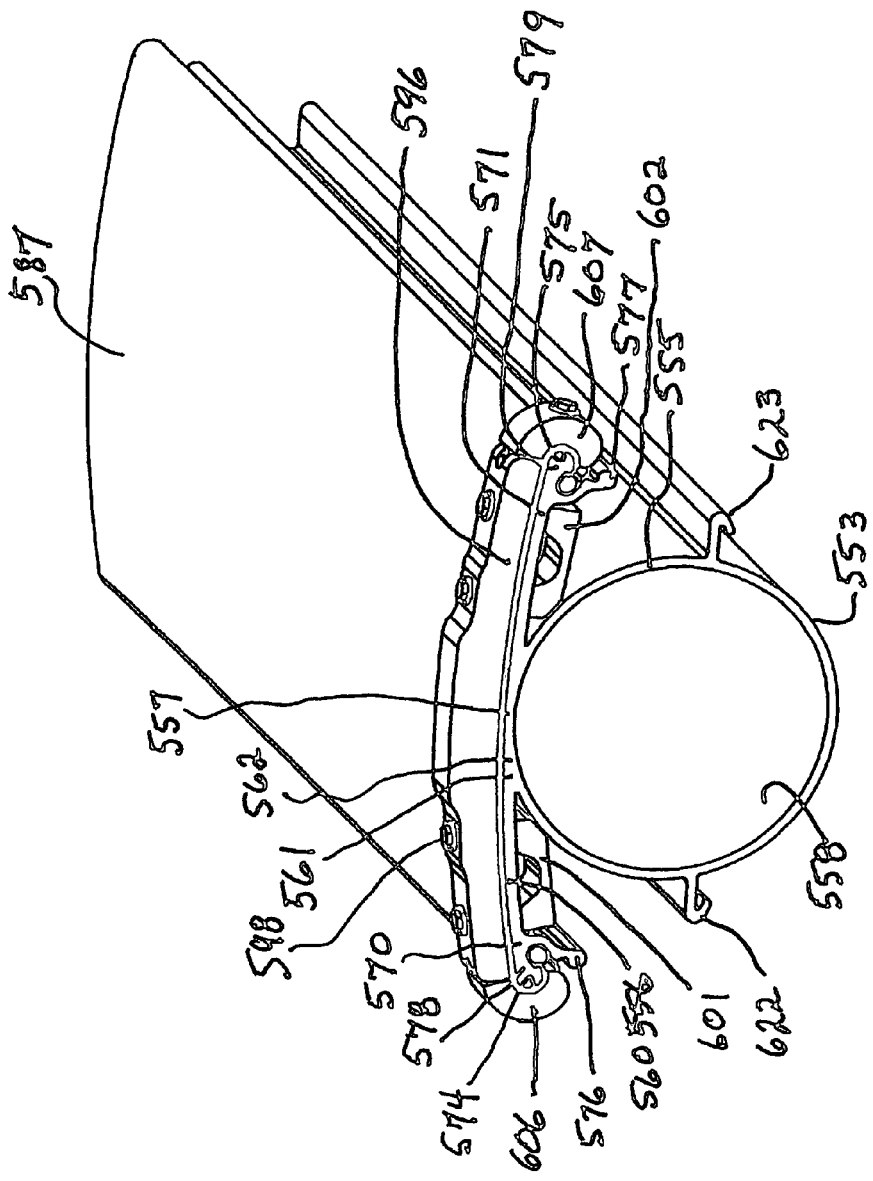
FIG. 38 is a perspective view of another embodiment of a strip diffuser generally similar to that of FIG. 31, but having modified limbs and membrane end clamping bar fastenings, as well as projections formed on the pipe to engage mounting stands for securing the diffuser to the floor of a liquid treatment tank.
Figure 39:
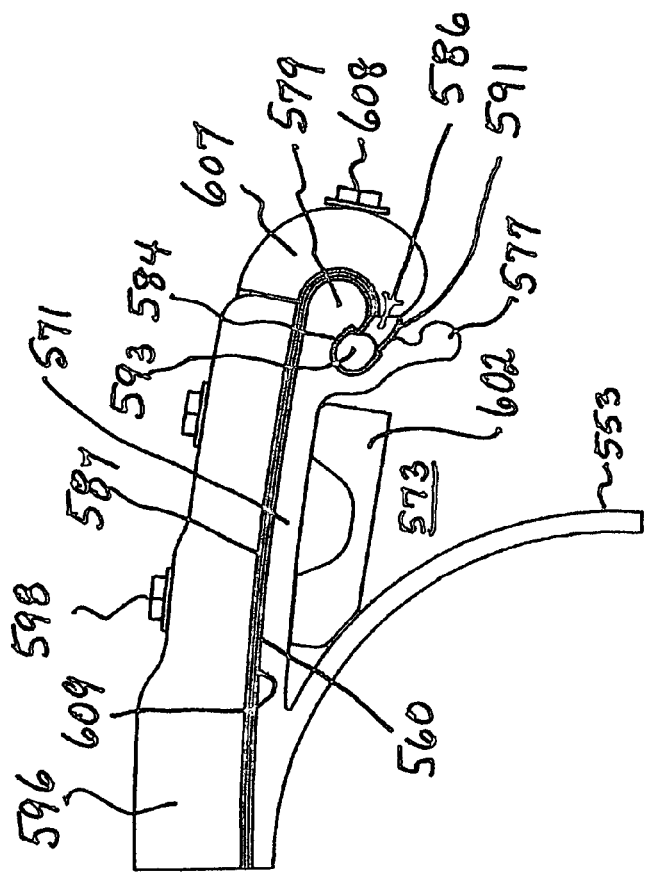
FIG. 39 is an enlarged portion of the end of the diffuser of FIG. 38.

At least one such limb may extend downwardly from and longitudinally with at least one lateral portion, and preferably from both of the lateral portions. Thus, for example, as shown in FIGS. 31, 38 and others, limbs 576 and 577, integral with their respective lateral portions 570 and 571, extend longitudinally with and downward from the lateral portions. Preferably, the respective limbs extend toward some part of the underside of its respective lateral portion and most preferably toward enlarged outer portions 578 and 579 where such are present.

More preferably, limbs 576 and/or 577 approach some part of the undersides of its/their respective lateral portion(s), for example approach the inner sides or bottoms of enlarged outer portions 578 and 579 if such are present. Preferably, the approach of the limbs is sufficiently close to define, between the limbs and the parts so approached, longitudinally extending membrane securing grooves 583 and 584.

Whether or not formed in part by limbs, such grooves are preferably located below the upper surface of support 560 and have mouths, for example mouth 586 shown in FIGS. 32 and 41, which are also located below (at an elevation lower than the nearest part of) that surface. More preferably, the groove mouths are inward of the outer edges 574 and 575 of their respective lateral portions. Most preferably, grooves 583 and 584 are located in the under-sides of their respective lateral portions.

If membrane margin securing and sealing is accomplished with grooves, such as the grooves 583 and 584, marginal portions 590 and 591 of the membrane preferably extend into the grooves and are engaged there by at least one resilient securing member 593. This member is preferably of circular cross-section and of a size sufficiently larger than the combined width of the groove and portions of the membrane marginal portion in the groove (i.e., having an interference fit with the groove and portions of the membrane therein) to press its respective membrane marginal portion firmly against the entire inner wall surface of such groove. Also, securing member 593 is sufficiently stiff in transverse compression to press the respective membrane marginal portion very firmly against the inner wall surface of such groove. For example, one may use securing members of silicone polymers with Durometer (Shore A) ratings in the range of about 60 to about 75.

Preferably the grooves, when utilized, are positioned and oriented to cause membrane 587, after departing from the upper surface of the support, to be bent downward, as viewed in transverse cross-section, along a securing path around outer edges 574 and 575, to the extent of deviating by at least about 90 degrees from the horizontal. In more preferred embodiments the deviation is at least about 120, at least about 150 or at least about 180 degrees. In the preferred diffuser configurations shown, this can have the effect of enhancing the development of migration-opposing friction between the inner surface of the membrane and adjacent surfaces of the support outside the grooves. Locating the grooves in the preferred manner described above tends to enhance this effect, as do providing the enlarged outer portions 578 and 579 and forming the outer surfaces of these outer portions as smooth curves that extend outward, downward and inward. These several features can help maximize, when applied alone or in combination, surface contact and migration-opposing friction between the inner surface of the membrane and adjacent surfaces of the support.

Optionally, the strip diffuser may include attachment members, secured to the underside of the support near the edges of the membrane. Where membrane edges are held in grooves with the aid of securing members inserted into the grooves with the membrane margins, this attachment member preferably represents a blocking member by virtue of being located at the mouth of the groove, and obstructs the mouth of the groove. Then the attachment member may, for example, be of assistance in inhibiting escape of the membrane securing member from the groove.

Figure 32:
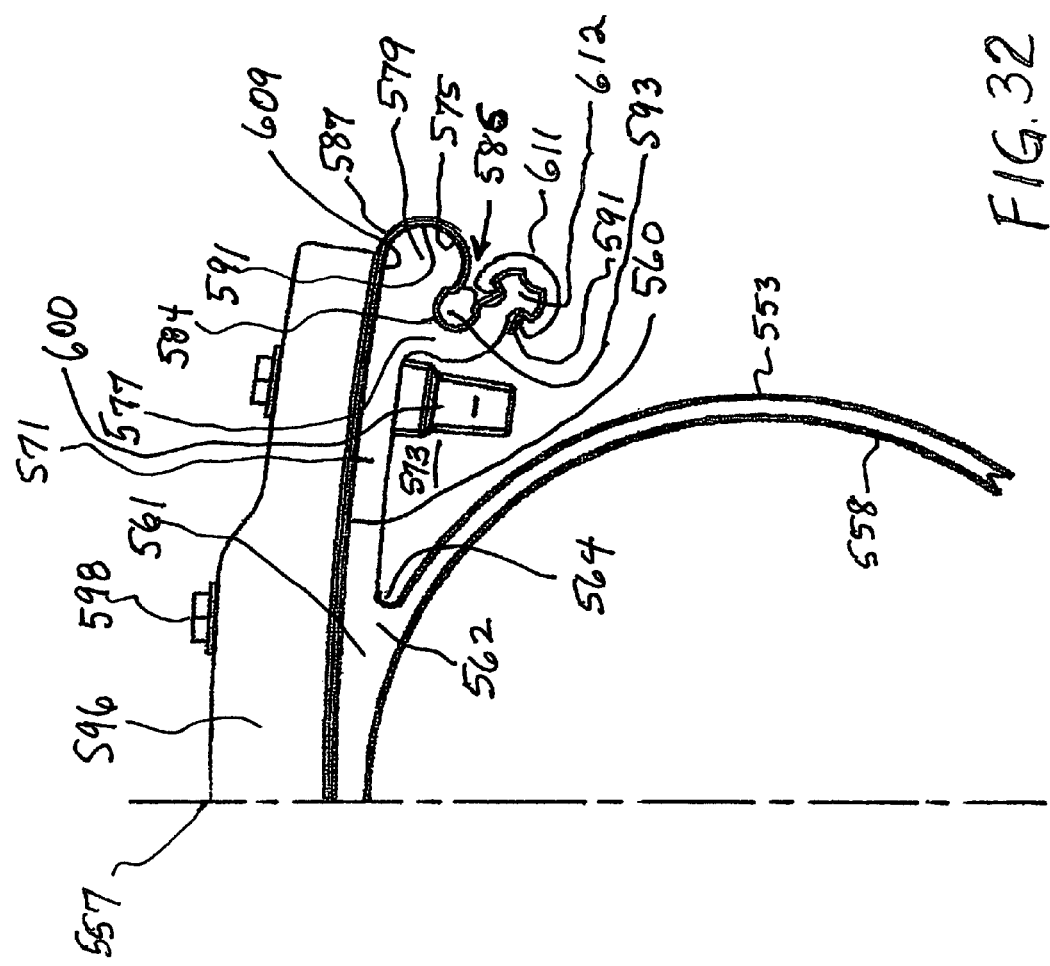
FIG. 32 is a an enlarged, partial half section of the diffuser of FIG. 31, with the arcuate clamp removed from the depicted support lateral portion, the limb having an added clip member in engagement with a complementary profile on the end of the limb.

An example of such a blocking member is found in FIG. 32. There, a snap-action clip-on attachment member 611 is provided that can resiliently expand to fit over and then contract around and grasp a shoulder assembly 612 formed on the lower end of limb 577. Where there is such an attachment member, it can be provided with an membrane edge protector extension 613, shown for example in FIGS. 33, 34, 35 and 42. It reaches up toward and around the sides of the membrane at its edges 574 and 575 and can protect those edges during shipment and installation of the diffusers.

Figure 33:
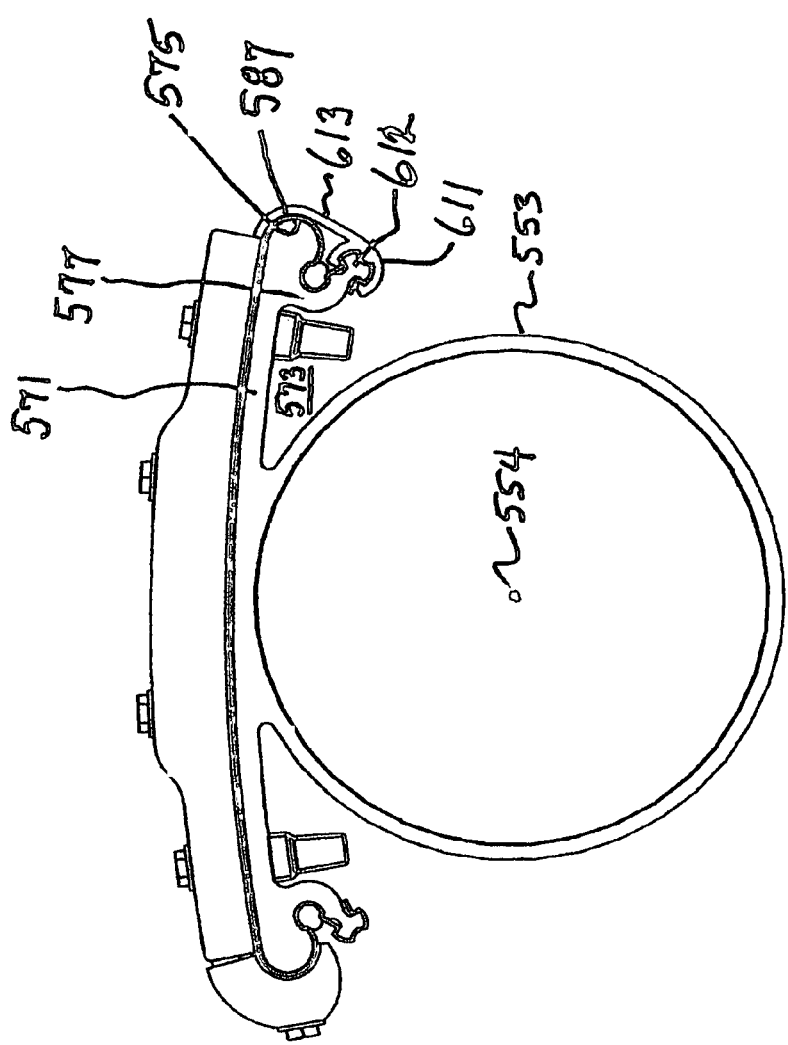
FIG. 33 is an end view of the diffuser of FIG. 31 having on one of its limbs a clip member similar to that of FIG. 32 which has been modified to include an extension that overlaps and protects the membrane at the edge of the diffuser.
Figure 34:
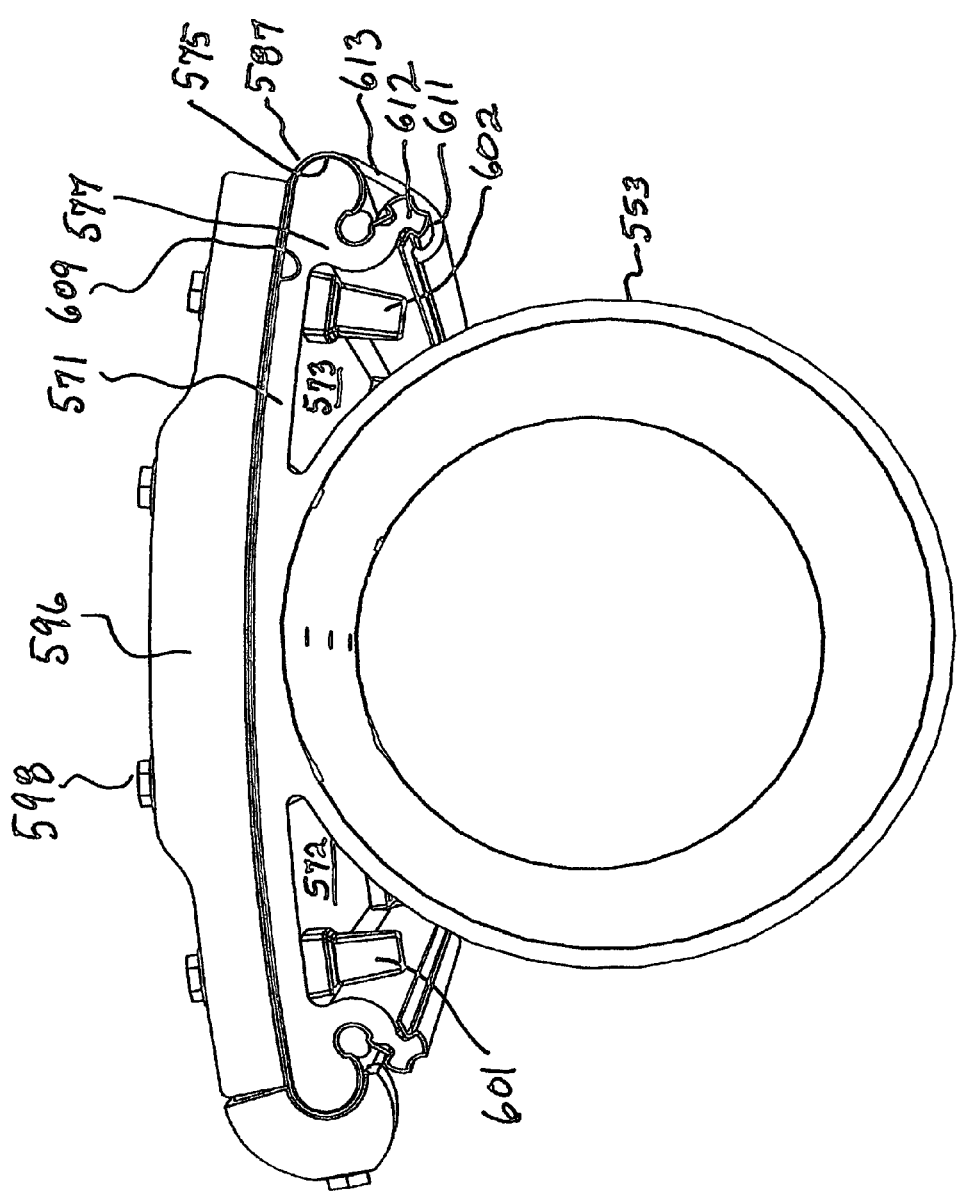
FIG. 34 is a perspective view taken at the end of the FIG. 33 diffuser.
Figure 41:
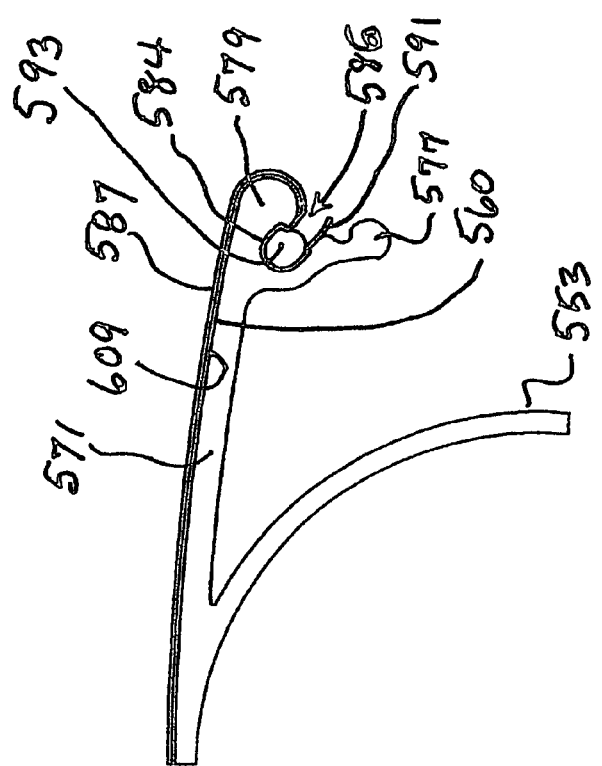
FIG. 41 is similar to FIG. 39, except that, for the sake of clarity in illustrating the pipe, membrane support, membrane, limb and securing member, all other parts have been omitted.
Figure 42:
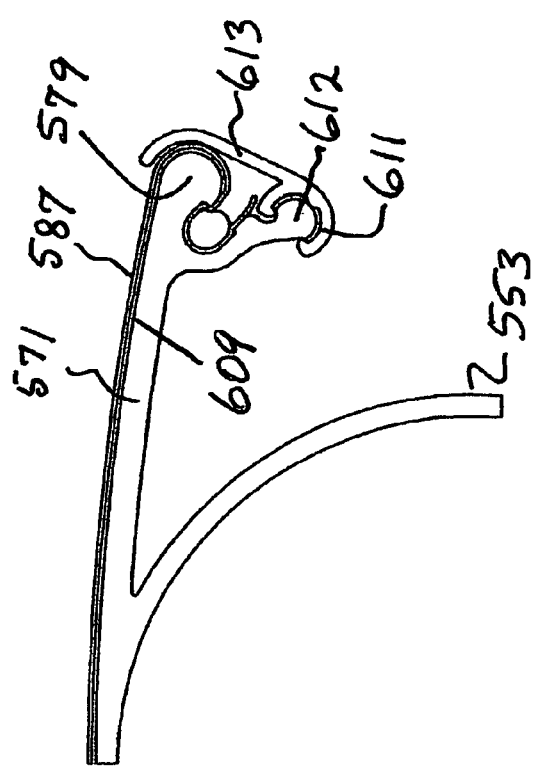
FIG. 42 is similar to FIG. 41, to which has been added a clip with a membrane edge protector similar to that of FIGS. 33 and 34.
Figure 43:
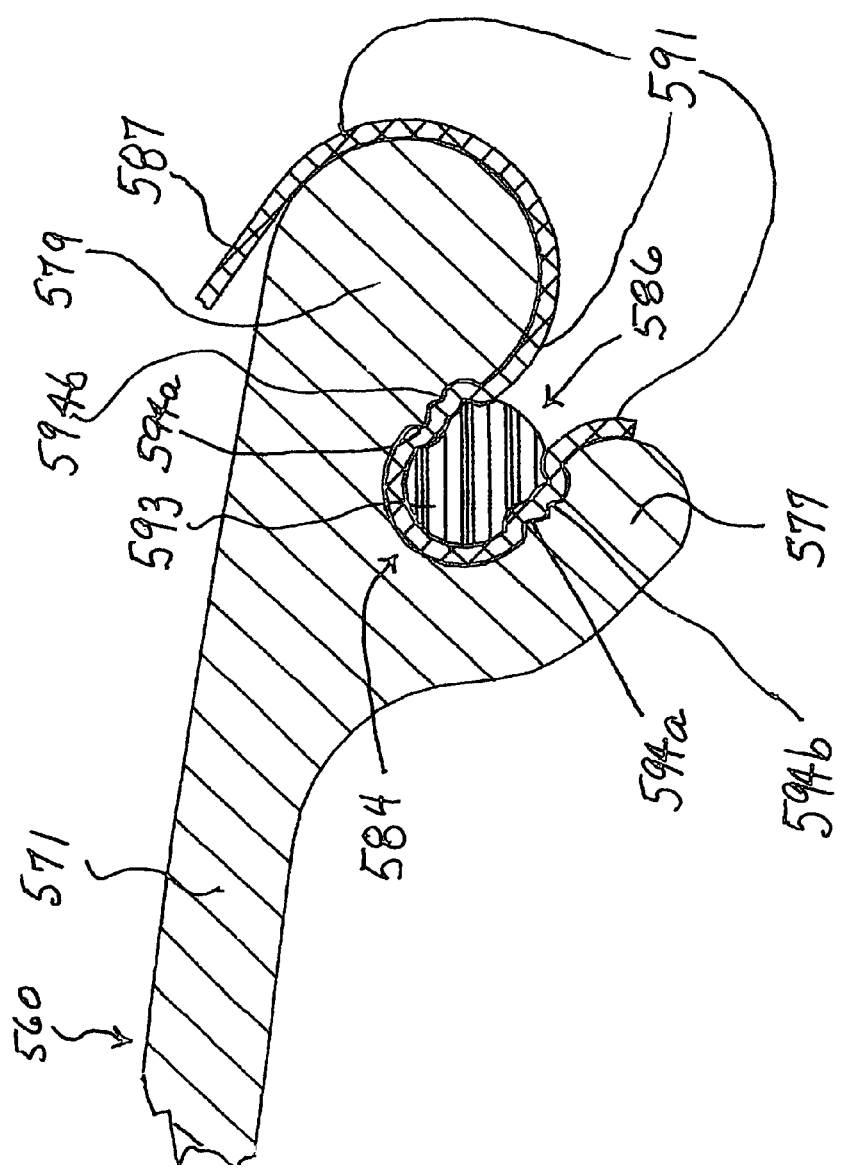
FIG. 43 comprises an enlarged portion of FIG. 41, portions thereof being removed or modified.

A preferred embodiment of limb, groove and securing member is illustrated in FIG. 43, an enlarged and modified portion of FIGS. 33 and 41. In common with these and other previously described figures, this embodiment includes an integrally formed pipe and support 560 and at least one lateral portion 571, the latter including enlarged outer portion 579 and limb 577. Limb 577 and enlarged outer portion 579 run longitudinally with the pipe and support, and have between them a longitudinally extending groove 584 with an interior portion and relatively narrower mouth. Attachment member 611, shoulder assembly 612 and edge protector extension 613 are not employed in this embodiment.

The groove interior portion and mouth are sized and shaped to securely/fixedly retain within the groove a membrane diffusion element marginal portion 591 folded around a resilient, circular cross-section securing number 593. By way of illustration and not limitation, for a membrane diffusion element 587 and marginal portion 591 that are 0.024" thick and a 0.210" diameter securing number 593, the groove interior portion may have a bullet-shaped transverse cross-section that is 0.225" in width, have an arcuate inner wall or nose with a 0.1125 radius, be 0.213" deep at its deepest point (measured along its central axis), have 0.035" radius transitions from the groove side walls to its outer end walls and have sharp, e.g., right angle, transitions at the junctions of the outer end walls and mouth 586.

The mouth may for example be 0.155" in width at its narrowest point, e.g., at its junctions with the groove inner portion outer end walls. The mouth walls may be inclined to widen in the direction of the mouth's open end and/or have chamfered edges at that end to facilitate simultaneous entry of the securing member 593 and surrounding membrane marginal portion 591 into the groove.

Extending longitudinally in the parallel sidewalls of the groove are at least one and preferably two opposed pairs of rib-like projections, e.g., 594a and 594b. Their heights may, by way of example and not limitation, represent at least a substantial portion of membrane thickness. Ribs 594a and 594b may have, based on measurements from the groove side walls, wall inclinations of about 45 to about 50 degrees and heights of 0.008" and 0.015" high, respectively, at their peaks, which may be arcuate peaks with radii of 0.005".

The securing member 593 is for example a 0.210" diameter straight-line length of the type of circular cross-section silicone rubber stock that is used in making O-rings. It exhibits substantial stiffness and internal shape restoration force in response to radial compression and may for example have a Durometer (Shore A) value of 70-75.

Working out from these illustrative values that have proven successful, persons skilled in the art can derive other workable combinations of shapes, dimensions and properties for the groove and securing member.

Although it is preferred to co-extrude the pipe and support, and is possible to extrude the groove at the same time, some advantages appear to accrue from post-forming the groove, such as by routing it out of an already co-extruded pipe-support combination having no groove in it. Thus, the pipe and support with lateral portions 571 may be extruded without groove(s), i.e., without a gap between those portions of part 571 that will, by later removal of material in the above way, eventually become outer portion 579 and limb 577.

Some extrusion resin formulations are more abrasive than others. When more abrasive formulations are used in extruding grooves with or without ribs, especially grooves with small ribs, the ensuing wear on the extrusion dies can lead to accelerated wear of the groove-producing portions, including the rib-producing portions where such are provided. In some instances, the manufacturing tolerances for such ribs and grooves, including in some cases the mouths of the grooves, can be critical. Die wear resulting in loss of the desired groove or groove and rib tolerances can lead to too frequent shutdown and repair or replacement of dies. This difficulty can be avoided or at least partially overcome by forming the groove(s) wholly or at least partly with rotary cutting tools, e.g., routers, of cross-section corresponding to the desired groove or rib cross-section. Single or plural tools and routing steps may be used to form the grooves or their inner portions and/or mouths.

However, it is also possible and may prove advantageous to at least partly post-form the groove. For example, an elongated crevice can be formed by extrusion in the intended groove location on a co-extruded pipe and support while extruding the latter. Then, the groove can be formed by cutting away material from the interior of the crevice, such as with a router. This technique of forming the groove subsequent to extrusion may, in some circumstances, provide a good balance between die longevity, ease and rate of extrusion and maintenance of desired tolerances.

In other circumstances, especially when working with resin formulations and/or groove configurations for which die wear is not a significant issue, the groove, and any ridges therein, may be co-extruded completely with the pipe and support. In this way, simultaneous forming of outer portion 579 and limb 577 are possible.

Roughening the inner surface of the groove(s) during or after formation appears advantageous from the standpoint of inhibiting the membrane marginal portion from migrating in or escaping from the groove. Cutting the groove mechanically, as with a router, affords some roughening and in certain instances will provide all of the roughening required. Roughening can optionally or additionally be effected by the scratching of or the forcible projection of rough particles against, e.g., sand blasting, the groove walls. For example, when forming grooves during the co-extrusion of pipe and support combinations, extruded grooves can be sand-blasted downstream of the extrusion dies and water quench.

It has been found that membranes folded with securing members into roughened, ribbed grooves, such as those with internal surfaces and ribs formed with routers, can withstand unexpectedly large internal pressures and deflections without failure of the edge seal of the membrane. Flux rates and resultant gas pressures in the gas chamber between the membrane and support that lead to deflections of about 0.5" to about 0.75" in higher modulus membranes will usually provide sufficient discharge of gas for many applications. As compared to larger deflections, deflections in the range of up to about 2" or less, and to a greater extent deflections in the range of up to about 1" or less, offer the advantage(s) of more uniform and/or more complete and efficient use of the available membrane gas discharge surface area, i.e., that area in which gas discharge pores are present in the membrane surface. However, the preferred groove configuration illustrated for example by FIG. 43, roughened for example by formation of its surfaces with routers and/or by sand-blasting, as discussed above, can prove helpful in inhibiting membrane edge seal failure at higher deflections, e.g., at up to about 3" or more, such as can be encountered with lower modulus membrane materials and/or at selected or inadvertently applied higher gas chamber pressures and flux rates.

Figure 35:
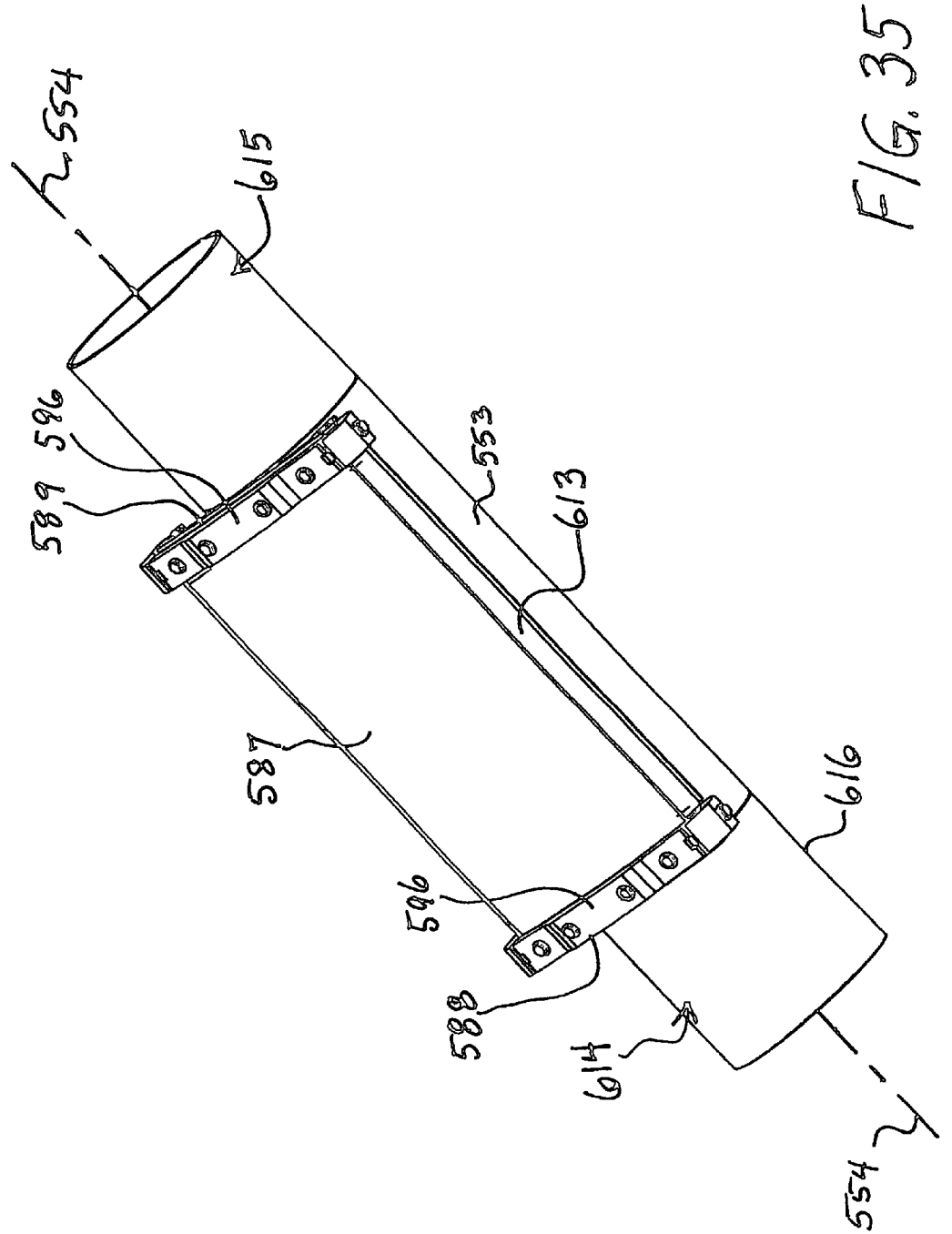
FIG. 35 is a perspective view taken from above and to the side of the FIG. 34 diffuser, into the ends of which connectors have been inserted.

Membrane diffusion element ends 588 and 589, shown for example in FIGS. 31 and 35, can be connected in sealing engagement with the ends of support 560 across the support upper surface by clamping bars 596 which extend across those ends. These bars may be held in place in any appropriate manner, for example, if the bars are formed of plastic, with self-tapping machine screws 598 penetrating un-threaded bores (not shown) in the bars.

In the embodiment of FIGS. 31-37, the inner two of four machine screws 598 enter and engage threaded bores 599 in the support connecting portion 561. The two outer screws pass-through aligned un-threaded bores (not shown) in clamping bar 596 and in the respective lateral portions 570 and 571, beneath which the screws threadedly engage cap nuts 600 bearing against the undersides of the lateral portions. However, in the embodiment of FIGS. 38-42, and as best seen in FIGS. 38 and 40, all four screws 598 each pass through aligned un-threaded bores in both the bar and underlying lateral portions, and are aligned with and threadedly engage threaded bores in dual nut members 601 and 602 beneath the lateral portions.

Use of nuts, such as nuts 600 of FIG. 31 and nuts 601 and 602 of FIG. 38, reduces reliance on threaded bores in the pipe and lateral portion(s). In the preferred embodiment of FIG. 38, nuts eliminate the threaded bores 599 seen in the FIG. 31 embodiment. These measures avoid the risks of inadvertently turning a diffuser into scrap by stripping threads formed in the body of the diffuser and of leakage from the pipe through the bores.

Where the supports include curved surfaces, such as those on outer portions 578 and 579, the membrane diffusion element ends can be secured about the curved surfaces by arcuate clamps 606 and 607. These clamps may be held in place by machine screws 608 that penetrate un-threaded bores in the clamps and threadedly engage threaded bores, as shown by FIG. 40, in outer portions 578 and 579. Although arcuate clamps are normally present on both sides of the diffusers of the present embodiment, they have been omitted from the right side of the diffuser in FIGS. 32-34 to assist in illustrating other parts.

Figure 40:
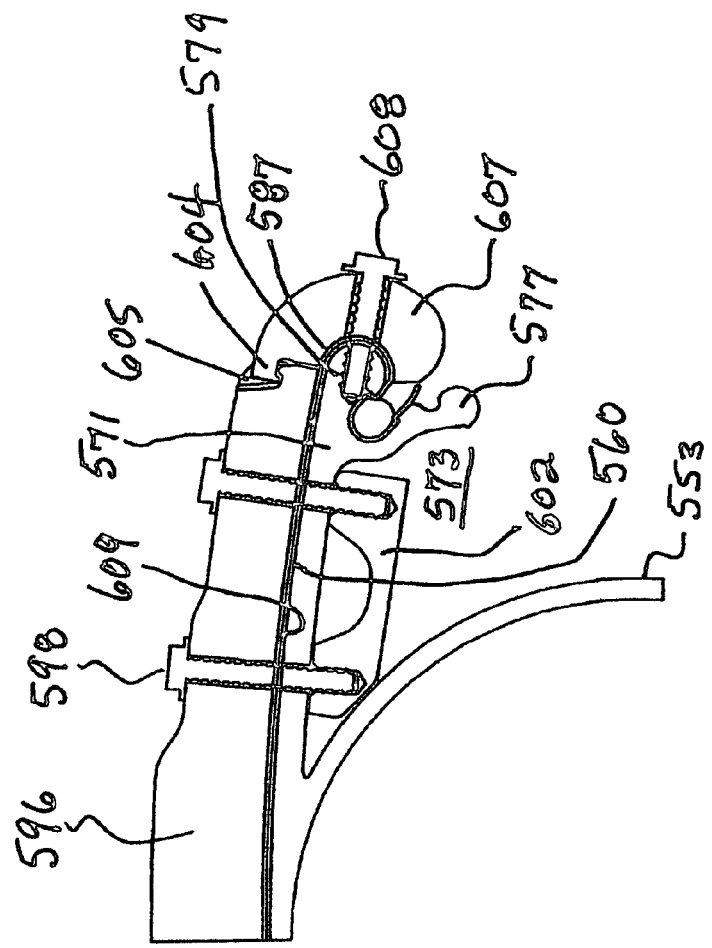
FIG. 40 is similar to FIG. 39, but is sectioned to show the fasteners for the end clamps and arcuate clamps, as well as the inter-engaging elements of the adjacent ends of the clamping bars and arcuate clamps.

Preferably, as shown in FIG. 40, the clamping bars and arcuate clamps can have inter-engaging, adjacent ends. These adjacent ends may for example have inter-engaging meshed protruding elements 604 and receptacles 605 in registry with one another and have closely fitting surfaces that discourage displacement of the clamps 606, 607, e.g., rotation of the clamps about the axes of screws 608.

Optionally, to assist in promoting a secure seal at the membrane ends, an adhesive layer 609 may be provided under clamping bar 596 and arcuate clamps 606 and 607 between membrane 587 and support 560. See FIGS. 32 and 40.

In replacing membranes that have been secured to diffuser supports at membrane margins or ends using adhesive layers, all adhesive residue on the supports should be removed before installing the new membranes. Simple tools to facilitate adhesive/tape removal in the field may be provided by those skilled in the art. Also, simple tools for re-insertion or replacement of securing means in the field may be provided by those skilled in the art.

In the operation of a typical membrane diffuser, gas flows from the interior of a supply pipe via one or more gas injection passages, passing through the membrane support, into a gas chamber that forms between the membrane and its support, and finally through the pores in the membrane into liquid above the membrane. When one uses in strip diffusers certain common types of relatively low back-pressure membranes, such as those of EPDM having an abundance of pores in the form of slits, it can be useful to deliver gas from the interior of the pipe into the gas chamber through a plurality of gas injection passages. These may frequently and advantageously be flow regulating orifices having circular or non-circular cross-sections and spaced apart along the crown or apex of the pipe. Thus, in the present embodiment a series of such orifices 610 is provided at intervals along the length of the pipe and of the gas chamber (not shown) that forms above the support 560 when the diffuser is in operation. The orifices are respectively of sufficiently small flow cross-section and appropriately spaced to promote uniformity in the delivery of the gas into the chamber along its length. However, with other kinds of membranes, for example some of the urethane based membrane media, the media can be relatively stiffer and the pores smaller and more difficult to discharge gas therefrom, leading to high enough back pressure across the media so that the media in effect acts as its own flow regulating system, reducing the value of or eliminating the need for plural flow control orifices.

One urethane-based membrane material, supplied in the form of sheets suitable for punching is the Deerfield Urethane (Bayer Material Science Company) PT7500 series family of aromatic polyether polyurethane sheet products. These reportedly exhibit hydrolysis and fungus resistance, and the base resin is listed under NSF61 for potable water applications. With its relatively higher durometer and melt range, this series of products is ideally suited for applications that require higher modulus.

This material is understood to have the following properties:

|  | ASTM Test Method | Value |
|---|---|---|
| Specific Gravity | D-792 | 1.13 |
| Durometer (Shore A) | D-2240 | 90 |
| Taber Abrasion (H-18, 1,000 g. load cycles) | D-3489 | 25 mg. Loss |
| Ultimate Tensile Strength | D-882 | 9700 psi |
| Ultimate Elongation | D-882 | 550% |
| 50% Modulus (MD/CD Ave.) | D-882 | 950 psi |
| 100% Modulus (MD/CD Ave.) | D-882 | 1200 psi |
| 300% Modulus (MD/CD Ave.) | D-882 | 3200 psi |
| Tear Resistance (MD/CD Ave.) | D-1 004 | 500 pli |
| Min Softening Point | TMA onset | 1 700 C. 3380 F. |
| Max Softening Point | TMA endpoint | 184" C. 3630 F. |
| Approx. Yield (sq. ft./lb. @ 1 mil) |  | 170 |

Figure 36:
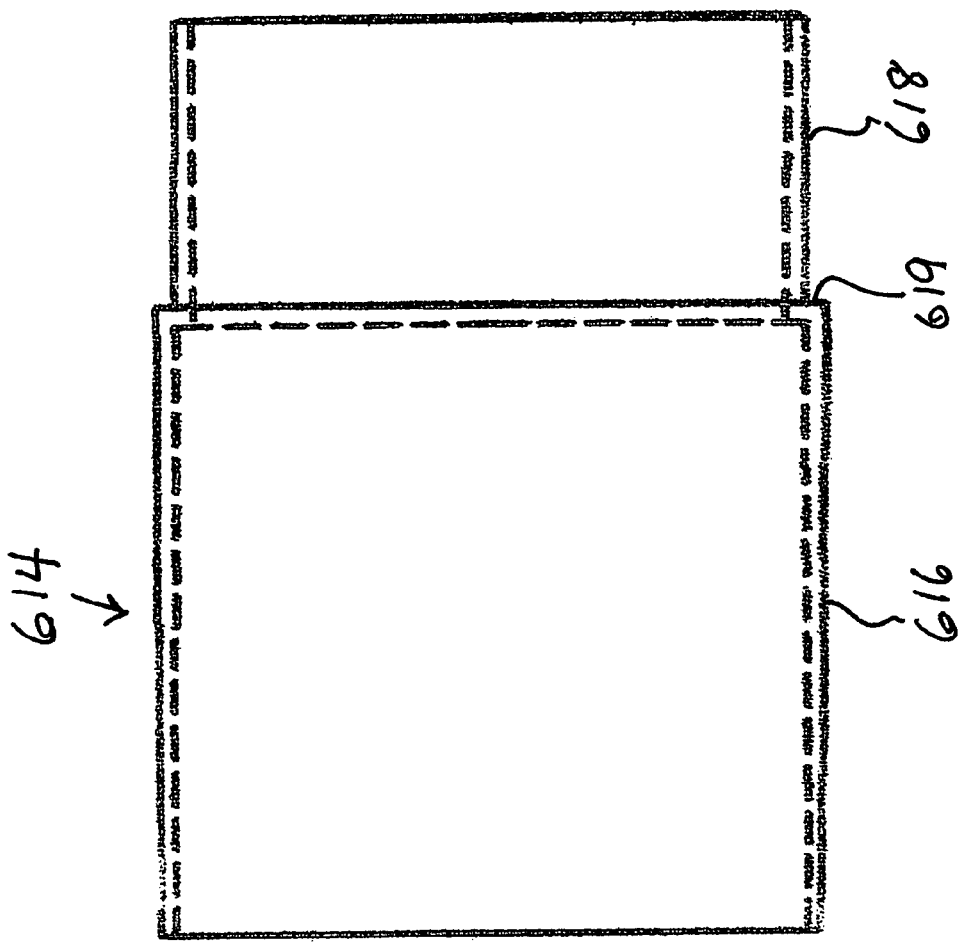
FIG. 36 is a side view, with its interior surfaces shown by phantom lines, of one of the connectors of FIG. 35.
Figure 37:
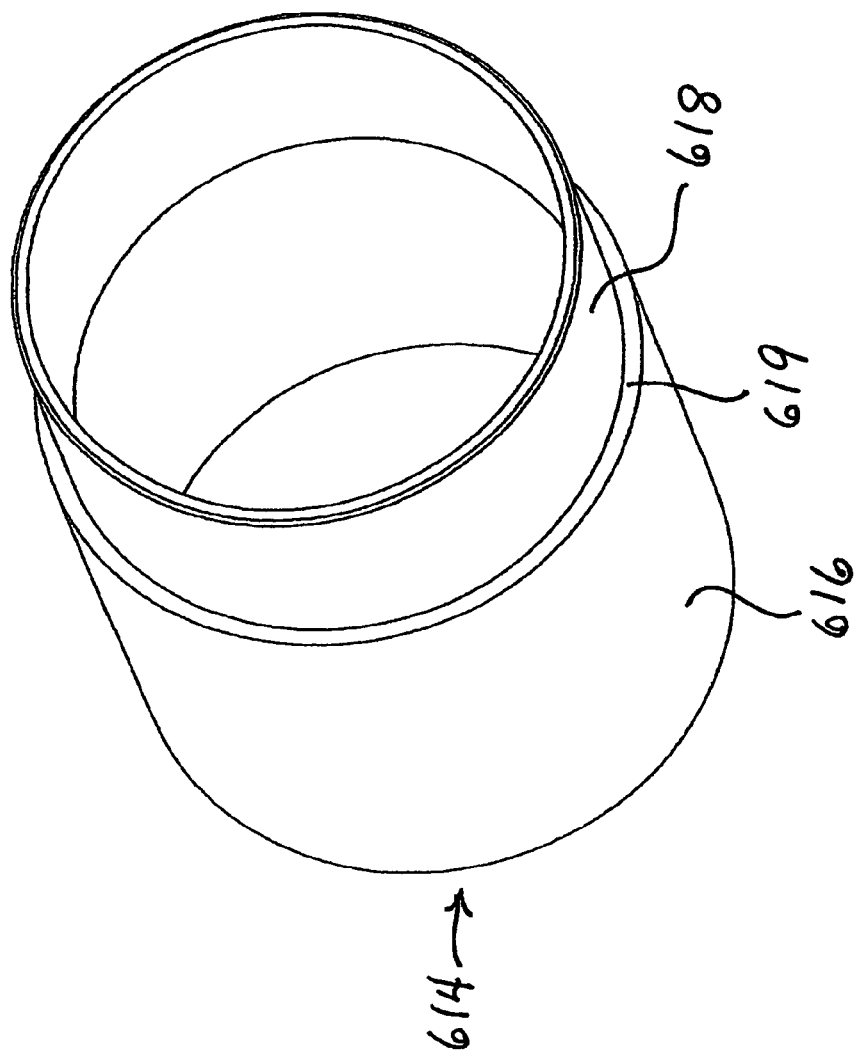
FIG. 37 is a perspective view of the connector of FIG. 36, showing its reduced end and interior.

To assist in coupling our strip diffusers to manifolds or other strip diffusers, one may optionally fit the ends of the diffusers with connectors, for example connectors 614 and 615 illustrated in FIGS. 35-37. These connectors, as exemplified by connector 614 in FIGS. 36 and 37, include a larger diameter first section 616, having the same interior and exterior diameters as pipe 553, and also include an integral smaller diameter second sections 618. The second sections are connected to the first sections at a step 619 and have about the same wall thickness as the first sections, but have an exterior diameter only slightly smaller than the interior diameter of pipe 553. This permits insertion of the second sections with a close fit into the open ends of the pipes 553. Preferably, the connectors and pipes are both made of synthetic resinous material and can be durably connected and sealed to one another, such as by solvent-, vibration- or sonic-welding or by adhesives, to make a permanent assembly. The connectors may, if desired, be mated with or inserted into other gas-conducting members such as fixed or rotatably adjustable plastic couplings, or bells formed in pipes or manifolds. The connectors may also represent useful locations for attachment of the diffusers to many types of pipe stands which can be used to install diffusers in rows above the floors of wastewater treatment tanks.

FIGS. 44-50

Another useful option is to provide one or more outwardly extending integral projections formed in the pipe wall. These can be useful, for example, in supporting and/or securing the diffusers. The projections may take any desired form. For example, they may be generally featureless rounded protrusions, have extensions thereon in the nature of feet or have hook-shaped, T-shaped or other at least partly vertical configurations. Examples may be found for example in FIGS. 11 (part 143), 44 and 45.

Figure 44:
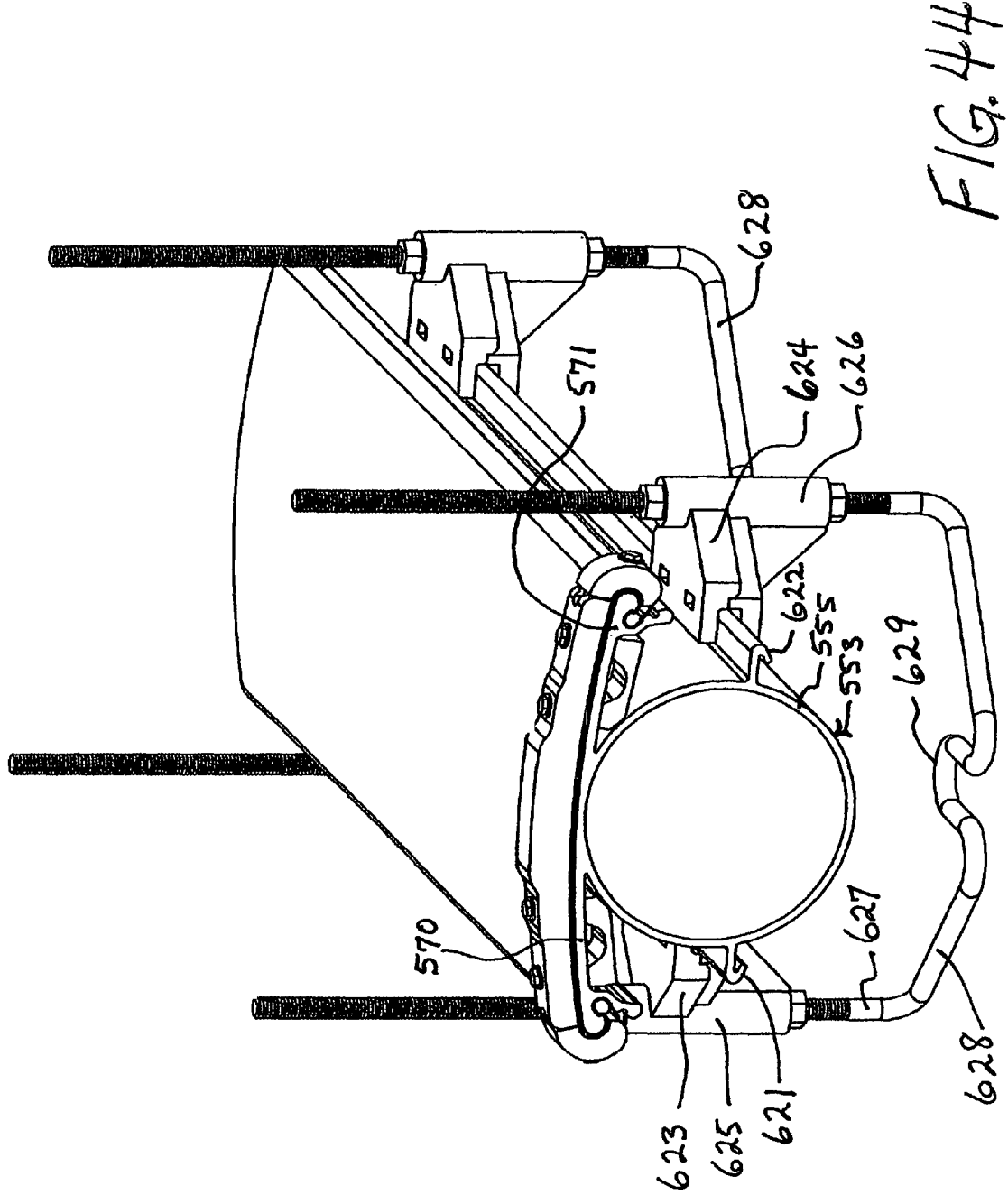
FIG. 44 is a perspective view of the end of the embodiment of FIG. 38, taken from above and to the side, with added diffuser-supporting hook members and floor stands.
Figure 45:
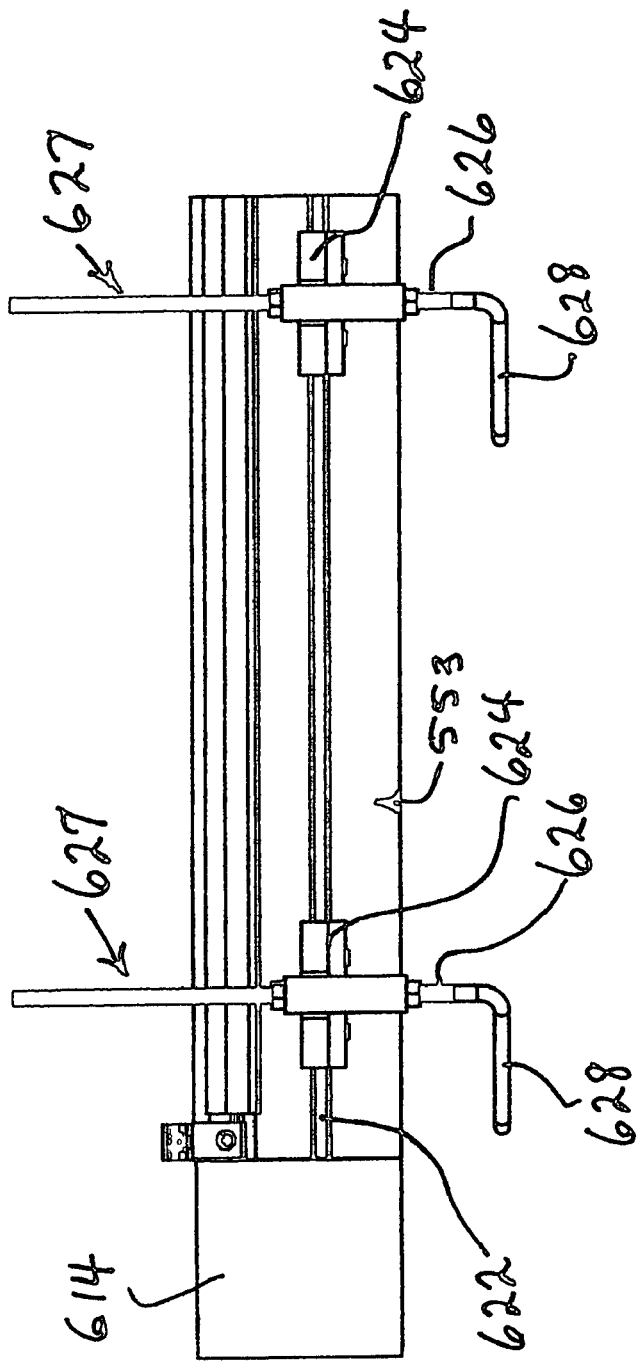
FIG. 45 is a side view of the diffuser of FIG. 44, to which has been added a connector similar to that of FIGS. 36 and 37.

In the embodiment of FIGS. 44-45, the pipe 553 includes, in peripheral wall 555 of the pipe, angularly spaced along that wall from the respective support lateral portions 570 and 571, pipe-supporting projections. They are integral with, extend longitudinally with the pipe wall substantially throughout its length and project outwardly therefrom. Such projections, for example projections 621 and 622, include portions relatively closer and further from the pipe outer wall and at least one further portion is thicker than or disposed at least one angle to a closer portion, e.g. may be hooks of any shape, which assist the projections in performing not only a diffuser supporting function, but also a securing function. These hook members may, for example, be held in the grasp of clamps 623 and 624 extending laterally from the uprights 625 and 626 of standards 627 having floor-engaging basis 628 including bolt receptacles 629 by means of which these stands and the diffusers which they support can be held in fixed position in a liquid impound, such as a wastewater aeration vessel. FIG. 45 shows that the diffusers may also be fitted with connectors, such as connectors 614, which may be present at either or both ends of the diffuser.

The diffusers can be supported on stands by means other than the outwardly extending integral projections of FIGS. 44 and 45. Any suitable form of attachment may be used. For example, a variety of blocks, arms, saddles, cradles, clamps or other types of attachment members may be secured directly or indirectly to the diffusers, e.g., to the pipes of, or to connectors extending between, the diffusers, such as by surrounding, clamping, solvent or fusion welding, gluing or otherwise, to serve as direct or indirect connections between the diffusers and floor stands or other types of mounts, such as swing-out mounts or weighted grids. For example, one may employ cradle- or clamping-type arrangements illustrated in FIG. 46 or 47-50, respectively.

Figure 46:
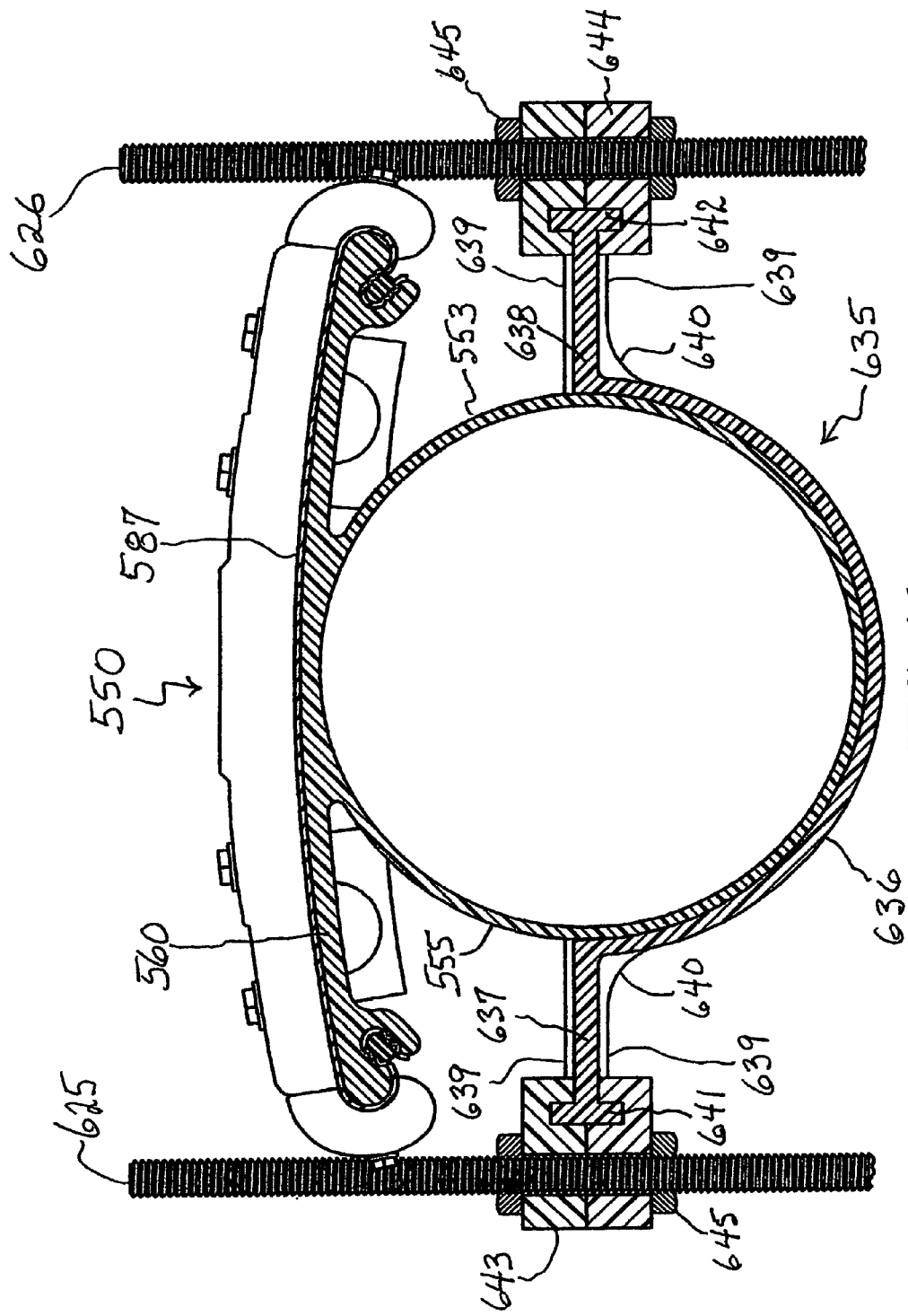
FIG. 46 shows an embodiment, similar to that of FIG. 44, in which the limbs, grooves and securing members of FIG. 43 have been substituted, in which the hook members have been omitted and to which a diffuser-supporting cradle has been added.

Cradle 635 of FIG. 46 may be formed for example of plastic or stamped or cast metal and acts as a mount for diffuser 550, having support member 560, diffusion element 587, pipe 553 and other parts shown in the previous figures. Cradle 635 is preferably injection molded from plastic and may be only a few inches wide in the direction of the length of the pipe of a diffuser which may for example be about seven feet long or longer.

The inner surface of arcuate portion 636 of the cradle may be factory- or field-installed on outer surface 555 of the pipe, for example by fusion-, vibration- or solvent-welding or gluing. Arcuate portion 636 extends along the lower half of the pipe cross-section, transitioning at its 3- and 9-o'clock positions into integral lateral projections 637 and 638, that are reinforced by integral ribs and fillets 639 and 640.

These projections include portions relatively closer and further from the pipe outer wall and the further portions are angularly disposed relative to the closer portions, which assists in connection with the projections. These closer and further portions may respectively comprise or resemble the upright arm and base of a letter L in any orientation, e.g., may have the shape of the base and top arm of a letter "T" lying on its side, and the further portions are preferably at least partly vertical. In this embodiment there are T-shaped lateral projections which are vertical in their ends 641 and 642, and are, with the aid of nuts 645, secured in complementary-shaped clamping members 643 and 644 on the threaded uprights 625 and 626 of floor stands similar to floor stands 627 of FIGS. 44-45.

Use of cradles to attach diffusers to pre-installed stands, arranged along the path to be traversed by one or more diffuser(s), includes placement of the lower nuts 645 on threaded uprights 625 and 626. Cradles 635, with or without a pre-attached diffuser or diffusers, are then lowered into position onto uprights 625 and 626 to rest on the nuts with "T" shaped ends 641 and 642 resting in the lower portions of clamps 644, which are adjusted to level the cradles at a common elevation on the several stands along the longitudinal axis or axes of the diffuser or diffusers.

At this point, if not previously attached, the diffusers are now leveled in the rotational sense, i.e., in planes perpendicular to their pipe axes, after which they are attached to the cradles. However, if diffusers are pre-attached to cradles, e.g., in a factory during manufacture of diffusers, the relative rotational positions of their membrane supports and cradles can be controlled to ensure that the membrane gas discharge surfaces will be level in the rotational sense when the cradles are level on the stands. This can avoid a step and a critical issue in the installation process.

The cradles and stands are located, relative to the longitudinal axes of diffuser pipes 553, such that straps 650 support and lie under either the bottom peripheral surfaces of the pipes or, if two or more diffusers are to be mounted in a string, under connectors located between and connecting the diffusers in series. One can use for this purpose double-end connectors, similar to connectors 614 of FIGS. 35-37 and 45, having not one but two of the smaller diameter sections 618 at their respective ends, secured gas-tight in the adjacent ends of adjacent diffusers in the string. Then the upper halves diffusers, and connectors if such are present, may be lowered onto arcuate portions 651 of the straps.

As an alternative to the embodiment of FIG. 46, one may support any of the diffusers of the present invention with the open top clamp arrangement of FIGS. 47-50, illustrated therein with diffuser 550, support member 560, diffusion element 587, pipe 553 and other parts shown in the previous figures. The clamp includes strap 650, which may be formed of high tensile strength plastic but is more preferably stamped from stainless steel. Strap 650 extends beneath pipe 553 between its three- and nine-o'clock positions, where the strap has lateral projections 652 and 653. The stamping process preferably forms integral reinforcing ribs 654 of "V" cross-section in the lateral projections.

Hold-down clamps 658 and 659 co-operate with strap 650 to hold the diffuser in place. These include arcuate portions 660 and 661, each having lateral projections 662 and 663 overlying strap lateral portions 652 and 653. All these projections are preferably of similar size and outline in plan view (not shown). The clamps are preferably formed by stamping from stainless steel with integral reinforcing ribs of "V" cross-section in their arcuate portions and lateral projections. More preferably, the strap reinforcing ribs 654, instead of projecting downward, as shown in these figures, are sized and extend upward so their upper surfaces nest with the undersides of ribs 664 to help attain and maintain alignment of the lateral portions of the strap and hold down clamps.

Figure 47:
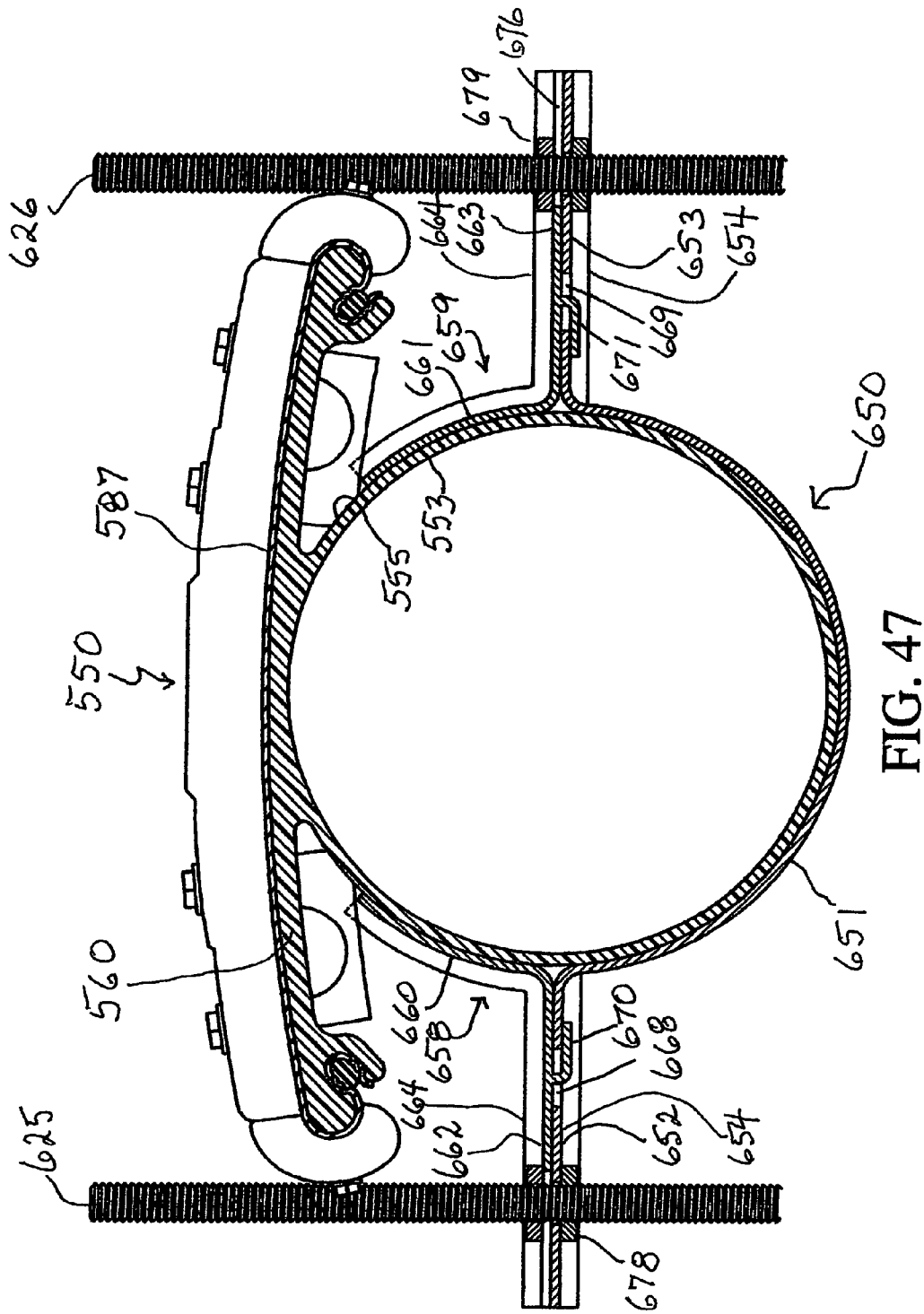
FIG. 47 shows an alternative to the embodiment of FIG. 46, employing an open-top clamping arrangement having a lower strap and upper diffuser hold-down clamps.

FIG. 47 shows, and FIGS. 48-50 show more clearly, that strap lateral projections 652 and 653 include rectangular apertures 668 and 669. In these, there are holes, such as hole 675 of FIGS. 48 and 50, in registry with threaded uprights 625 and 626 (see FIG. 47) of a floor stand similar to that of FIGS. 44-45. In the lateral projections of hold down clamps 658 and 659 are locking tabs 670 and 671, as well as slots with open ends exemplified by slot 676 and its open end 677 in FIGS. 48 and 49. These slots, like the holes in the strap lateral projections, are in registry with threaded uprights 625 and 626.

Attachment of diffusers to pre-installed stands, arranged along the path to be traversed by the diffusers, begins with placement of lower nuts 678 on threaded uprights 625 and 626. Straps 650 are then lowered into position onto the uprights to rest on nuts 678, which are adjusted to level the straps at a common elevation on the several stands. The stand positions relative to the longitudinal axes of the diffuser pipes 553, are such that straps 650 will support and lie under either the bottom peripheral surfaces of the pipes or, if diffusers are mounted in strings between connectors, under the connectors. Then the diffusers, and connectors if such are present, may be lowered onto arcuate portions 651 of the straps.

Placement of hold-down clamps 658 and 659 follows. As shown in FIG. 47 and in more detail in FIGS. 48-50, slots 676, apertures 668, 669 and tabs 670,671 are sized and positioned for insertion of the locking tabs into the apertures and sliding of the tabs toward pipe 553 until the tops of the tab free ends engage the bottoms of lateral projections 652 and 653 of strap 650. Thus, the tabs can provide temporary restraint against relative vertical separation of the adjacent lateral projections of the strap. With upper nuts 679 in place, but with the diffuser pipe free to rotate, the diffusers are leveled in the rotational sense and secured against rotation, such as by fixedly securing one end of the diffuser or diffuser string to an air supply manifold.

Another very simple and economical way to mount diffusers or diffuser strings to the floor of a wastewater treatment tank is to use double-end connectors, as above described, secured in the ends of the pipes of adjacent diffusers of suitable length, e.g., about seven feet, with the inner end of the first diffuser being connected through one of its connectors to an air manifold. "Blind" or sealed connectors are secured in the outer ends of the last diffusers in the strings. The connectors, preferably all but at least a portion of them, are mounted within conventional "U" or "A" configuration stainless steel floor stands of the type which have long been used in Sanitaire™ fine bubble disk aeration systems.

Regardless of which arrangement is selected for mounting the diffusers, 11 if they are long ones, e.g., 12 feet, 15 feet or longer, and/or they are mounted in series-connected strings of 2, 3, 4 or more, in environments that are not temperature-controlled, e.g., outdoors, a longitudinal sliding relationship is preferably provided between the diffusers and their mounts to accommodate diffuser and/or string expansion and contraction induced by temperature changes. Such a relationship between the diffusers and their stands that is vertically and laterally secure may be achieved by controlling the tightness of the grip between the pipe and securing means. One may thus control the grip between the projections and clamps of FIGS. 44-45, the cradle ends and clamps of FIG. 46, the pipes or connectors and open-top clamps of FIGS. 47-50, and the pipe connectors and guide straps or guide clamps of Sanitaire stands or of the attachment members of any other form of securing arrangement that may be adopted.

FIGS. 51-53

Figure 51:
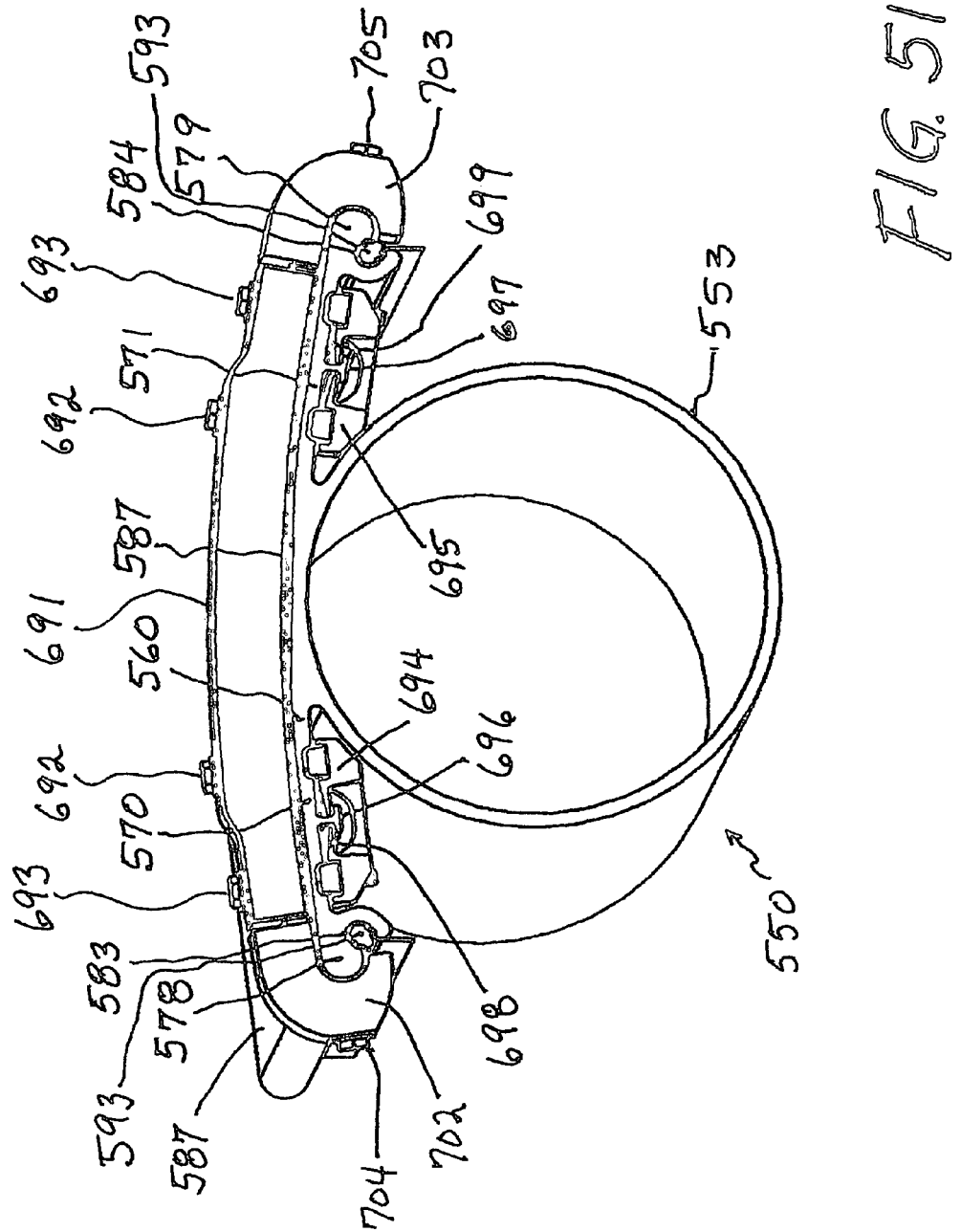
FIG. 51 is a perspective view which shows yet another embodiment of a membrane end clamping arrangement.
Figure 52:
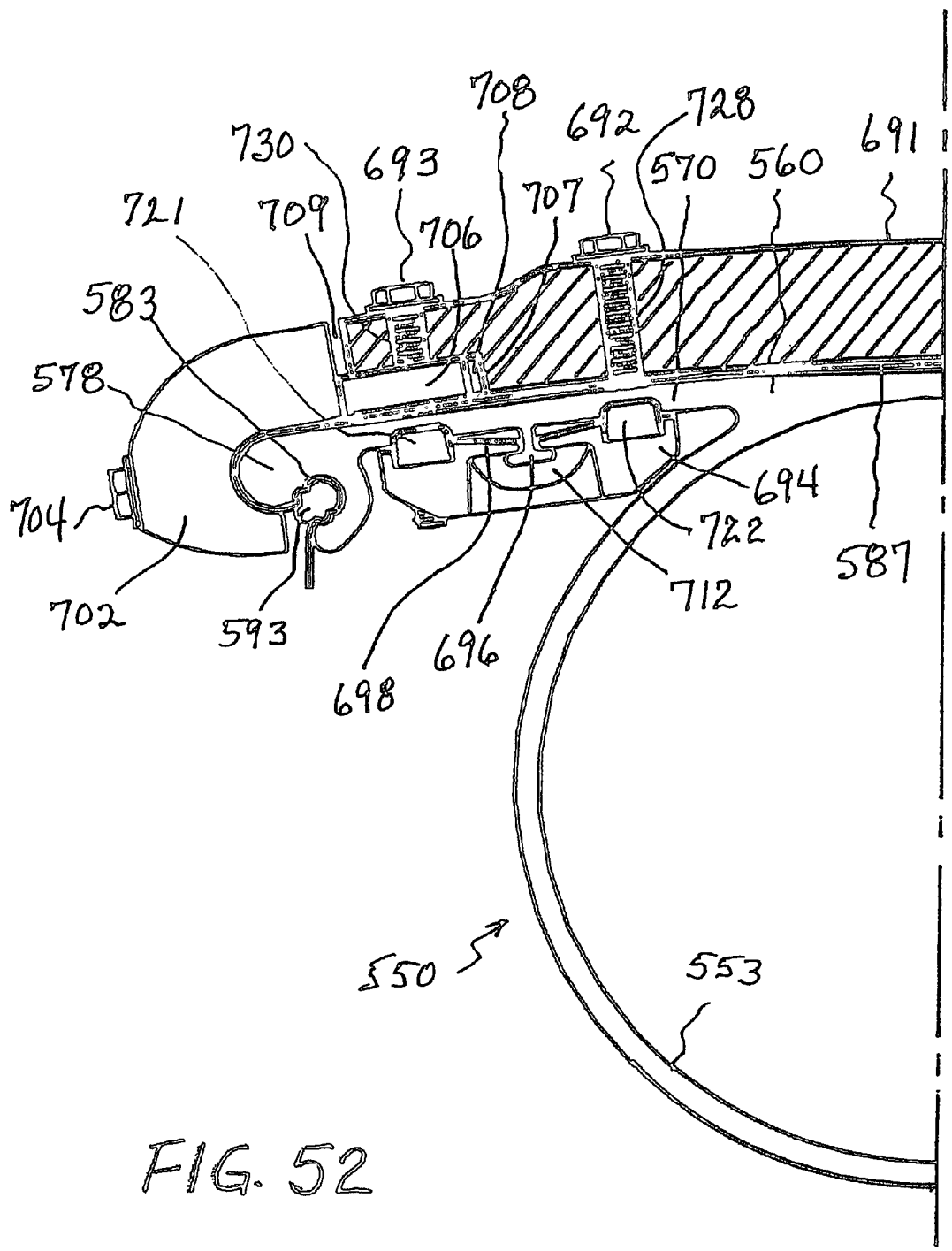
FIG. 52 is a half end view, partly sectioned, of the FIG. 51 diffuser.
Figure 53:
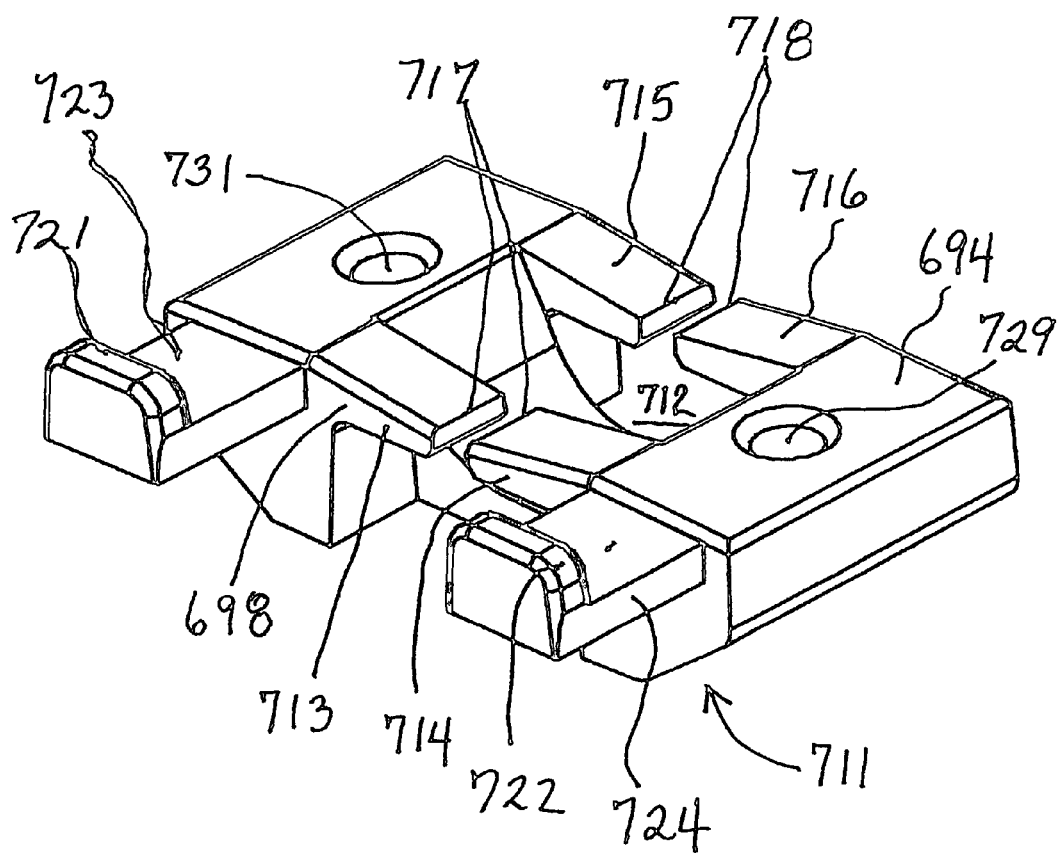
FIG. 53 is a perspective view of a nut member that is shown, in part, in FIGS. 51 and 52.

FIGS. 51-53 disclose improvements in arrangements for securing bars, or other members that perform a similar function, in clamping relationship with the ends of the membrane to press it into sealing engagement with its support. These improvements, although useful in a variety of different kinds of strip diffusers, are illustrated herein with strip diffusers similar to those previously disclosed, that include a body comprising co-extruded plastic pipe 553 and a support 560 having lateral portions 570 and 571 and outer portions 578 and 579. These are mated with a membrane diffusion element 587. It is of about the same length as the support and is sealed to the support longitudinally with the aid of securing members 593. These secure the membrane marginal edges in membrane securing grooves 583 and 584 extending longitudinally in the diffuser body.

Clamping bar 691 of the present embodiment is held in place over the central portions of the ends of membrane 587 and support 560 and helps seal the ends of the membrane with the support by pressing them together. For this purpose, one may use machine screws or other fasteners to put pressure on the bar. For example, these may pass into the support structure and preferably through the intervening structure into left and right nut members 694 and 695. Preferably the right and left sides of the clamping bar each have inner and outer fasteners, e.g., machine screws 692 and 693.

If desired, to help provide reliable and long-lasting mechanical closure of the membrane ends, either or both of two additional features may be included in clamping bars 691. These bars may if desired have one or more channels or ridges in their membrane-contacting faces, along the length of those faces, to provide labyrinthine seals between them and the membrane ends, and/or the bars may be formed with curvature in those faces, between the bar ends, that is slightly larger than the curvature, if any, present in the upper surface of the membrane support 560 about the pipe axis. Such curvature can be used to provide, as inner machine screws 692 are tightened, pre-stressing and more compressive force between the bar faces and portions of the membranes that they contact. Where such curvature and channels or ridges are both present, the ends of the membrane may if desired be caused to deform slightly and fill the labyrinthine seals.

The nut members may be designed to receive single or plural screws or other fasteners, but are preferably dual plastic nut members. With nut members of plastic, it is preferred to use self-tapping machine screws made specially for threading into plastic. Screws are for example known that have threads specially formed to use the creep characteristic of plastic to form an anti-loosening interlock with the threads of the adjacent plastic in which the screw threads are embedded.

Optionally, but preferably, complementary side-wise alignment members are provided on the diffuser body and nut members. For example, at least one first alignment member may be provided on the diffuser body to cooperate with at least one second alignment member on a nut member. The first alignment member and second alignment member may for example be projecting and receiving elements on the diffuser body and nut members respectively, or vice versa, including inter-engaging projections on both the bodies and nut members. First and second alignment members of any desired cross-section may be employed.

It has been found very convenient to have the first alignment members extend longitudinally in (including on) the diffuser body, to extend substantially throughout the length of that body and to be formed integrally therewith. Preferably, the first alignment members are each one or more projections formed integrally with the support 560. These may be of any desired cross section and for example are longitudinally-extending inverted "T"-shaped projections 696 and 697 dependent from the undersides of each lateral portion 570 and 571. These are preferably co-extruded with the support lateral portions.

Complementary second alignment members are provided on the nut members, and cooperate with the first alignment members. They too may be of any desired shape and may for example be members 698 and 699 that laterally engage the first alignment members.

At each end of clamping bar 691, there are side clamps. These cooperate with bar 691 by sealing to the upper surface of the support remaining portions of the membrane to the left and right of the bar.

Optionally but preferably one may use side clamps 702 and 703 that engage with the clamping bar and that may extend laterally a short distance across a relatively horizontal portion of the membrane surface from adjacent the bar to the rounded surfaces of the support outer portions 578 and 579. There, the side clamps may have arcuate portions that wrap around and press the membrane in sealing engagement with these rounded surfaces.

The side clamps may be held in place partly by their engagement with clamping bar 691, and partly by machine screws 704 and 705 or other fasteners. Preferably, where the support is extruded from plastic, the 11 above described special machine screws are used.

The bar 691 and the side clamps preferably engage each other in one or more ways that press down on the side clamps and preferably also inhibit movement or pivoting of the side clamps with components of motion in the general direction of the pipe axis. For these purposes, a wide variety of shapes may be provided in the adjacent ends of the bar and side clamps. Complementary projecting and receiving, including convex and concave, shapes may be used. The projections may be on the bar, side clamps or both, may be multiple or single, and may be of rectangular, cylindrical, spherical or other cross-section. Preferably, such engagement is provided by meshed or interlocking elements on bar 691 and clamps 702 and 703. An example is shown in FIG. 52. FIG. 52 shows the left half of the diffuser of FIG. 51, except that clamping bar 691 is vertically sectioned. The plane of this partial section passed through the bar midway between its front and rear surfaces to expose a pocket 707 at the left and end of the bar, there being a similar pocket at the other end of the bar preferably, these pockets are open at both the bottoms and ends of the bar.

Pocket 707 is positioned to receive a complementary protruding element 706 formed on side clamp 702 adjacent the bar. A corresponding protruding element (not shown) is provided on end clamp 703 to engage the corresponding pocket at the right end of the bar.

Since support 560, when extruded, may vary in width to some extent, and there may also be dimensional variations in bar 691 and clamps 702 and 703, which may for example be injection molded, it is advisable for the design dimensions for bar 691 and side clamps 702 and 703 to accommodate these variations. Thus, a clearance 708 may be provided between the distal end of protrusion 706 and the adjacent end of pocket 707, and another clearance 709 may be provided between the adjacent surfaces of articulate clamps 702 and the left end of clapping bar 691. This arrangement is preferably replicated at the right end of clamping bar 691.

FIG. 53 provides details of a preferred form of the at least one second side-wise alignment member for the respective nut members 694 and 695, as was discussed above. In this perspective view of nut member 694, nut body 711 includes a cross-channel 712. When nut member 694 is installed in the diffuser, channel 712 extends in the same general direction as the pipe and support.

Fingers 713, 714, 715 and 716 project into the channel. Pairs of these fingers have spaced-apart ends 717 and 718 for engaging the at least one first alignment member, such as alignment member 696. Preferably, the fingers of each pair are directly opposite one another and their respective ends are spaced apart by a sufficient distance to provide a snug fit against the at least one first alignment member. With this arrangement, nut members 694 and 695 may be dependably located in the proper side-wise position beneath support 560 to receive the machine screws 692 and 693

Another optional but preferred feature of the diffusers is at least one end-wise alignment member. For example, in the present embodiment, as best seen in FIGS. 53 and 52, this may include a pair of tabs 721 and 722. These can be formed at the ends of extensions 723 and 724, which project horizontally from the nut member body 711. Tabs 721 and 722 extend above the upper surface of the nut member body 711 and are long enough so that they will, when installed, overlap to a substantial extent the end surface of membrane support 560. With this arrangement, nut members 694 and 695 may be dependably located in the proper end-wise position beneath support 560 to receive the machine screws 692 and 693.

It is believed helpful to provide, beneath that portion of membrane 587 which is compressed by clamping bar 691 and side clamps 702 and 703, a compliant layer (not shown in these Figures). This layer should be relatively thin but it should also be of sufficient thickness to fill voids between the membrane and support 560. We refer to voids that result from deviations in the profiles of the support upper surface, viewed in a plane perpendicular to the diffuser body longitudinal axis, relative to the adjacent portions of the bar and clamp bottom surfaces profile in the same plane. Such deviations can occur in the normal course of extrusion of the diffuser body and injection molding of the bar and clamps. Application of a bead of un-cured fluent common cold-curable silicone caulk to the desired area of the support surface, shortly before emplacement of the membrane and tightening of the bar and clamps, has been found suitable. However, substitution of solid cellular and non-cellular rubbery layers of other polymeric materials is also contemplated.

From FIGS. 52 and 53 one may see how bar 691, side clamps 702 and 703, membrane 587, support 560 and nut members 694 and 695 are secured together with machine screws 692 and 693 to form a stable, effective end seal between the support and membrane. Inner machine screws 692 pass through a series of aligned bores and apertures. As illustrated in FIGS. 51-53 these include one inner bore 728 in the left half of clamping bar 691, corresponding apertures in the membrane and support (not shown) and a first bore 729 in nut member 694 that forms a threaded connection with self-tapping threads on machine screw 692.

This arrangement is replicated in the right side of the diffuser and right half of clamping bar 691 with side clamp 703, using the inner machine screw 692 and nut member 694 of that side.

Outer machine screws 693 also pass through a series of aligned bores and apertures, as illustrated in FIGS. 51-53. These include one outer bore 730 in the left half of clamping bar 691, an aligned small bore (not shown) in protruding element 706 of arcuate clamp 702, apertures in the membrane and support (not shown) and a second bore 731 in nut member 694 that forms a threaded connection with self-tapping threads on machine screw 692. This arrangement is also replicated in the right side of the diffuser and right half of clamping bar 691 with side clamp 703, using the outer machine screw 693 and nut member 695 of that side.

Persons skilled in the art will ready recognize that the foregoing are but a few illustrative examples of many different forms in which the present inventors' contribution to the art may be practiced. Thus, the invention should be construed to include all embodiments falling within the scope of the appended claims and all equivalents thereof.

The invention claimed is:

1. A strip diffuser comprising
 a pipe having
  a longitudinally extending central axis,
  a longitudinally extending gas flow enclosing peripheral wall and
  included in that wall; at least one elongated, thickened region integral with the pipe and
   extending in the same direction as the central axis,
 a membrane support member
  elongated in the direction of the central axis and having
   a connecting portion that is
    integral with the pipe and
    comprises at least one of said thickened regions, and
   at least one lateral portion that
    is integral with the connecting portion and extends laterally from the connecting portion and,
    longitudinally with the connecting portion in the same direction as the pipe axis and
 a membrane diffusion element
  elongated in the direction of the central axis and
  having ends and longitudinally extending marginal portions which are connected in sealing engagement with the support.

2. A strip diffuser according to claim 1 wherein the connection portion of the membrane support comprises a single elongated, thickened region.

3. A strip diffuser according to claim 1 wherein the connecting portion of the membrane support comprises plural elongated, thickened regions.

4. A strip diffuser according to claim 1 wherein the membrane support comprises plural lateral portions.

5. A strip diffuser according to claim 1 wherein the membrane support connecting portion is positioned at the apex of the pipe.

6. A strip diffuser according to claim 5 wherein the membrane support has plural lateral portions positioned on opposite sides of the pipe apex.

7. A strip diffuser according to claim 1 wherein at least part of at least one lateral portion has beneath it space that is in communication with the environment surrounding the diffuser.

8. A strip diffuser according to claim 1 wherein at least part of at least one lateral portion has beneath it space that is free of bracing connecting that part with the pipe.

9. A strip diffuser according to claim 1 wherein the pipe is integral with the membrane support over approximately the entire length of the support.

10. A strip diffuser according to claim 1 wherein the connecting portion of the support is thicker than portions of the peripheral wall which adjoin it, outside the connecting portion.

11. A strip diffuser according to claim 1 wherein the peripheral wall of the pipe has an inner surface, and the connecting portion is, when viewed in transverse cross-section along a portion of the length of the inner surface which the connecting portion adjoins, thicker than the remainder of the peripheral wall along most of the length, or combined length, as the case may be, of a portion or portions of the length of the inner surface which the remainder adjoins.

12. A strip diffuser according to claim 11 wherein the connecting portion is thicker than the remainder of the peripheral wall along at least about 90% of the length, or combined length of a portion or portions of the length of the inner surface which the remainder adjoins.

13. A strip diffuser according to claim 1 in which the pipe is circular or non-circular in transverse cross-section, the connecting portion is positioned at an upper portion of the pipe peripheral wall, and the wall has at least one side portion which is thinner than the connecting portion.

14. A strip diffuser according to claim 1 wherein the connecting portion comprises a single thickened region which, substantially throughout the length of the pipe, is thicker than most of the remainder of the peripheral wall along its periphery.

15. A strip diffuser according to claim 1 wherein the connecting portion comprises two thickened regions spaced apart from one another as viewed in transverse cross section, and those regions, substantially throughout the length of the pipe, are thicker than most of the remainder of the peripheral wall along its periphery.

16. A strip diffuser according to claim 1 wherein, along at least one lateral portion, extending laterally from a nexus at which that lateral portion is joined with said connecting portion to an outer edge of that lateral portion, that lateral portion is free of underlying bracing connecting it with the pipe.

17. A strip diffuser according to claim 1 in which there are two lateral portions that, respectively, extend to the left and right of the connecting portion as viewed in transverse cross section and are free of underlying pipe-to-lateral portion connecting bracing from the location at which each lateral portion is joined with the connecting portion to an outer edge of that lateral portion.

18. A strip diffuser according to claim 1 in which there are two lateral portions that, respectively, extend to the left and right of the connecting portion as viewed in transverse cross section and in which spaces underlying at least part of both lateral portions are in open communication with the environment surrounding the diffuser.

19. A strip diffuser according to claim 1 in which the pipe is of generally circular cross section having an apex, and the upper portion includes the pipe apex.

20. A strip diffuser according to claim 1 in which the at least one thickened region and at least one lateral portion have upper surfaces, and at least one lateral portion upper surface extends generally horizontally from the at least one thickened region upper surface.

21. A strip diffuser according to claim 1 in which the membrane support has a generally horizontal upper surface with at least one longitudinally extending edge that, as viewed in transverse cross section, comprises a curved edge surface that curves from the upper surface of the support outwardly and downwardly and then downwardly and inwardly to beneath at least one lateral portion, and the membrane diffusion element ends are connected in sealing engagement with the support across the support upper surface by clamping bars which extend across those ends and about said curved surface by arcuate clamps.

22. A strip diffuser according to claim 21 in which the clamping bars and arcuate clamps have inter-engaging, adjacent ends.

23. A strip diffuser according to claim 22 in which the adjacent ends have inter-engaging meshed elements.

24. A strip diffuser according to claim 1 in which the support has at least one longitudinally extending edge and at least one lateral portion comprises a longitudinally extending membrane securing groove.

25. A strip diffuser according to claim 24 in which the groove is inward of the edge.

26. A strip diffuser according to claim 24 in which the support has an upper surface and the groove has a mouth which is located below that surface.

27. A strip diffuser according to claim 24 in which the groove has a mouth which is located in the under-side of the at least one lateral portion.

28. A strip diffuser according to claim 27 in which at least one marginal portion of the membrane extends into the groove and is engaged there by a securing member.

29. A strip diffuser according to claim 28 which includes a blocking member, secured to the support at the mouth of the groove, that obstructs the mouth of the groove.

30. A strip diffuser according to claim 24 in which the groove is formed at least in part by a limb extending integrally from and longitudinally with the at least one lateral portion.

31. A strip diffuser according to claim 30 in which the limb extends generally downward from the at least one lateral portion.

32. A strip diffuser according to claim 30 in which at least one marginal portion of the membrane extends into the groove and is engaged there by a securing member, and a blocking member, secured to the limb at the mouth of the groove, obstructs escape of the securing member.

33. A strip diffuser according to claim 24 in which a 3-shaped member forms at least a portion of the groove.

34. A strip diffuser according to claim 1 which comprises, in or on a wall of the pipe, angularly spaced along the pipe peripheral wall from at least one membrane support lateral portion, at least one projection extending longitudinally with at least a portion of the length of, and projecting outwardly from, the pipe wall.

35. A strip diffuser according to claim 34 wherein the at least one projection assists in supporting and/or securing the diffuser in relation to structure in or associated with a liquid impound.

36. A strip diffuser according to claim 34 wherein the at least one projection includes portions relatively closer and further from the pipe outer wall and at least one further portion is thicker than or disposed at least one angle to a closer portion.

37. A strip diffuser according to claim 34 wherein the at least one projection is hook-, T- or L-shaped in cross-section.

38. A strip diffuser according to claim 36 wherein the diffuser is held in vertically and laterally fixed position in a liquid impound by a connection between at least one such projection and structure of complementary shape in or associated with a wastewater aeration vessel.

39. A strip diffuser according to claim 1 wherein the diffuser is held in vertically and laterally fixed position in a liquid impound by attaching members that engage the diffuser pipes below the membrane supports and/or engage connectors that connect adjacent series-connected diffusers and connect the diffusers to structure in or associated with a wastewater aeration vessel.

40. A wastewater treatment plant comprising a water impound having positioned and held in place therein strip diffusers comprising:
  A. synthetic resinous pipe having
    1. a longitudinally extending central axis,
    2. a longitudinally extending gas flow enclosing peripheral wall and
    3. Included in that wall, at least one elongated, thickened region
      a. integral with the pipe wall and
      b. extending in the same direction as the central axis,
  B. a membrane support member that
    1. is elongated in the direction of the central axis and
    2. has a connecting portion that
      a. is positioned at an upper portion of the pipe,
      b. is integral with the pipe,
      c. comprises at least one of said thickened regions,
      d. has an upper surface which includes an upper surface of the pipe thickened region and
      e. comprises a plurality of lateral portions that
        i. are integral with the connecting portion and
        ii. extend
          (a) laterally from the connecting portion on opposite sides of the pipe apex and
          (b) longitudinally with the connecting portion in the same direction as the pipe axis,
  C. the pipe being integral with the membrane support over approximately the entire length of the support,
  D. the peripheral wall of the pipe having an inner surface, and the connecting portion being, when viewed in transverse cross-section along a portion of the length of the inner surface which the connecting portion adjoins, thicker than the remainder of the peripheral wall along most of the length, or combined length, as the case may be, of a portion or portions of the length of the inner surface which the remainder adjoins,
  E. at least parts of the lateral portions having beneath them underlying open spaces that are free of braces connecting those parts with the pipe,
  F. the support lateral portions each having upper surfaces with longitudinally extending edges and longitudinally extending membrane securing grooves inward of the edges and having mouths located in the under-sides of the lateral portions below their upper surfaces, and
  G. a membrane diffusion element that
    1. is elongated in the direction of the central axis,
    2. has ends and longitudinally extending marginal portions and
    3. is connected in sealing engagement with the support by the marginal portions of the membrane extending into the grooves and being engaged therein by a securing member.

41. A strip diffuser comprising
a membrane support member,
  said support member including
    a pipe having
      a central axis and
      a connecting portion integral with the pipe,
        the connecting portion having a thickened region adjacent
        the pipe, the connecting portion further having lateral portions integral with and extending laterally from the thickened region thereof,
each lateral portion having a longitudinally extending
edge parallel to the central axis of the pipe and each
edge having a longitudinally extending groove,
a membrane having
edge portions,
each edge portion seated in a groove,
and a securing member to clamp the membrane directly within the groove.

42. A strip diffuser according to claim 41 in which the groove has a mouth having a smaller width than the width of the groove and wherein the securing member is compressible.

43. A strip diffuser according to claim 42 in which the groove has a circular cross-section.

44. A strip diffuser according to claim 42 in which the groove has an oval cross-section.

45. A strip diffuser according to claim 42 in which the groove has a triangular cross-section.

46. A strip diffuser according to claim 42 in which the groove has a trapezoidal cross-section.

47. A strip diffuser according to claim 42 in which the at least one securing member has a circular cross-section.

48. A strip diffuser according to claim 42 in which the at least one securing member has an oval cross-section.

49. A strip diffuser according to claim 42 in which the at least one securing member has a triangular cross-section.

50. A strip diffuser according to claim 42 in which the at least one securing member has a trapezoidal cross-section.

* * * * *